United States Patent
DiSorbo

(10) Patent No.: US 9,988,206 B2
(45) Date of Patent: Jun. 5, 2018

(54) MODULAR SHIPPING APPARATUS AND SYSTEM

(71) Applicant: Cargo Cube Systems, LLC, Margate, FL (US)

(72) Inventor: Aldo DiSorbo, Davie, FL (US)

(73) Assignee: CARGO CUBE SYSTEMS, LLC

( * ) Notice: Subject to any disclaimer, the term of this patent is extended or adjusted under 35 U.S.C. 154(b) by 2 days.

(21) Appl. No.: 14/414,473

(22) PCT Filed: Jan. 13, 2015

(86) PCT No.: PCT/US2015/011088
§ 371 (c)(1),
(2) Date: Jan. 13, 2015

(87) PCT Pub. No.: WO2015/108831
PCT Pub. Date: Jul. 23, 2015

(65) Prior Publication Data
US 2016/0340111 A1    Nov. 24, 2016

Related U.S. Application Data

(63) Continuation of application No. 14/361,280, filed as application No. PCT/US2014/034186 on Apr. 15, (Continued)

(51) Int. Cl.
*B65D 88/00*    (2006.01)
*B65D 88/12*    (2006.01)
(Continued)

(52) U.S. Cl.
CPC .............. *B65D 88/12* (2013.01); *B60P 1/36* (2013.01); *B60P 1/52* (2013.01); *B65D 19/0004* (2013.01);
(Continued)

(58) Field of Classification Search
CPC ...... B65D 88/00; B65D 88/005; B65D 88/02; B65D 88/022; B65D 88/027; B65D 88/10;
(Continued)

(56) References Cited

U.S. PATENT DOCUMENTS 1,693,607 A    12/1928  Platts
2,172,154 A     9/1939  Perin
(Continued)

FOREIGN PATENT DOCUMENTS

CA    2144886    9/1996
DE    25 01 414  7/1975

*Primary Examiner* — Steven A. Reynolds
*Assistant Examiner* — Javier A Pagan
(74) *Attorney, Agent, or Firm* — Jennifer Meredith, Esq.; Meredith & Keyhani, PLLC

(57) ABSTRACT

A modular shipping apparatus comprising: at least one base for a cargo container; each base having at least two spaces and each of spaces is formed by a left rectangular opening and a right rectangular opening, at least one wheel assembly is attached in one of the spaces, the base has a center portion that forms a first channel between the center portion and one of the openings and forms a second channel between the center portion and another one of the openings, a shipping container with a bottom interior and having at least two tracks attached to the bottom interior, wherein at least a portion of each of the at least one wheel assemblies attached in one of the at least two spaces slides along one of the at least two tracks.

32 Claims, 88 Drawing Sheets

Related U.S. Application Data 2014, now Pat. No. 9,868,589, which is a continuation of application No. 14/242,998, filed on Apr. 2, 2014, now Pat. No. 9,908,723.

(60) Provisional application No. 61/927,957, filed on Jan. 15, 2014.

(51) Int. Cl.

| | | |
|---|---|---|
| *B65D 88/02* | (2006.01) | |
| *B60P 1/52* | (2006.01) | |
| *B60P 1/36* | (2006.01) | |
| *B65D 19/00* | (2006.01) | |
| *B65D 88/54* | (2006.01) | |
| *B65G 63/00* | (2006.01) | |
| *B65G 67/02* | (2006.01) | |
| *B65D 88/30* | (2006.01) | |
| *B65D 90/00* | (2006.01) | |
| *B65D 90/58* | (2006.01) | |

(52) U.S. Cl.
CPC ........... *B65D 88/02* (2013.01); *B65D 88/129* (2013.01); *B65D 88/30* (2013.01); *B65D 88/546* (2013.01); *B65D 90/00* (2013.01); *B65D 90/0053* (2013.01); *B65D 90/0066* (2013.01); *B65D 90/587* (2013.01); *B65G 63/004* (2013.01); *B65G 67/02* (2013.01); *B65D 2590/0066* (2013.01)

(58) Field of Classification Search
CPC .... B65D 88/12; B65D 88/121; B65D 88/127; B65D 88/128; B65D 88/129; B65D 90/004; B65D 90/006; B65D 90/0066; B65D 90/0073; B65D 90/008; B65D 90/02; B65D 90/023; B65D 90/08; B65D 90/18

See application file for complete search history.

(56) References Cited

U.S. PATENT DOCUMENTS

| | | | |
|---|---|---|---|
| 2,287,886 A | 6/1942 | Kellett | |
| 2,858,774 A | 11/1958 | Lee | |
| 2,988,036 A | 6/1961 | Mooneyhan | |
| 3,169,652 A | 2/1965 | Ewell | |
| 3,315,826 A | 4/1967 | Gardner | |
| 3,722,705 A | 3/1973 | Gould | |
| 3,735,884 A | 5/1973 | Klett | |
| 3,779,406 A | 12/1973 | Hermann | |
| 3,854,544 A | 12/1974 | Kolchev | |
| 3,866,539 A * | 2/1975 | Gasser | B60S 3/004 104/249 |
| 3,982,639 A | 9/1976 | Haldimann | |
| 4,130,208 A | 12/1978 | Barry | |
| 4,231,695 A | 11/1980 | Weston | |
| 4,273,217 A | 6/1981 | Kajita | |
| 4,344,368 A | 8/1982 | Remington | |
| 4,421,186 A | 12/1983 | Bradley | |
| 4,537,554 A | 8/1985 | Collins | |
| 4,640,657 A | 2/1987 | Moore | |
| 4,699,337 A | 10/1987 | Lewis | |
| 4,747,504 A | 5/1988 | Wiseman | |
| 4,770,589 A | 9/1988 | Bryan | |
| 4,976,365 A * | 12/1990 | Seo | B65D 90/16 108/55.1 |
| 5,054,295 A | 10/1991 | Goulooze | |
| 6,485,239 B2 | 11/2002 | Afful | |
| 6,622,854 B2 | 9/2003 | Coblentz | |
| 6,824,338 B2 | 11/2004 | Looker | |
| 7,482,928 B2 | 1/2009 | Brackmann | |
| 7,686,550 B2 * | 3/2010 | Mix | B65G 49/062 410/127 |
| 8,353,388 B2 | 1/2013 | Rice | |
| 8,474,223 B2 | 7/2013 | Lancaster | |
| 8,718,372 B2 | 5/2014 | Holeva | |
| 9,056,577 B2 | 6/2015 | Corrigan | |
| 2005/0226706 A1 | 10/2005 | Thomas | |
| 2008/0211669 A1 | 9/2008 | Dagher | |
| 2009/0202330 A1 | 8/2009 | Hamather | |
| 2010/0091094 A1 | 4/2010 | Serowski | |
| 2010/0147841 A1 | 6/2010 | Reynard | |
| 2011/0234389 A1 | 9/2011 | Mellin | |
| 2012/0177467 A1 | 7/2012 | Corrigan | |
| 2012/0205943 A1* | 8/2012 | Nelson | B60P 3/205 296/186.1 |
| 2015/0053691 A1 | 2/2015 | Sanger | |
| 2015/0117997 A1 | 4/2015 | Grady | |
| 2015/0129444 A1 | 5/2015 | Witczak | |
| 2016/0055506 A1 | 2/2016 | Tama | |

\* cited by examiner

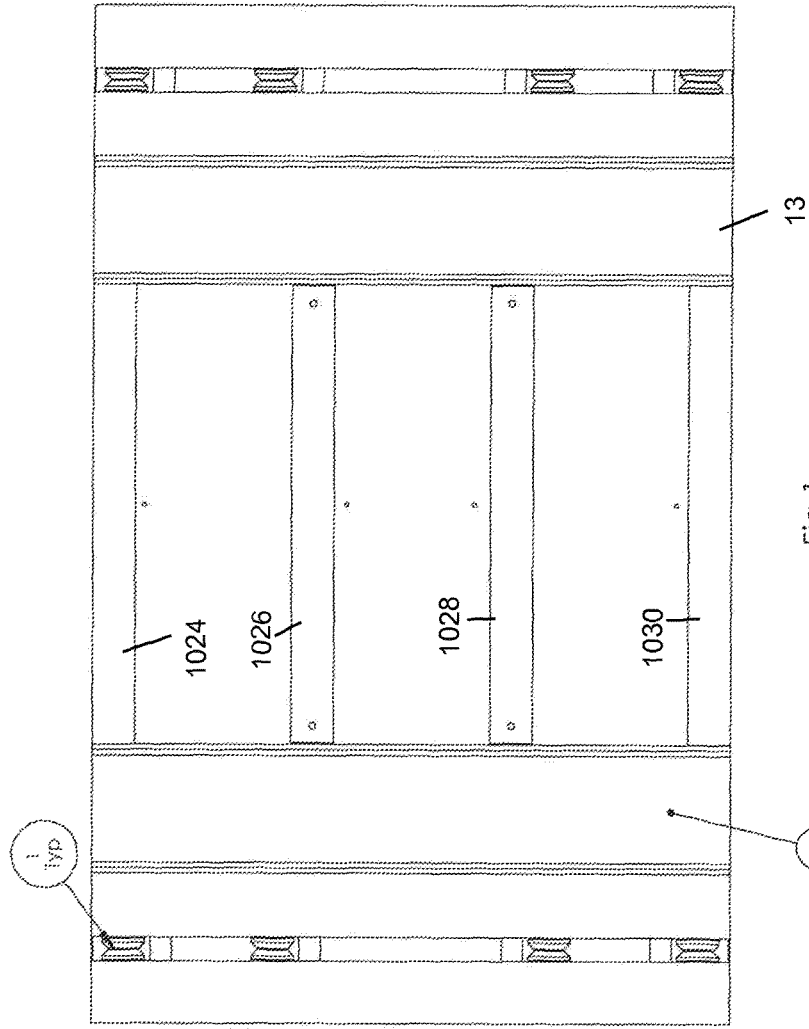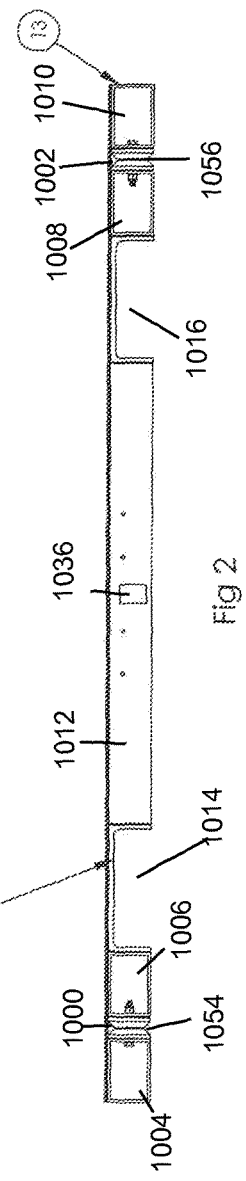

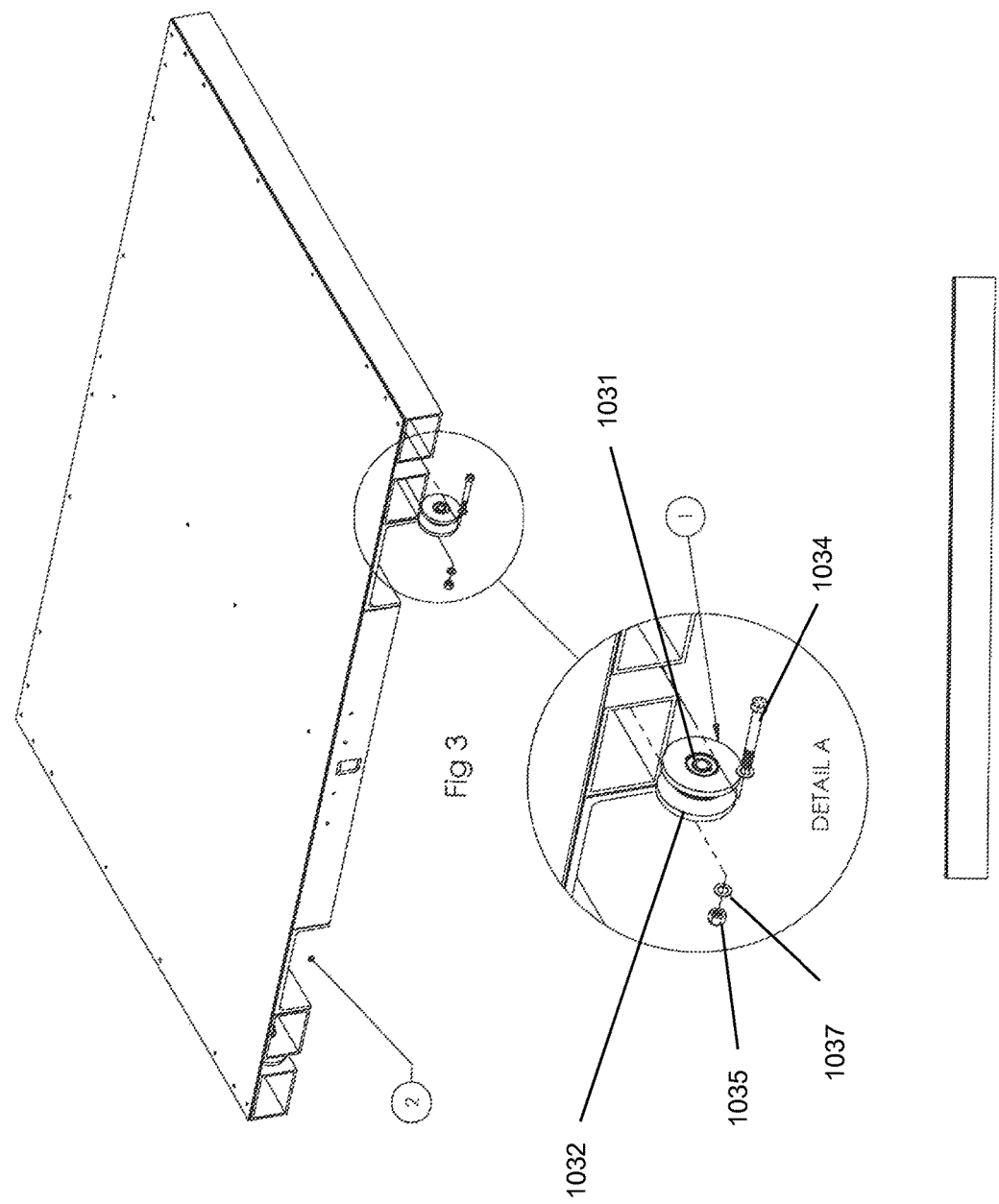

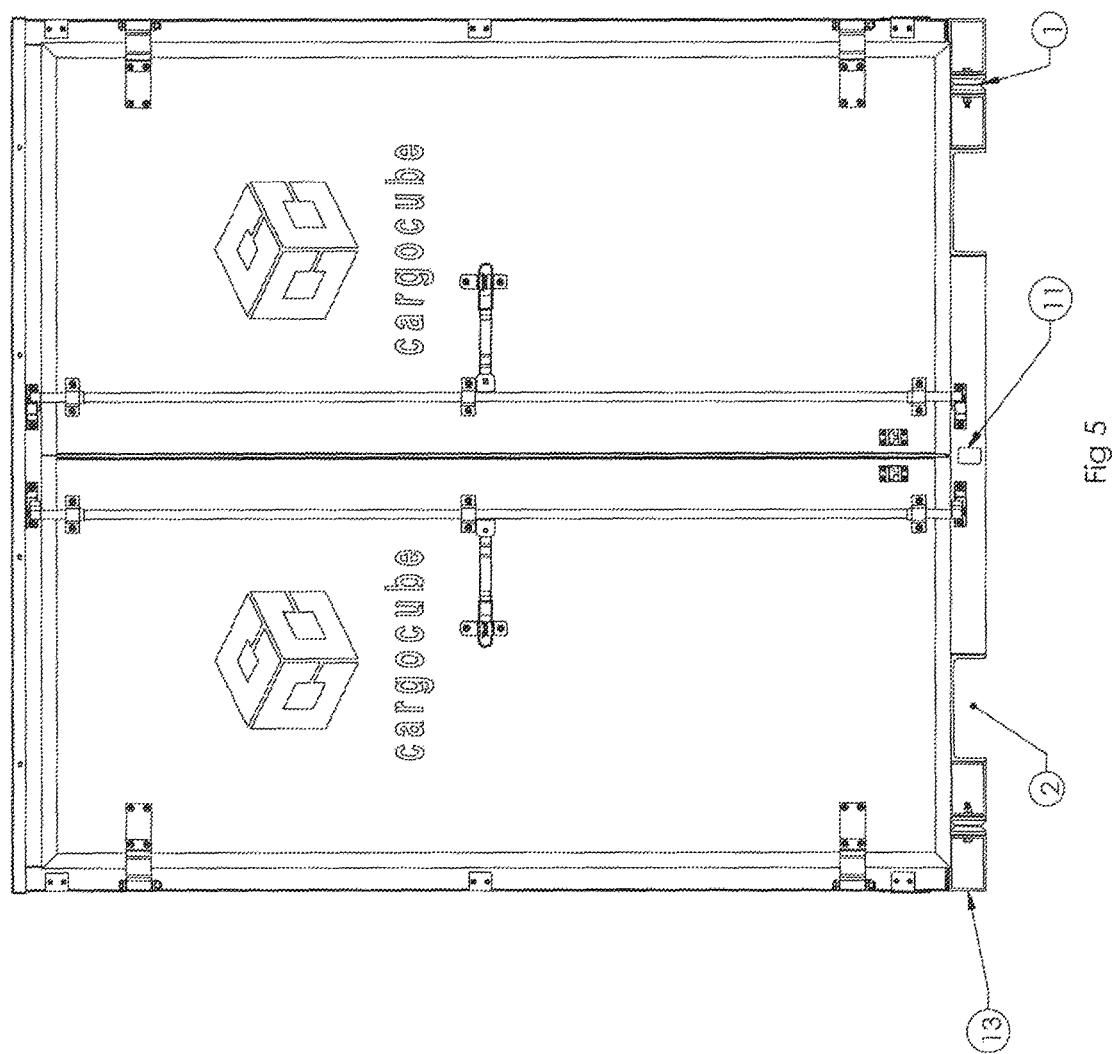

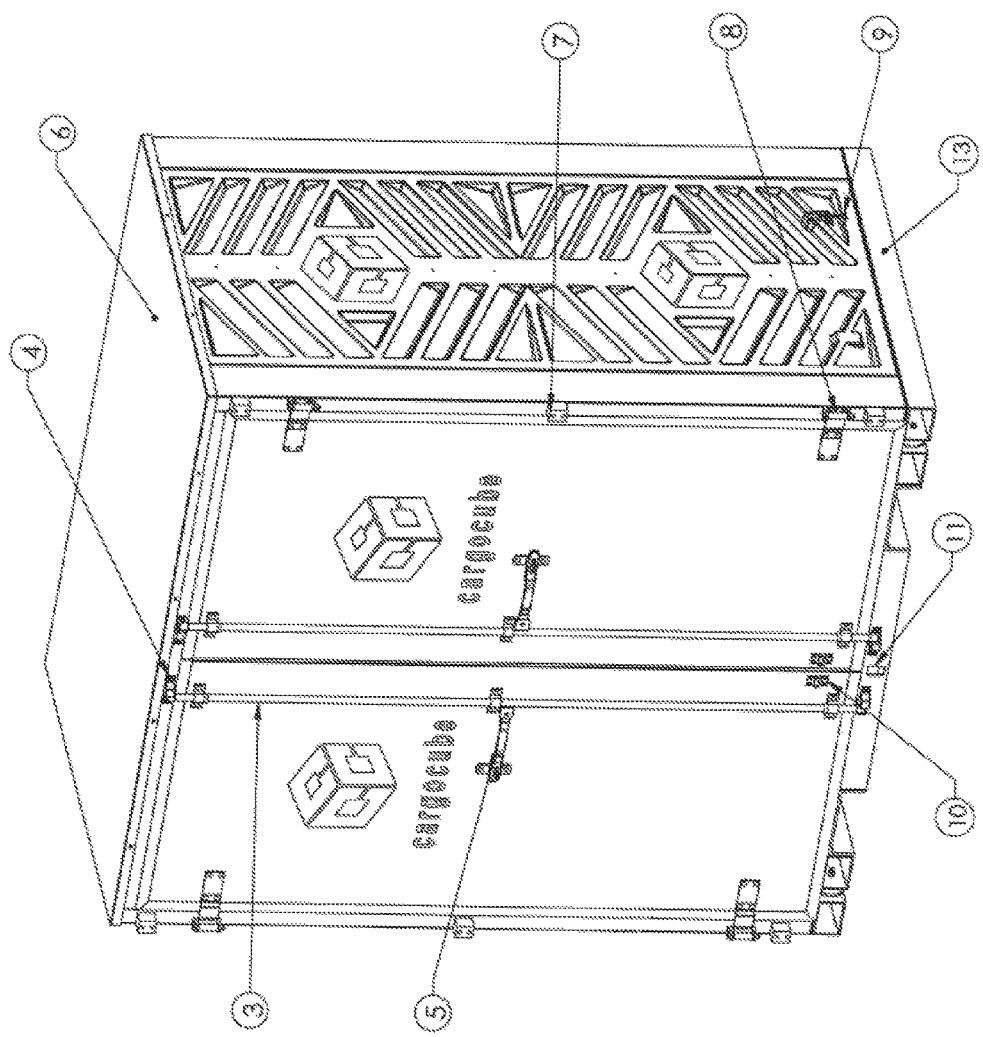

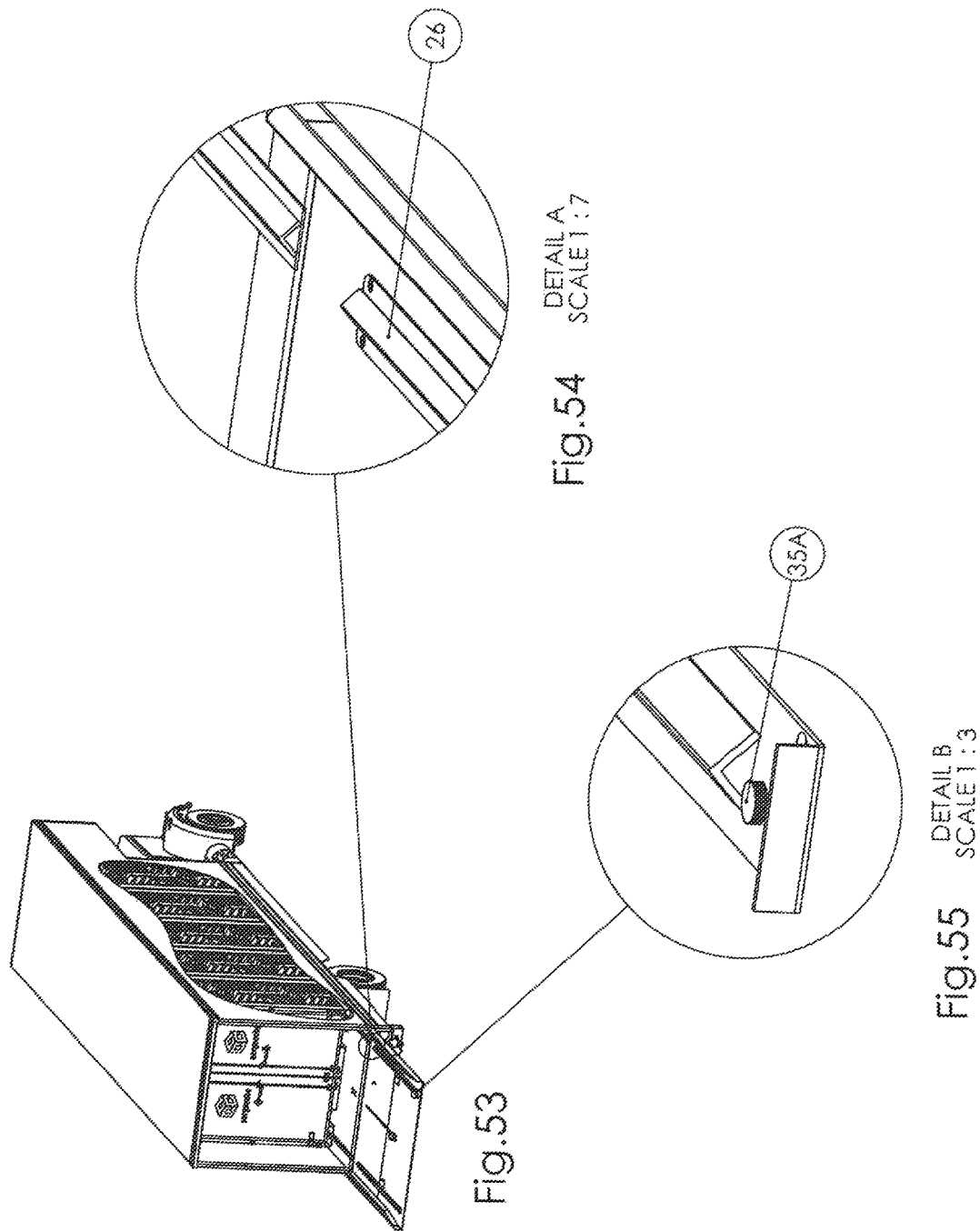

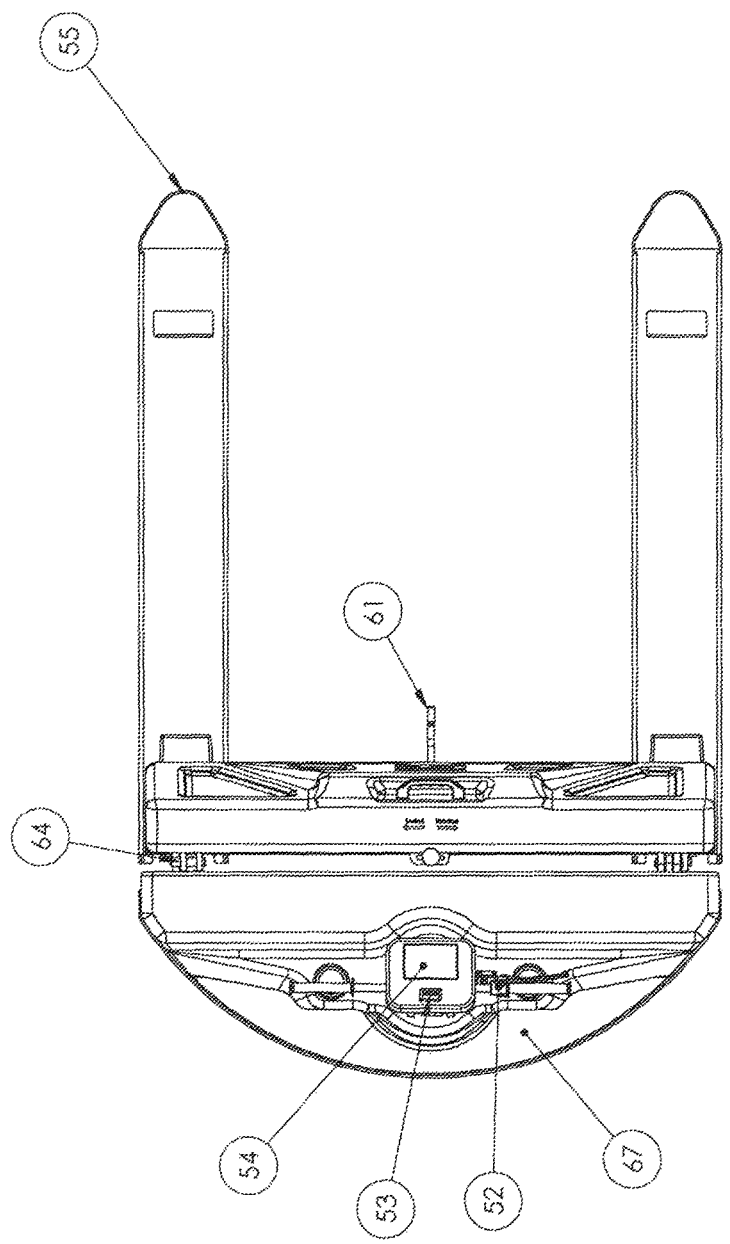

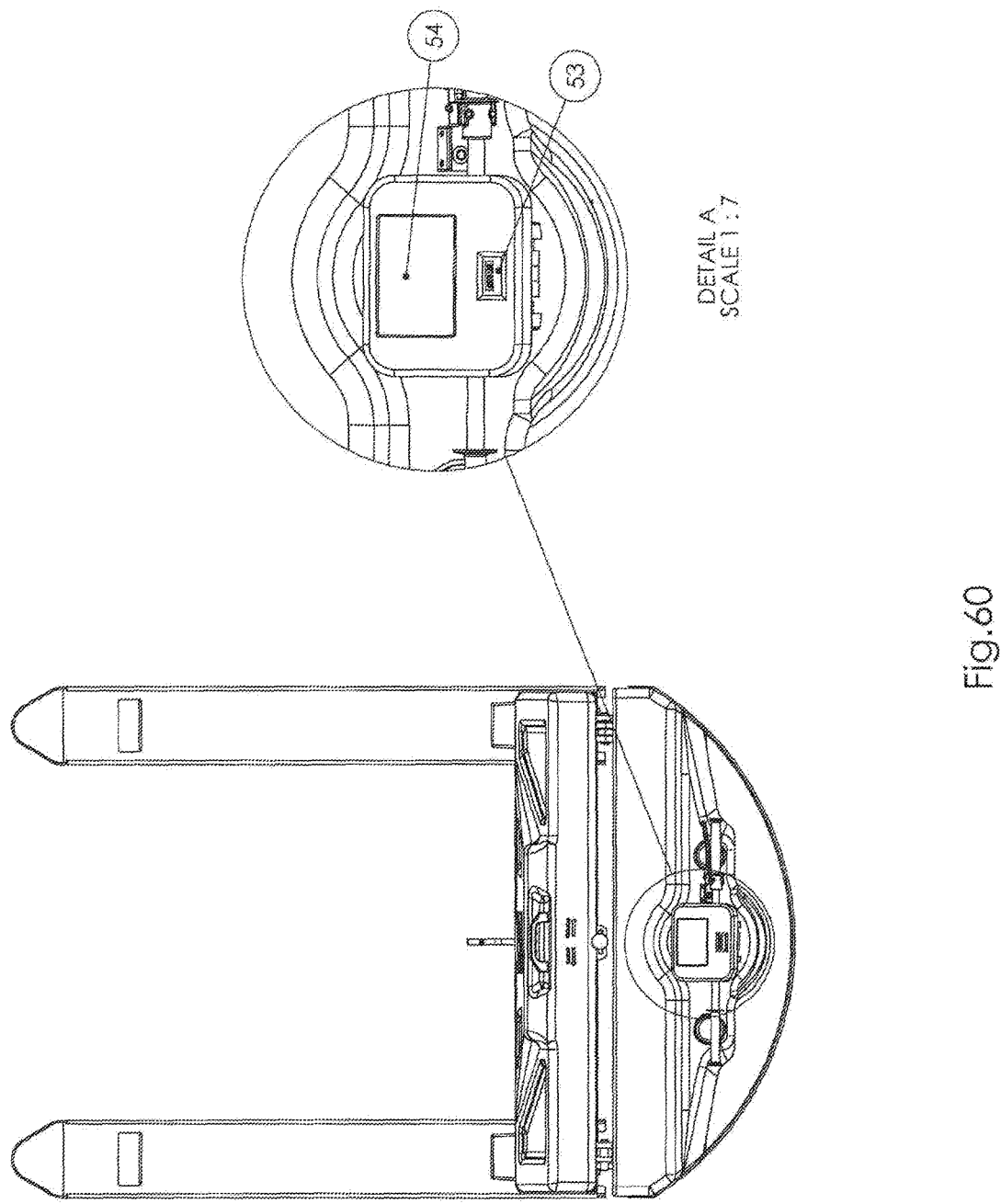

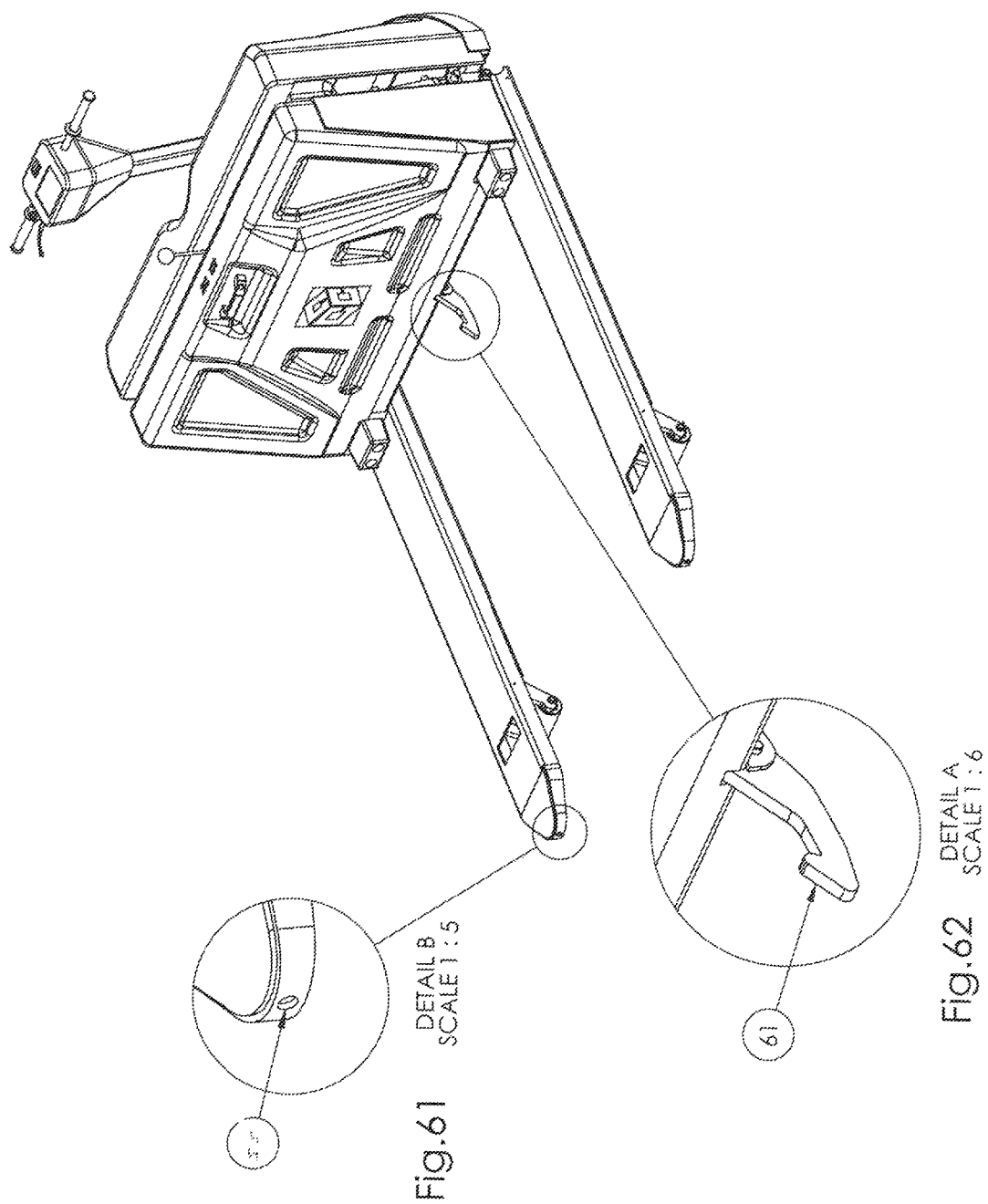

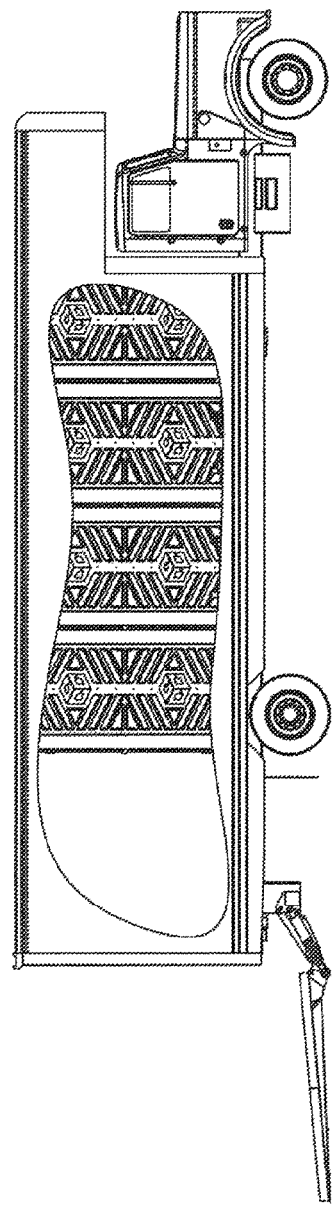
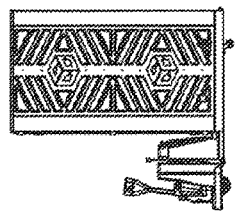
Fig. 72

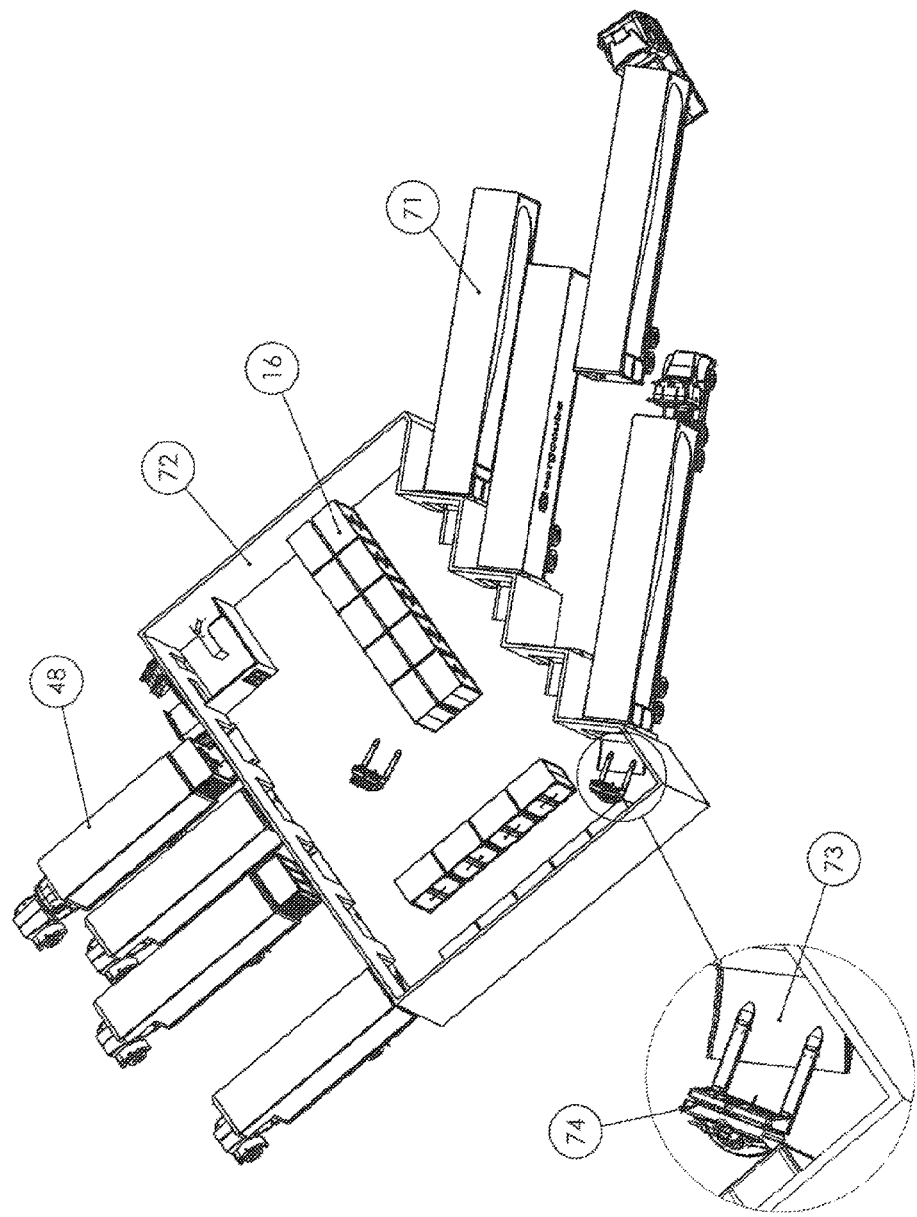

MODULAR SHIPPING APPARATUS AND SYSTEM

FIELD OF THE INVENTION

The present invention relates generally to the field of transportation, storage, and shipping. The present invention is a system to transport, consolidate and store all types of cargo. The system is designed to the reduce cost of transportation and labor. It is also designed to ensure security of cargo for worldwide transportation.

BACKGROUND

In the shipping industry, it is desirable to utilize all of the space available. The simple stacking of a plurality of boxes having variable shapes often results in wasted space in a storage compartment. Unused space in a storage compartment also increases the likelihood that objects stored there will shift during transport, suffering damage or fracture.

Shipping is common, as are large-scale shipping vessels. However, much ground transportation is not efficiently conducted. In addition, trailers used for shipping may elevate several feet off the ground. Operating one of these trailers requires the use of ramps or the lifting by human operators in an effort to place objects in one of said trailers. Trailer lifts have also been developed to assist in this operation.

Once objects are placed inside a trailer it is often challenging to stack and arrange said objects in an alignment in which they can be transported in an efficient manner utilizing all available space, and in such a way so as to prevent shifting or damage during transport.

Distribution centers, where cargo is redistributed among trailers and forklifts, are commonly used. However, it is difficult to operate a forklift inside a trailer. In addition, a pallet generally used with standard forklifts does not have the same dimensions as that of a trailer. Thus, using forklifts may require less manual labor, but does not improve the ability to maximize the use of storage space.

It is therefore desirable to provide a means to efficiently maximize the amount of space used inside a storage or transportation container.

It is also desirable to provide a means for efficiently and easily arranging transported objects inside a trailer or other compartment.

It is also desirable to provide a system that may be utilized in conjunction with a rail system, which is more cost effective.

The present invention also seeks to provide an efficient manner in which to transport commodities.

BRIEF SUMMARY OF THE INVENTION

Accordingly, objects of the present invention are to provide modular shipping systems, apparatuses and methods for improving efficient use of space in storage compartments in the transport and shipping industries.

It is therefore an object of the present invention to provide an apparatus and system for improving transportation and storage of cargo.

According to one aspect of the present invention, a modular shipping apparatus for a transportation container is disclosed, having: at least one base for a cargo container; wherein each base has at least two spaces, wherein each space is formed by a left rectangular opening and a right rectangular opening, and at least one V-groove wheel assembly is attached in one of the spaces, wherein each base has a center portion that forms a first channel between the center portion and one of the left rectangular openings or the right rectangular openings and forms a second channel between the center portion and another one of the left rectangular openings or right rectangular openings, a shipping container with a bottom interior and having at least two V-shaped tracks attached to the bottom interior, wherein each of the at least one V-groove wheel assemblies attached in one of the at least two spaces slides along one of the at least two V-shaped tracks.

According to another aspect of the present invention, a modular shipping apparatus for a transportation container is providing, comprising: at least one base for a cargo container; wherein each at least one base has a first rectangular opening and a second rectangular opening with a first space between the first rectangular opening and a second rectangular opening, wherein at least one V-groove wheel assembly is attached in the first space, wherein each at least one base has a third rectangular opening and a fourth rectangular opening with a second space between the third rectangular opening and the fourth rectangular opening, wherein at least one V-groove wheel assembly is attached in the second space, wherein each at least one base has a center portion that forms a first channel between the center portion and the second rectangular opening and forms a second channel between the center portion and the third rectangular opening, a shipping container with a bottom interior and having at least two V-shaped tracks attached to the bottom interior, wherein each of the at least one V-groove wheel assemblies attached in the first space slide along a first V-shaped track of the at least two V-shaped tracks and wherein each of the at least one V-groove wheel assemblies attached in the second space slide along a second V-shaped track of the at least two V-shaped tracks.

These and other objects and advantages of the present invention will become apparent from a reading of the attached specification and appended claims. There has thus been outlined, rather broadly, the more salient features of the invention in order to better appreciate the contribution of the instant invention to the art. There are features of the instant invention that will be described hereinafter and which will form the subject matter of the claims appended hereto.

BRIEF DESCRIPTION OF THE DRAWINGS

FIG. 2 is a picture of a front side of the base.
FIG. 3 is a picture of the base with a wheel assembly.
FIG. 4 is a picture of a side of the base.
FIG. 5 is a picture of a cargo container mounted on a base.
FIG. 6 is a picture of a cargo container mounted on a base.

FIG. 53 is a picture of a "V" track.

FIG. 54 is a closer picture of a "V" track on a lift gate and a truck.

FIG. 55 represents an embodiment whereby a "V" track is unscrewed.

FIG. 56 is a picture of a forklift.

FIG. 60 is a closer view of a screen for a camera and a weight indicator for weight.

FIG. 61 is a closer view of a camera hole.

FIG. 62 is a closer view of a hook that is used to pull and push a cargo container.

FIGS. 72, 73, 74, 75, 76, and 77 demonstrate a cargo container loaded onto a pallet jack, a cargo container being loaded on a lift gate, a lift gate going up, a cargo container placed inside a truck, and a pallet jack placed inside a truck.

FIGS. 85 and 86 demonstrate distribution facility regular trucks bringing cargo containers into one side and cargo containers being placed into trailers, oversea containers, or rail containers for transit from shipping to destination.

DETAILED DESCRIPTION

The claimed invention is designed to use every available square inch of a vehicle. A vehicle may include a truck, trailer, international container, rail car, overseas container, or other transportation vehicle. A transportation box is also referred to as a Cargo Container or Cargo Cube. The claimed invention may enable a buffer space of 1 inch on each side plus 1 inch on the top and 1 inch on the bottom for the transportation modular components to fit. This arrangement increases efficiency and enables a user to use every square inch of the vehicle.

This system is designed to load any number of, by way of example up to ten, transportation modular components in a container, trailer, or rail container. The system is designed to save money in transportation cost across country, or across the globe. The transportation modular components may be used to load household goods and other freight items and commodities.

Figure 71:
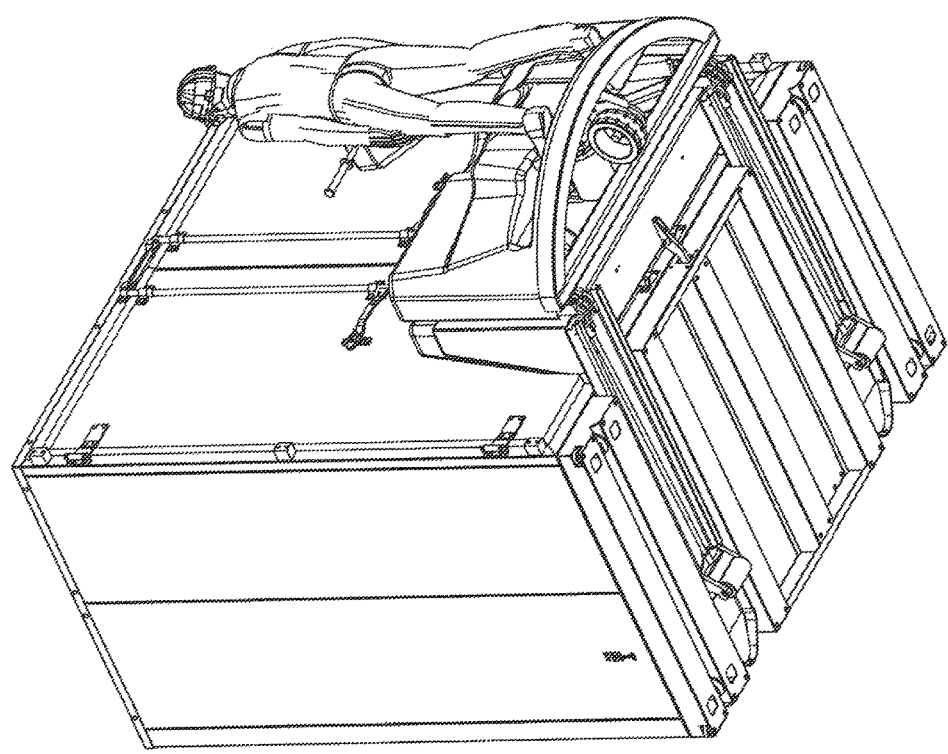
Figures 1, 71:
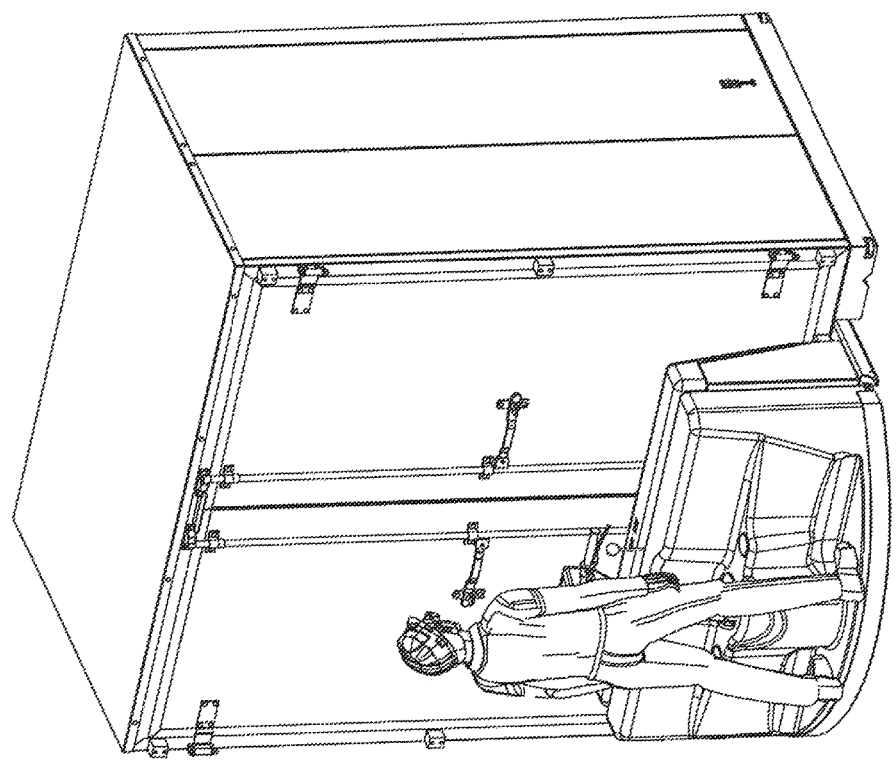
FIG. 1 is a picture of a base.
Figure 73:
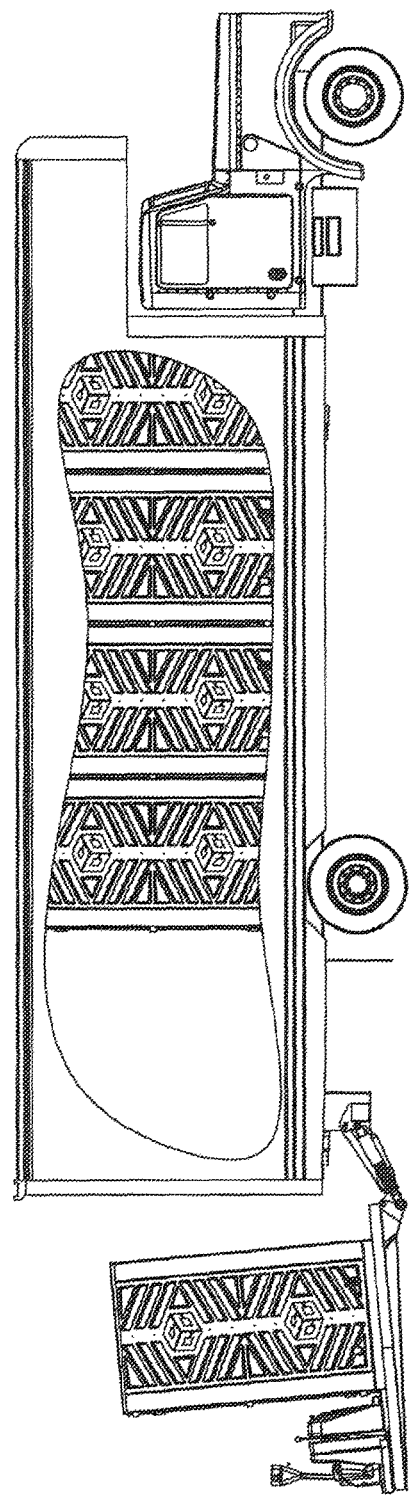
Figure 74:
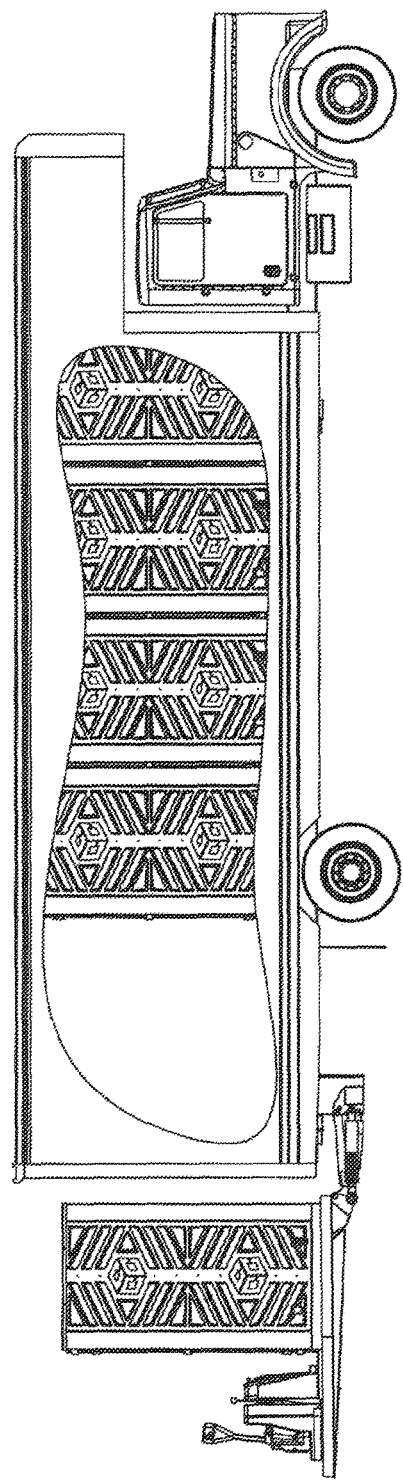
Figure 75:
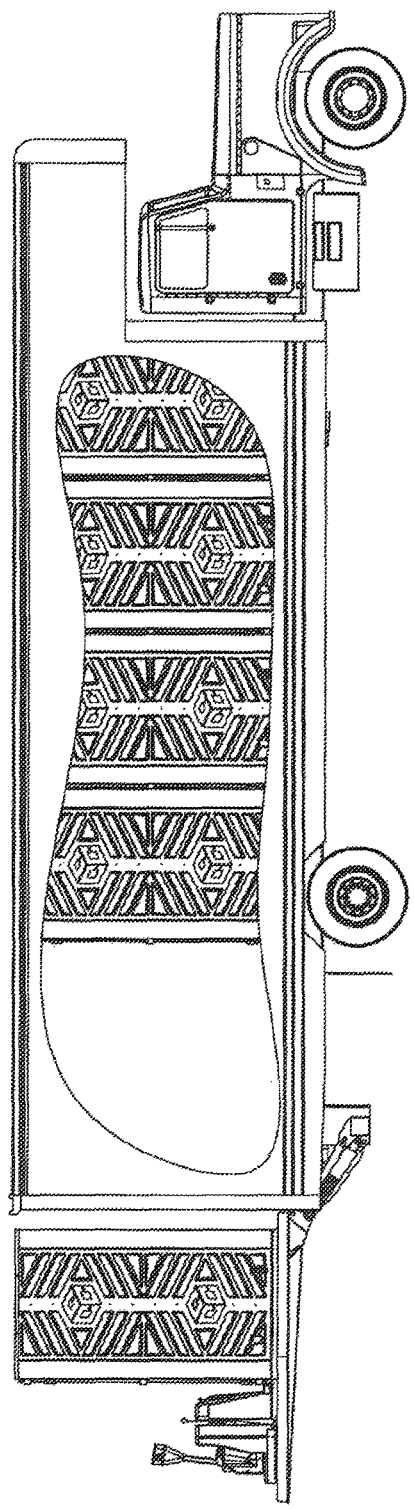
Figure 76:
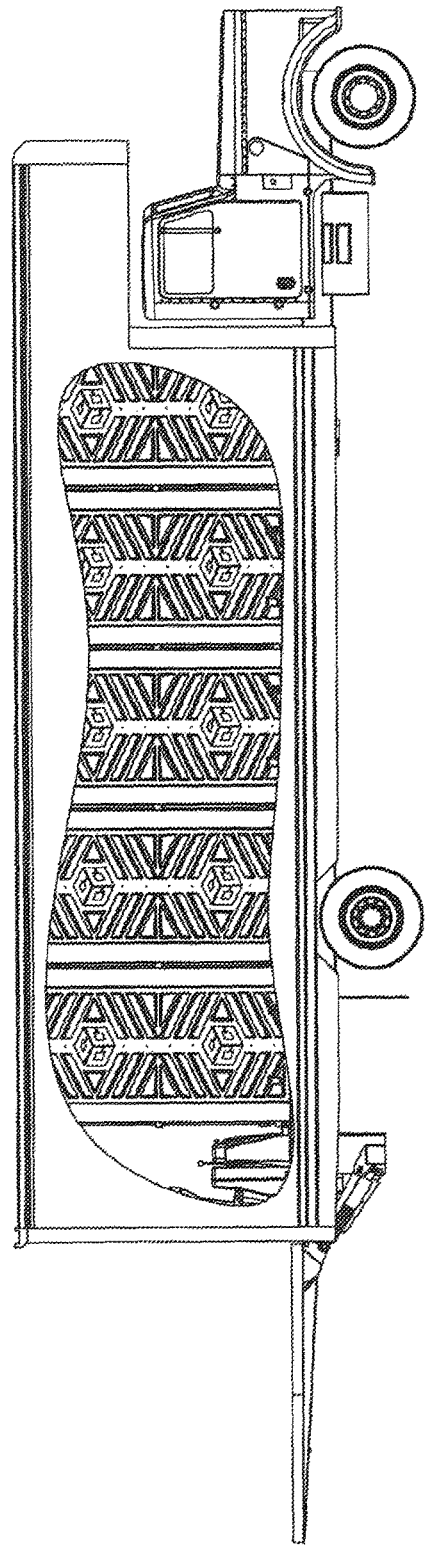
Figure 77:
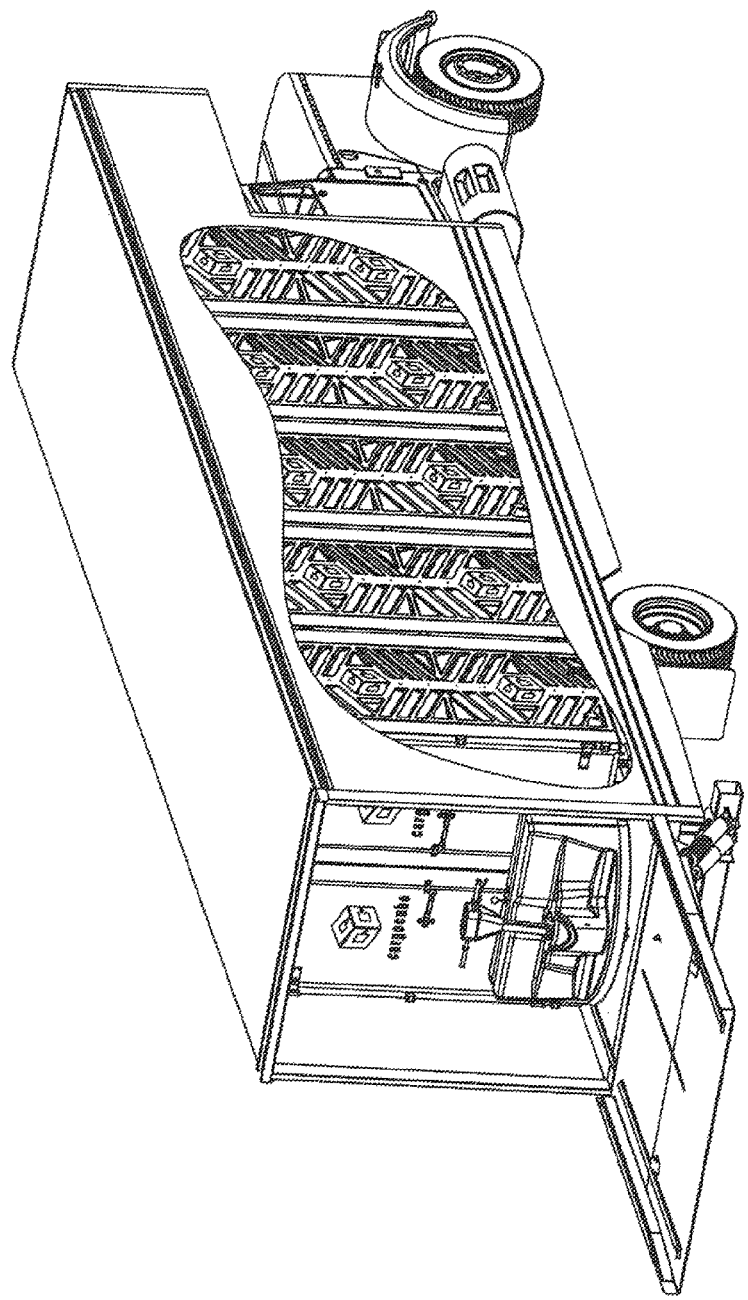
Figure 78:
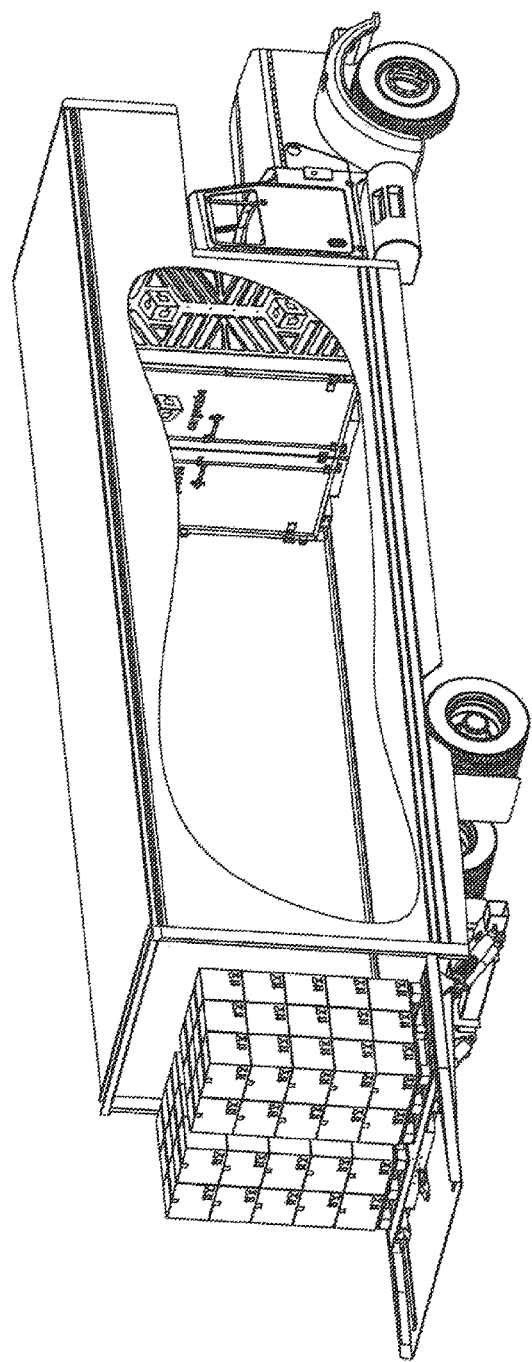
FIGS. 78, 79, and 80 demonstrate a cargo container box, a base holding pallets of freight, and a commodities transporter, inside a truck, for example.
Figure 79:
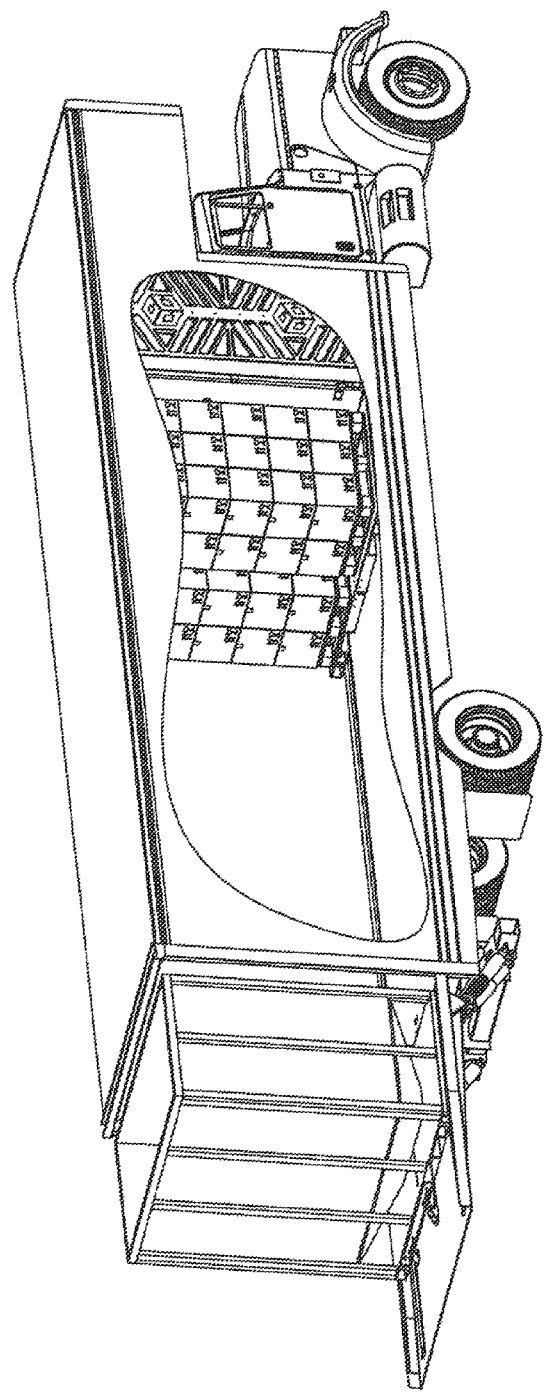
Figure 80:
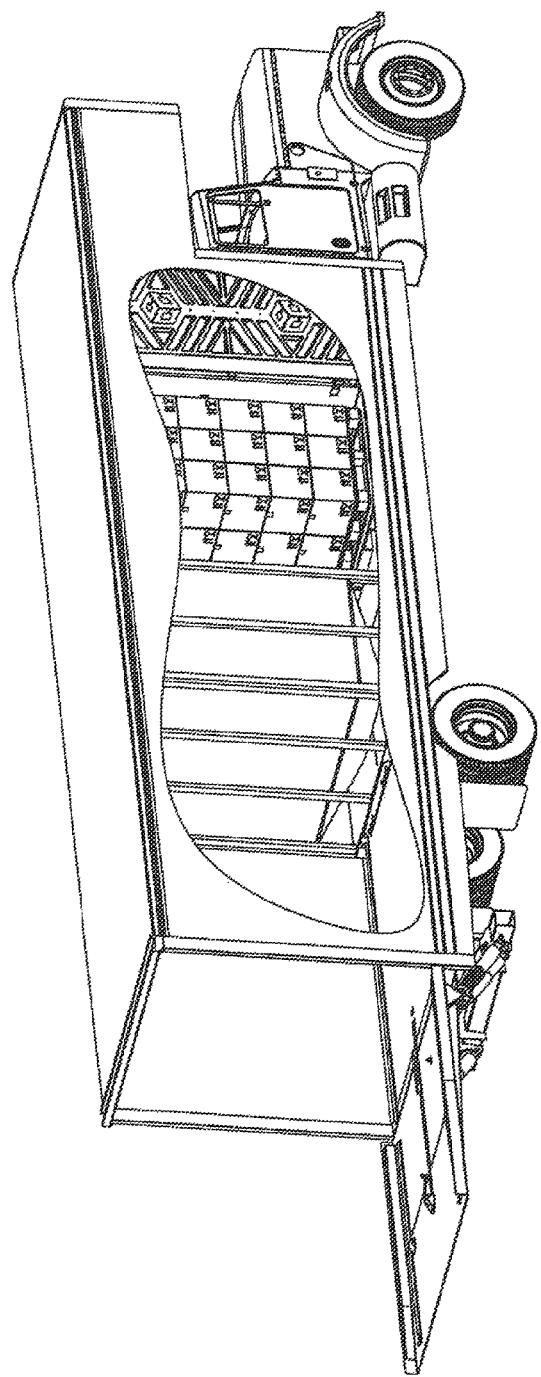
Figure 93:
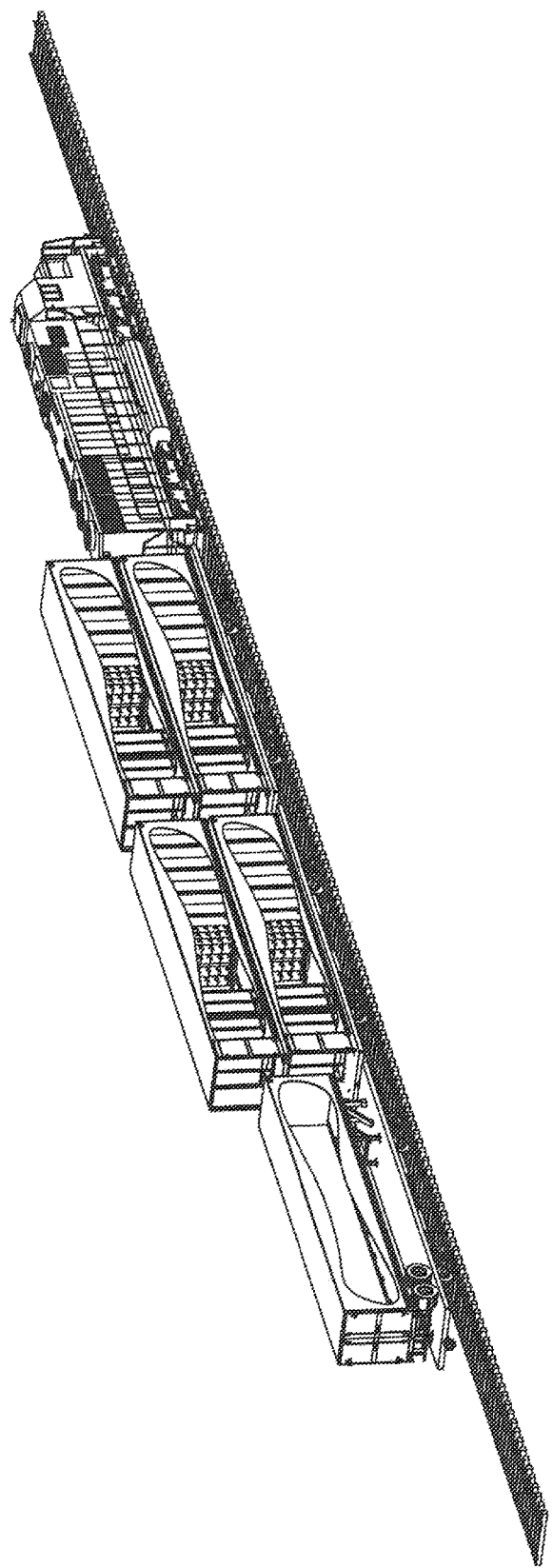
FIG. 93 shows an overseas container and a plurality of rail containers stacked up onto each other on a rail car.

With reference to FIGS. 1-93, the present invention provides a modular shipping apparatus for a transportation container. The apparatus may have at least one base (13) for a cargo container. Each base (13) has at least two spaces (e.g. 1000 and 1002), wherein each of the at least two spaces (e.g. 1000 and 1002) are formed by a left rectangular opening and a right rectangular opening. For example, space (1000) is formed by left rectangular opening (1004) and right rectangular opening (1006). Space (1002) is formed by left rectangular opening (1008) and right rectangular opening (1010). As can be seen in FIGS. 1-3, the left rectangular openings are elongated, hollow rectangular pieces. In this way, the wheel assembly may be attached, but still capable of supporting a great deal of weight. Also, this configuration allows the base to be easily moved with little effort. There is at least one V-groove wheel assembly attached in each of the at least two spaces (e.g. 1000 and 1002). Each base has a center portion (1012) that forms a first channel (1014) between the center portion (1012) and one of the left rectangular openings (e.g. 1004 and 1008) or one of the right rectangular openings (e.g. 1006 and 1010) and forms a second channel (1016) between the center portion (1012) and another one of the left rectangular openings (e.g. 1004 and 1008) and the right rectangular openings (e.g. 1006 and 1010). There is also a shipping container (for example, truck 48) with a bottom interior (1018) (see, for example, FIGS. 41-52) having at least two V-shaped tracks (e.g. FIG. 44 V-shaped tracks 1020 and 1022) attached to the bottom interior (1018), wherein a portion of each of the at least one V-groove wheel assemblies attached in one of the at least two spaces slides along one of the at least two V-shaped tracks. The first channel (1014) and the second channel (1016) are sized to receive a portion of a lifting device. For example, they may be sized to receive the fork portion of a fork lift. The present invention envisions using many different types of lifting devices.

The center portion (1012) may include at least one rectangular bar (1024, 1026, 1028 and 1030) that is perpendicular to the first channel and the second channel. The rectangular bars provide stability, while at the same time do not block the underside of the base, which is important for the transportation of commodities. The shipping container (e.g. 48) may also have at least two foot stoppers (27) attached to the bottom interior (1018) of the shipping container. It should be noted that the foot stoppers (27) are shown attached to the lift gate (33). Although this changes position, the lift gate (33) is considered part of the bottom interior (1018) of the shipping container, as it would be in the loading position. The foot stoppers (27) may also be in other positions, such as further inside the shipping container (i.e. not on the liftgate). As shown in FIG. 3, each of the V-groove wheel assemblies (1, 1054, 1056) are comprised of a V-groove wheel (1032), a bearing (1031), a bolt (1034), a nut (1035) and optionally a washer (1037). The nut (1035) is attached through a portion of the left rectangular opening (e.g. 1004 and 1008) and a portion of the right rectangular opening (e.g. 1006 and 1010) with the V-grove wheel (1032) rotatably attached to the nut (1035) and bolt (1034) through the bearing (1031) in one of the at least two spaces (e.g. 1000 and 1002).

The center portion may also have a center portion opening (1036) along a middle front portion of the center portion (1012). There may also be a hook arm assembly (See FIG. 37, 1038) attached to the bottom interior (1018) of the shipping container and aligned with the center portion opening (1036) along a middle front portion of the center portion (1012), to allow a portion of the hook arm assembly to thread the center portion opening (1036). The portion of the hook arm assembly that threads the center portion opening may be the hook arm (31).

According to another embodiment, there may be a pulley system assembly (1040) attached to the bottom interior of the shipping container and aligned with the center portion opening (1036) along a middle front portion of the center portion, wherein a portion of the pulley system assembly threads the center portion opening. For example, the strap (31) threads the center portion opening (1036) and the pulley (28) pulls the strap (31) which drags the base (with the cargo containers on top) out of the shipping container (e.g. truck).

Figure 18:
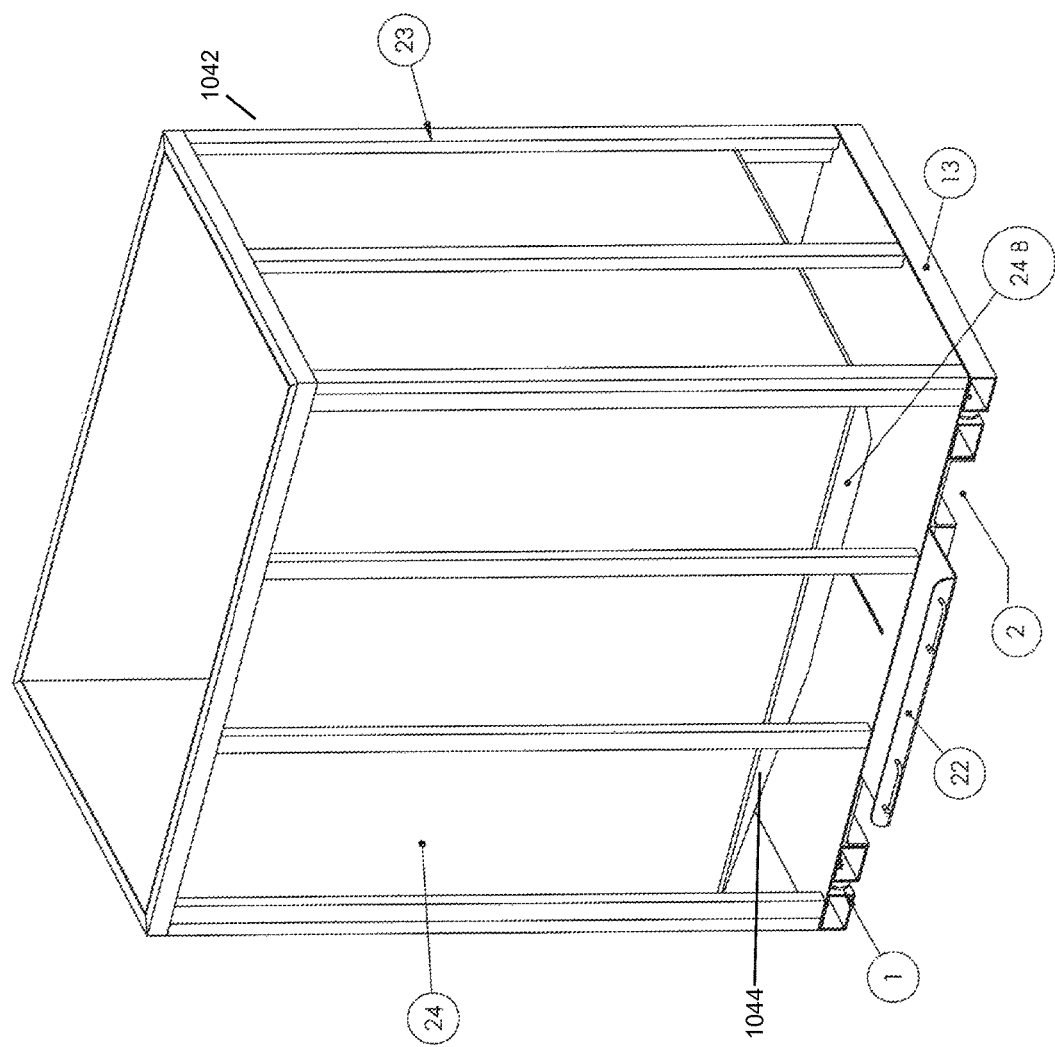
FIG. 18 depicts a commodities transporter on a base.
Figure 19:
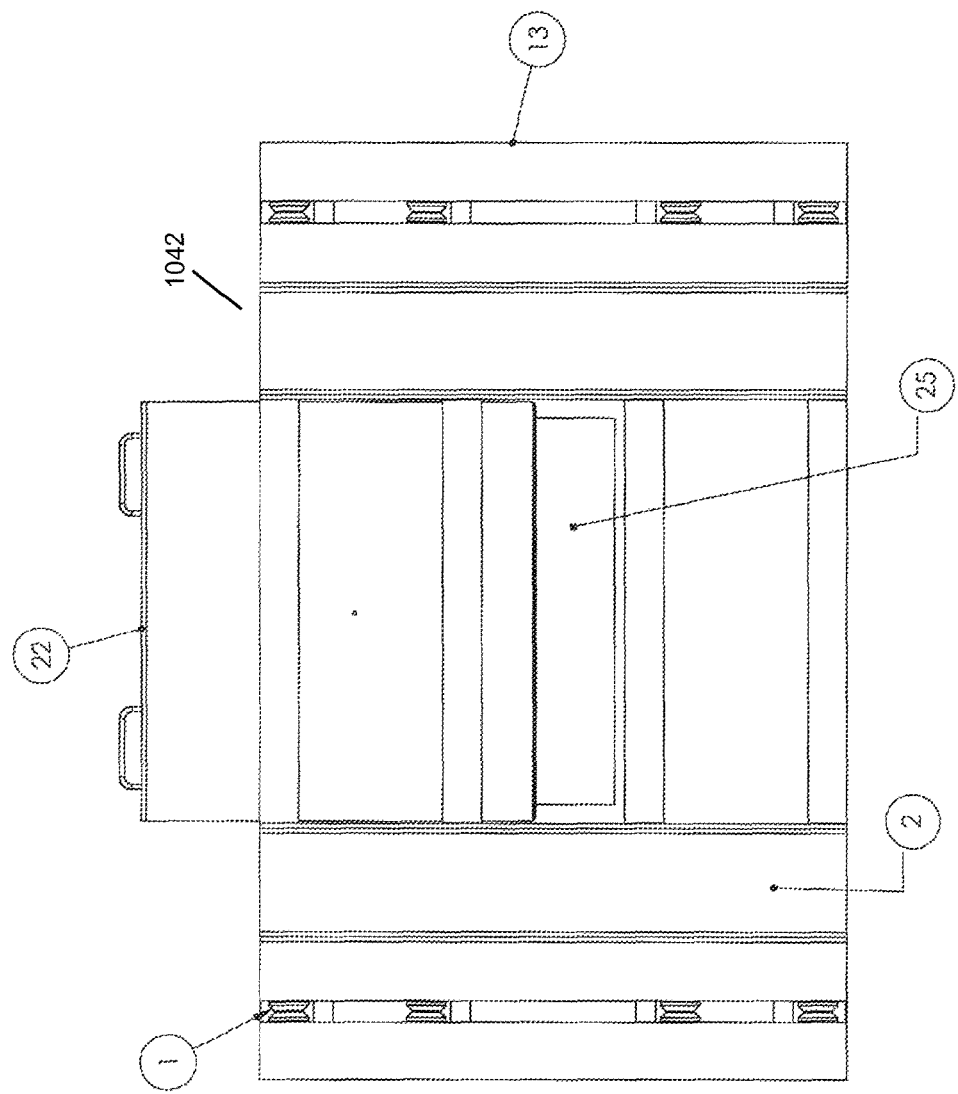
FIG. 19 is a picture of a base from underneath a commodities transporter.
Figure 20:
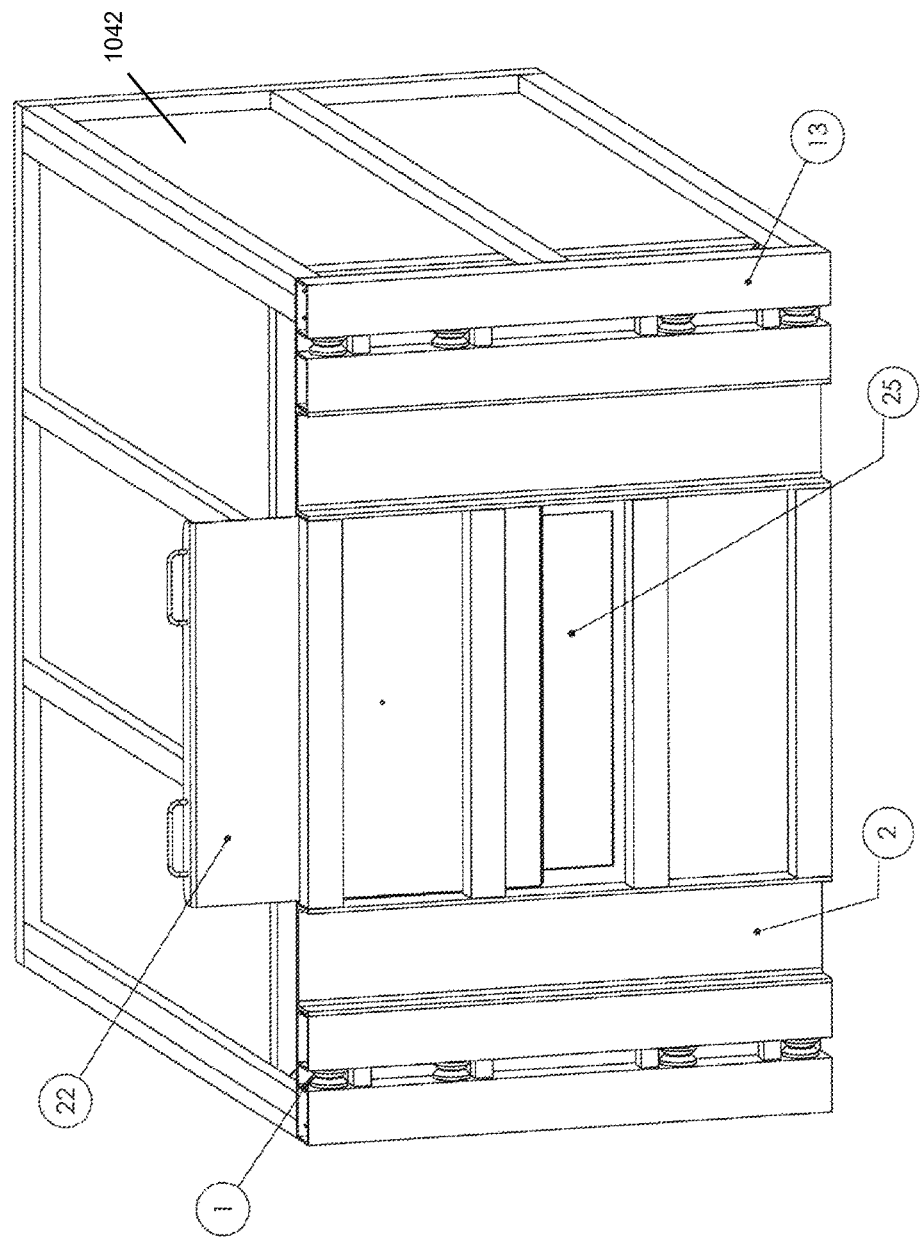
FIG. 20 is a picture of a different angle of a commodities transporter.
Figure 21:
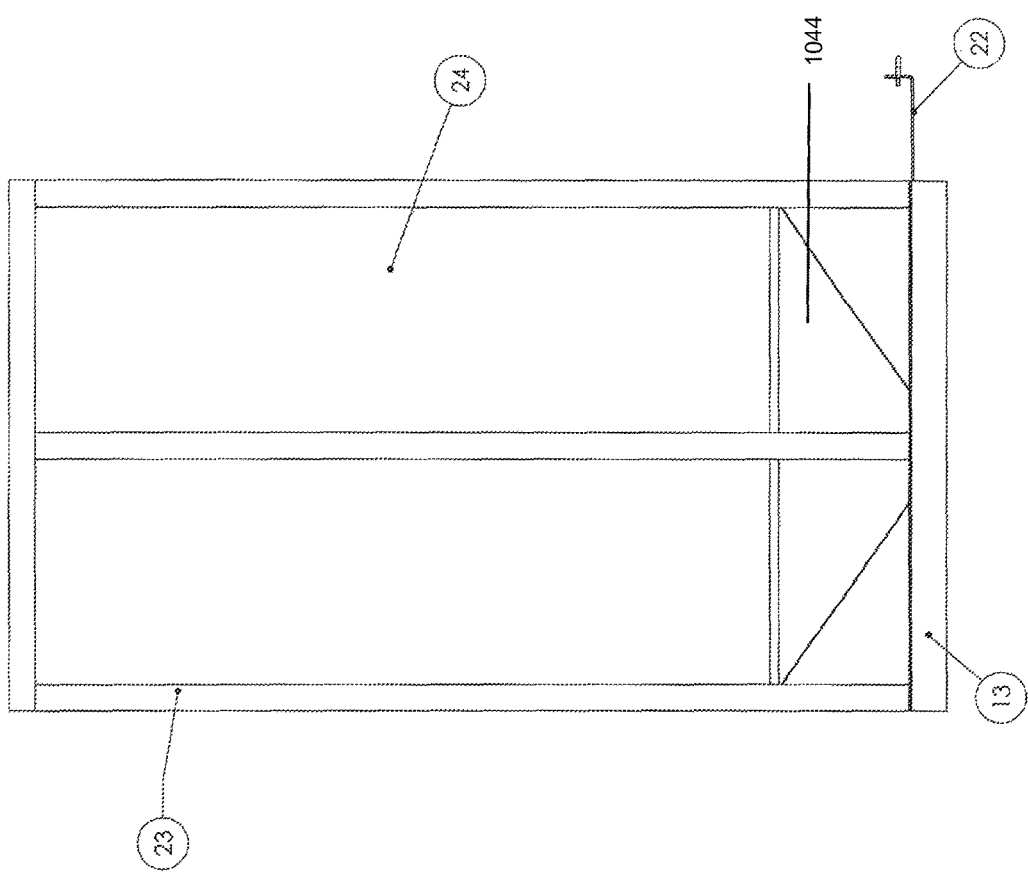
FIG. 21 is a side view of a commodities transporter.

FIGS. 18-23 depict examples of commodities transporters (1042) according to the present invention. The commodities transporter (1042) cargo container may have a bottom interior with a funneled portion (1044) and a bottom exterior with a door (22). The funneled portion (1044) directs good towards the center of the bottom interior. It should be understood that this may take many forms and shapes, but will direct the contents towards a portion where a door is. When the door (22) is opened the commodity is funneled out of the commodities transporter (1042). It is noted that the exterior of the funneled portion is depicted in FIGS. 18 and 21 as the interior may not be seen in this view. One of ordinary skill in the art would understand the interior, in the embodiment depicted, mimics the shape of the exterior portion shown.

FIG. 9-13 depict an example of rails that receive straps to secure the cargo. The rails are also referred to as e-tracks and the terms are interchangeable. The cargo container may have a plurality of rails (e.g. 18 and 1046) with elongated rail openings (e.g. 1048, 1050) that receive a strap (1052). There may also be at least one interior partition (19). The interior partitions may also contain at least one locked cargo container.

The present invention also provides a modular shipping apparatus for a transportation container, comprising: at least one base (13) for a cargo container; each base (13) may have a first rectangular opening (1004) and a second rectangular opening (1006) with a first space (1000) between the first rectangular opening (1004) and a second rectangular opening (1006). There may be at least one V-groove wheel assembly (1054) attached in the first space (1000). Each base (13) may have at least a third rectangular opening (1008) and a fourth rectangular opening (1010) with a second space (1002) between the third rectangular opening (1008) and the fourth rectangular opening (1010), wherein at least one V-groove wheel assembly (1056) is attached in the second space (1002). Each base (13) has a center portion (1012) that forms a first channel (1014) between the center portion (1012) and the second rectangular opening (1006) and forms a second channel (1016) between the center portion (1012) and the third rectangular opening (1008). There may also be a shipping container with a bottom interior (e.g. truck 48) and having at least two V-shaped tracks (e.g. FIG. 44 tracks 1020 and 1022) attached to the bottom interior (1018). Each of the at least one V-groove wheel assemblies (e.g. 1054) attached in the first space (1000) slide along a first V-shaped track of the at least two V-shaped tracks and wherein each of the at least one V-groove wheel assemblies (e.g. 1056) attached in the second space (1002) slide along a second V-shaped track of the at least two V-shaped tracks.

Figure 51:
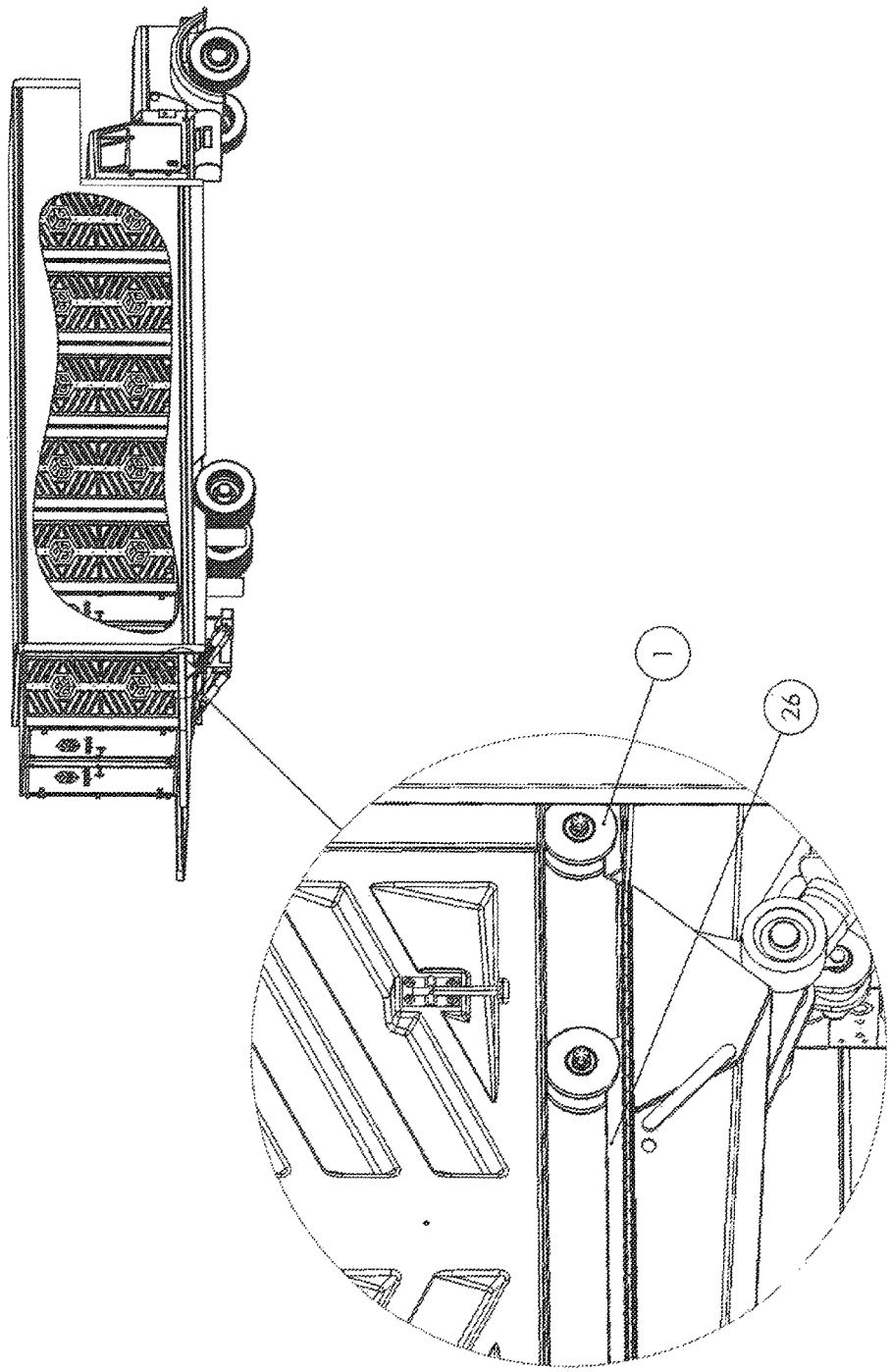
FIG. 51 is a closer view on a "V" track and wheels of a base.

It should be understood that there may be any number of rectangular openings, to create any number of spaces between them for the receipt of the wheel assemblies. There could eve, for example, be three parallel rectangular openings with the rectangular opening in the middle having two V-groove wheel assemblies attached inside. In this situation, a portion of one wheel assembly would be attached to one side and a portion of another wheel assembly would be attached to the other side. There may also be any number of wheel assemblies. For example, FIG. 1 depicts four (4) wheel assemblies. This may be useful for heavier items. It may also be useful to have a space between multiple wheel assemblies, so that one wheel assembly is on the v-track on the liftgate and another wheel assembly is on the v-track inside the shipping container, as shown in FIG. 51 Detail A. By way of example, the space between the wheel assemblies may be 8 inches.

The larger system may be comprised of components: (1) a truck, trailer, rail or overseas container. Each said container will have two upside-down V-shaped tracks installed (as displayed in FIGS. 66 and 67), (2) a lift gate designed to go on trucks and trailers that execute pickups and deliveries of the transportation modular components to residences or businesses (as displayed in FIGS. 72-77), (3) a pallet jack, specifically designed to fit the cargo container and transportation and storage modular components (as displayed in FIGS. 68-71), (4) a transportation or storage modular or pallets commodities transporter, also called a cargo container (as displayed in FIGS. 78-80, 89-93), and (5) distribution center loading docks on both ends, of which a dock on one end is used by a delivery truck to bring cargo containers in and take cargo containers out. A dock on the other end is used for loading docks and trailers. When a cargo container is consolidated into a warehouse the cargo container may be loaded onto a trailer if the trailer or a rail container is an overseas load. If, however, a load requires domestic shipping then a rail container may be placed on a train car and transported to a cargo container hub destination. A rail container may be stacked on top of another, thereby saving transportation cost. See FIGS. 85-93.

In one embodiment, a cargo container measures 107 inches in height, 96 inches in width, and 60 inches in depth. In this embodiment the transportation modular components may roll on the "V" tracks, enabling buffer space of 1 inch from each side and 1 inch on the top space to fit inside the vehicle, and each cargo container can fit 350 cubic feet of volume. Each pallet base can fit 2 pallets, and the commodities modular will fit the base of a cargo container, a Pallet, and commodities modular components. Each side will have four, five, or six wheels. The wheels will only engage when the cargo container is placed on the upside down "V" track. A cargo container, a pallet, and Commodities modular components are placed on a flat surface so that wheels will not engage.

A user may easily disassemble an empty cargo container in order to provide more efficient transportation. A cargo container base may be constructed out of aluminum or steel. Sides, door, and top of a cargo container are constructed out of aluminum, polyethylene, wood, and steel.

A cargo container may include a removable wall made of aluminum and polyethylene central to a container, front to back, that will allow a user to place two separate loads into a cargo container. This enables a plurality of customers to securely lock up individual shipments.

FIG. 1 is a picture of a cargo container base. This base can be made out of aluminum, steel, wood, or hard plastic. In one embodiment, the base width is 96 inches wide and 60 inches deep. In another embodiment, the base can be 120 inches deep. For bigger containers, the wheel may be made of steel or aluminum that has a bearing in center of said wheel. Each wheel is bolted onto the base flush with the bottom of the base. When the base is sitting on the ground each wheel will not engage until the "V" track meets with the wheels. In one embodiment, the base can be designed with 2-10 wheels on each side, depending on the size of the base. Bearings in center of the wheel allow the cargo that is placed on the cargo container base to distribute its weight evenly on each wheel on the base. Adding wheels on each side enables the system to move more weight. The channel (2, 1014, 1016) is the area where the forklift or pallet jack enters under the base to lift the base of the cargo container. The term lifting device is intended to include any device that may lift, for example, a forklift, pallet jack or similar device. In one embodiment a channel is 11 inches from each side of the base and the channel is 12 inch wide. When the base is picked up and the cargo is loaded unevenly in the cargo container, this alignment ensures that the cargo container will not tip to one side. This base is configured the same for other products, including a cargo container box, a pallet base, and a commodities transporter.

FIG. 2 is a picture of a front side of the base. The channel (2) is an opening that goes all the way through the base enabling a user to pick up a load with a custom pallet jack designed or forklift.

FIG. 3 is a picture of the base (13). (Detail A) is a diagram of how the wheels are installed. Each wheel is installed with a bearing and a screw for easy replacement. The channel (2) is an opening allowing a pallet jack or forklift to lift the base.

FIG. 4 is a picture of a side of the base. In one embodiment the depth of the base can be 60 inches. In another embodiment it may be 120 inches. The depth depends on the size of the cargo container. In FIG. 4 the depth is 60 inches.

FIG. 5 is a picture of a cargo container box mounted on a base as described in the description for FIG. 1. A box is designed to enter a truck, a trailer, an overseas container, or a rail trailer, leaving, in one embodiment, 1 inch on each side and top for wheels to be placed on a "V" track. There may be an opening (11) in front of the base allowing a grab hook installed on a pallet jack to hook a box on for easy pulling and for pushing the cargo container into said truck, trailer, overseas container, or rail trailer. This opening is also used when the hook has entered the opening. This will ensure that the cargo container box will not tip or move off the forklift or pallet jack. This also depicts a front view of the cargo container showing wheels (1) and where a forklift or pallet jack enter to move the cargo container.

FIG. 6 is a picture of a cargo container box. There may be a rod (3) that goes from top to bottom on each end with a hook that latches into latch (4), mounted onto the cargo container. The latch (4) that enables the hooks from rod (3) to hook into it in order for doors to lock. There may also be a handle (5) attached to rod (3). This enables a user to lock said doors with a pad lock. There may also be a 2-inch rubber bumper (7) that is installed in four corners and two middle areas of a box. This rubber bumper (7) prevents and adjacent box from rubbing up against the mechanics or arms of the door. When loading a cargo container into a truck these rubber bumpers stop boxes from rubbing together. There may also be hinges (8) that are mounted on a door and a frame allowing doors to swing open and close. These hinges open a door on a side of the box for easy loading. There may be a hook (9) that holds a door open when being loaded. This hook is latched into a latch holder (10). The latch holder holds the latch (9) in lock position to prevent the doors from slamming closed. There may be a hole (11) designed into the base for the hook from the pallet jack or forklift for pushing and pulling the cargo container and to prevent the box from tipping forward.

Figure 7:
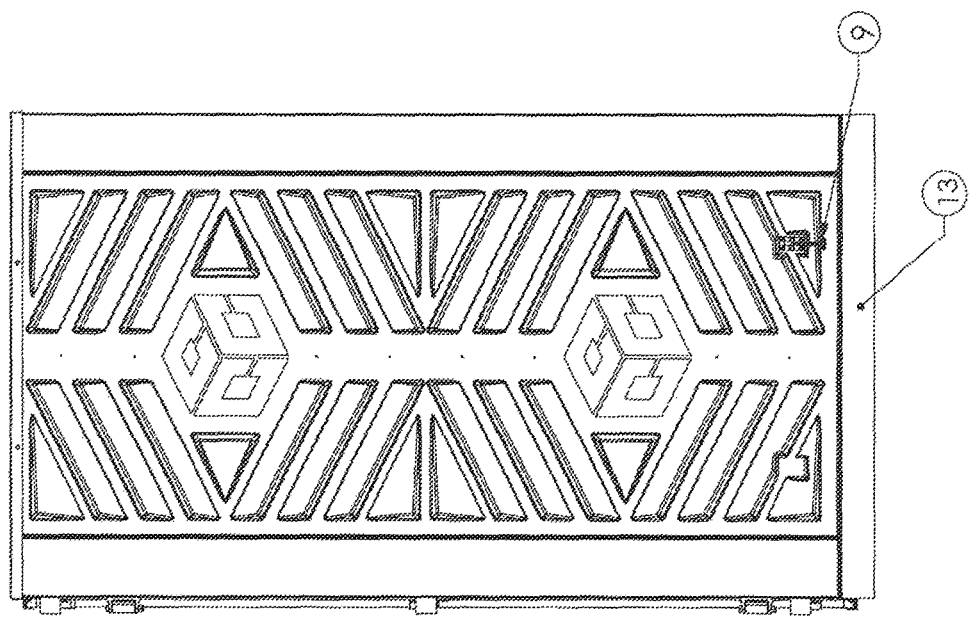
FIG. 7 is a picture of the side of the cargo container.

FIG. 7 is a picture of the side of the cargo container box. There is a base (13) and a latch (9) that holds a door in open position.

Figure 8:
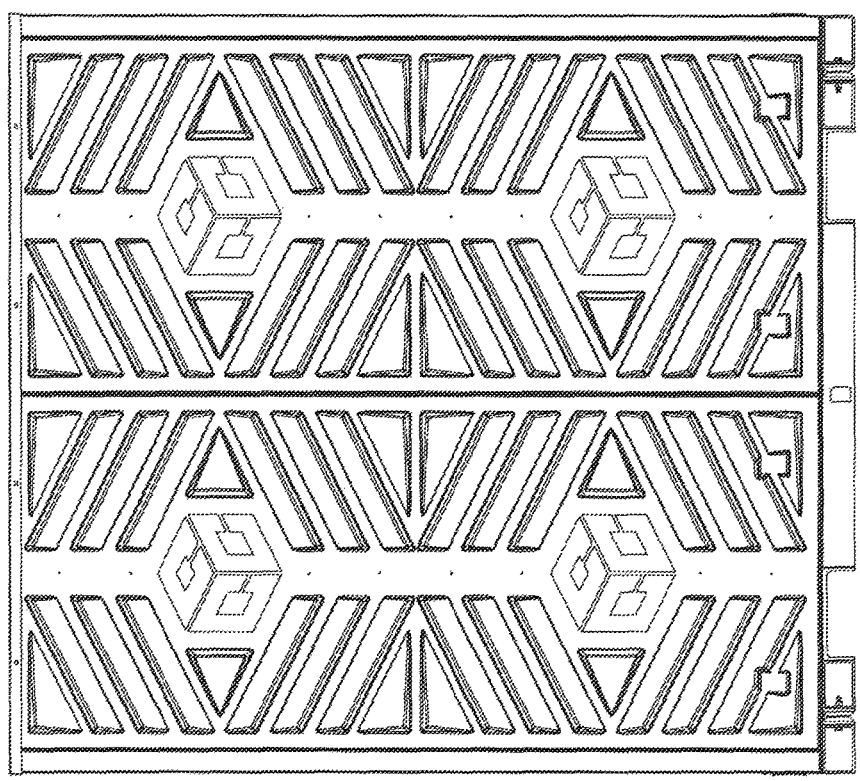
FIG. 8 represents is a picture a back view of the cargo container.

FIG. 8 represents is a picture a back view of the cargo container.

Figure 9:
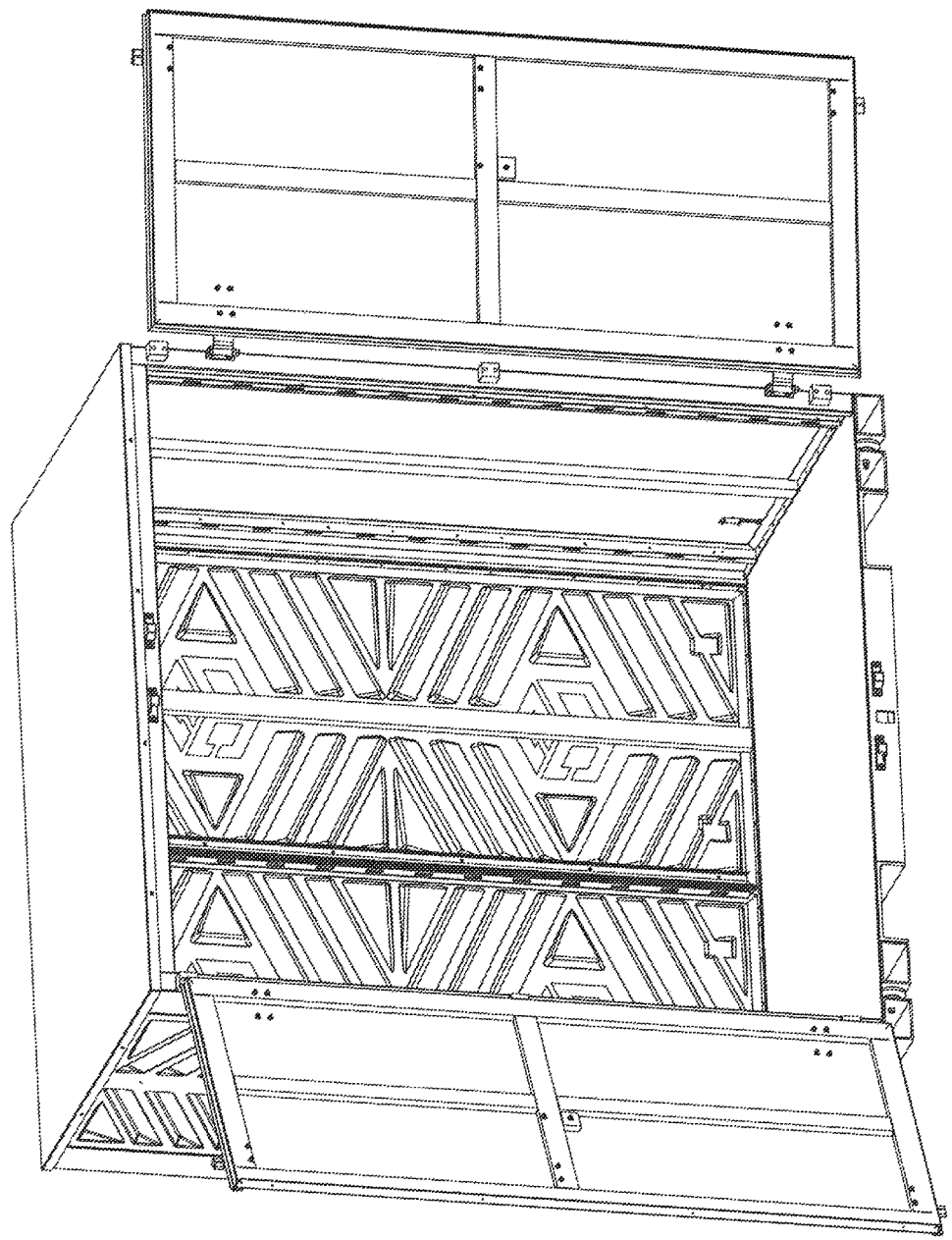
FIG. 9 is a picture of a cargo container with open doors.

FIG. 9 is a picture of a cargo container with open doors.

Figure 10:
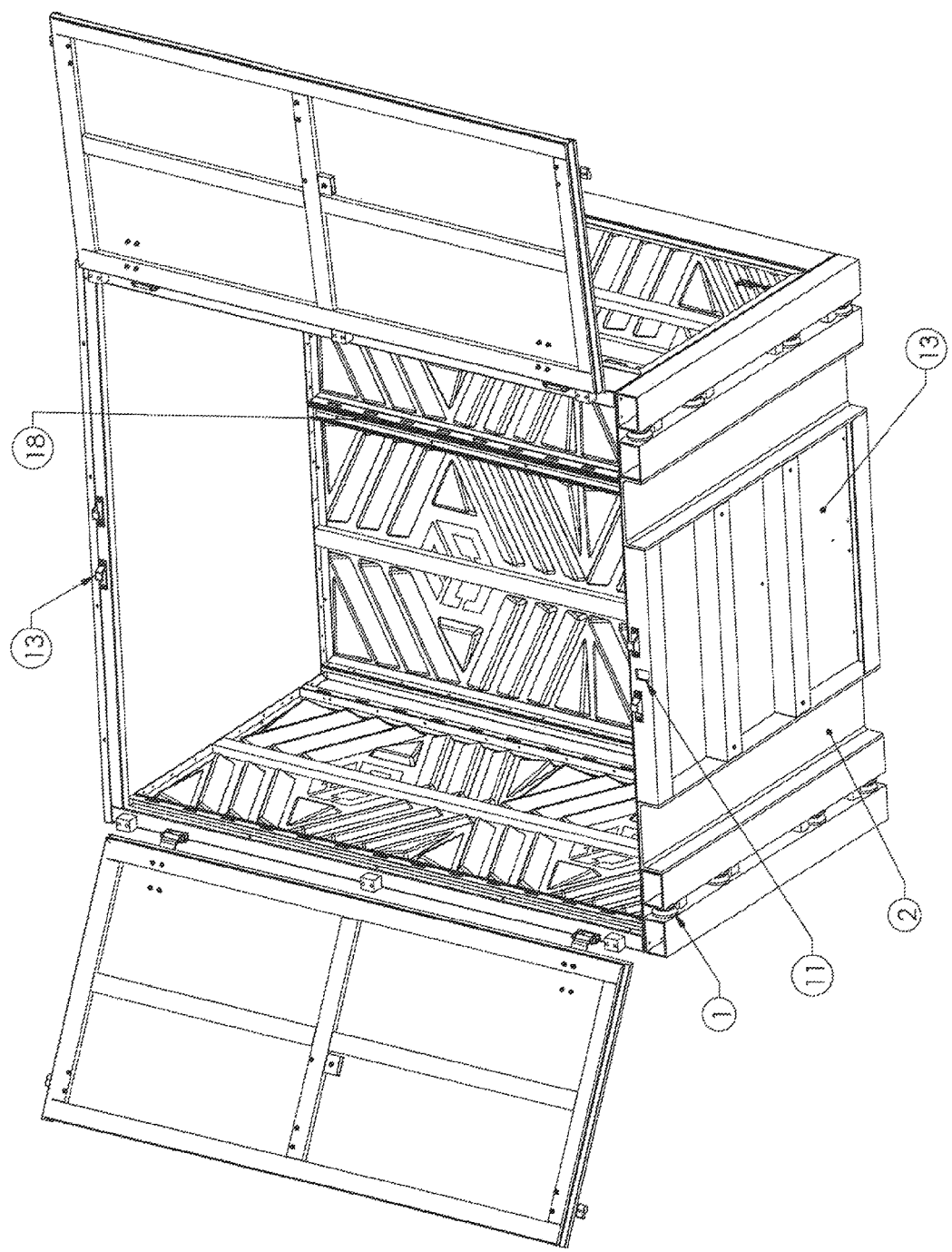
FIG. 10 is a picture of the open cargo container box at an angle showing the base.

FIG. 10 picture of an open cargo container box, showing an underside of a base with wheels (1), a channel of a base, a hole (11) in a base for a hook in a pallet jack for pushing and pulling, and an e-track system (18) installed on each side in front and back of a cube to enable strapping down of loads.

Figure 11:
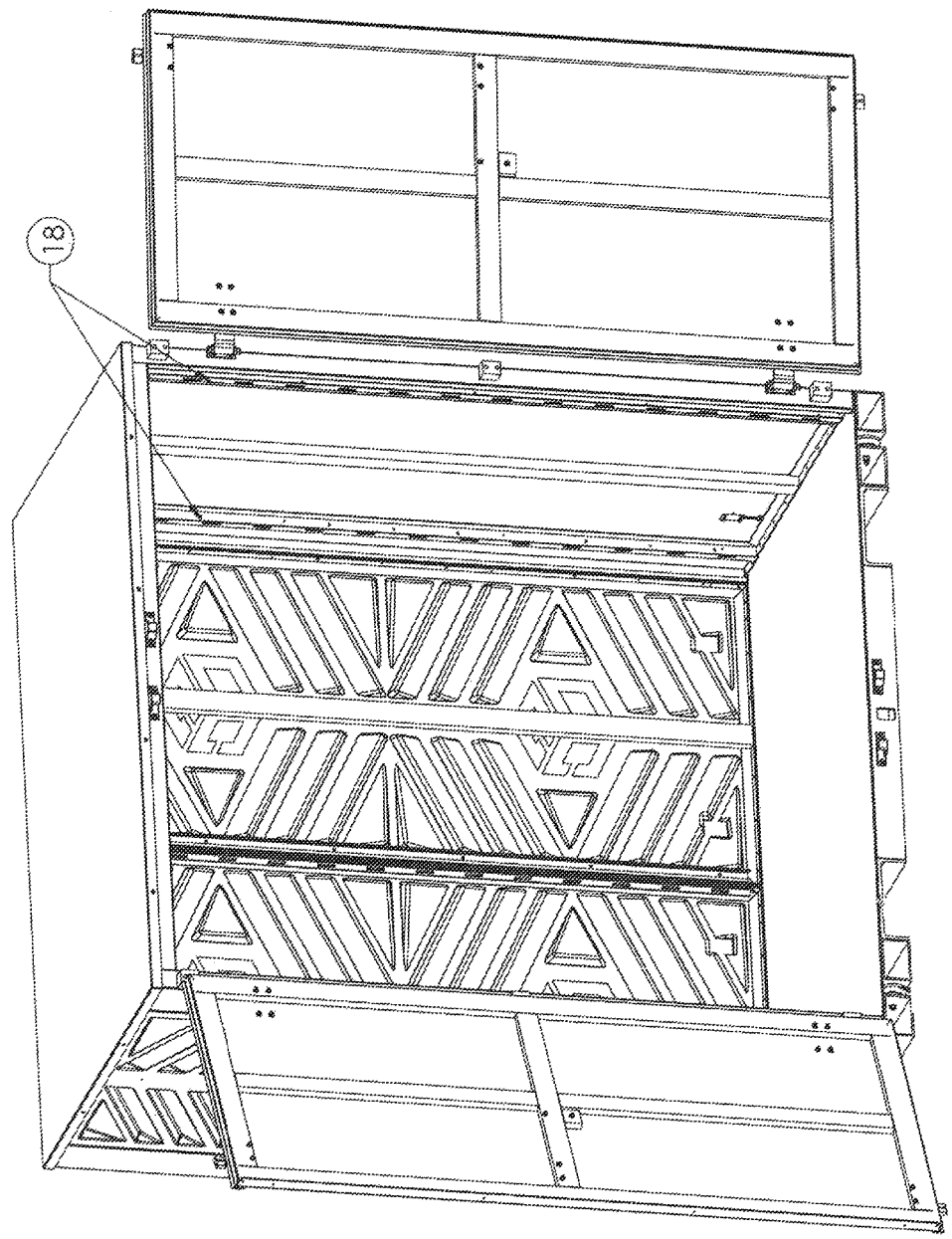
FIG. 11 is a picture of a cargo container box at an angle also depicting the base.

FIG. 11 is a picture of a cargo container box at an angle showing where e-tracks (18) are installed. The e-tracks are installed front and back on both sides of the cargo container.

Figure 12:
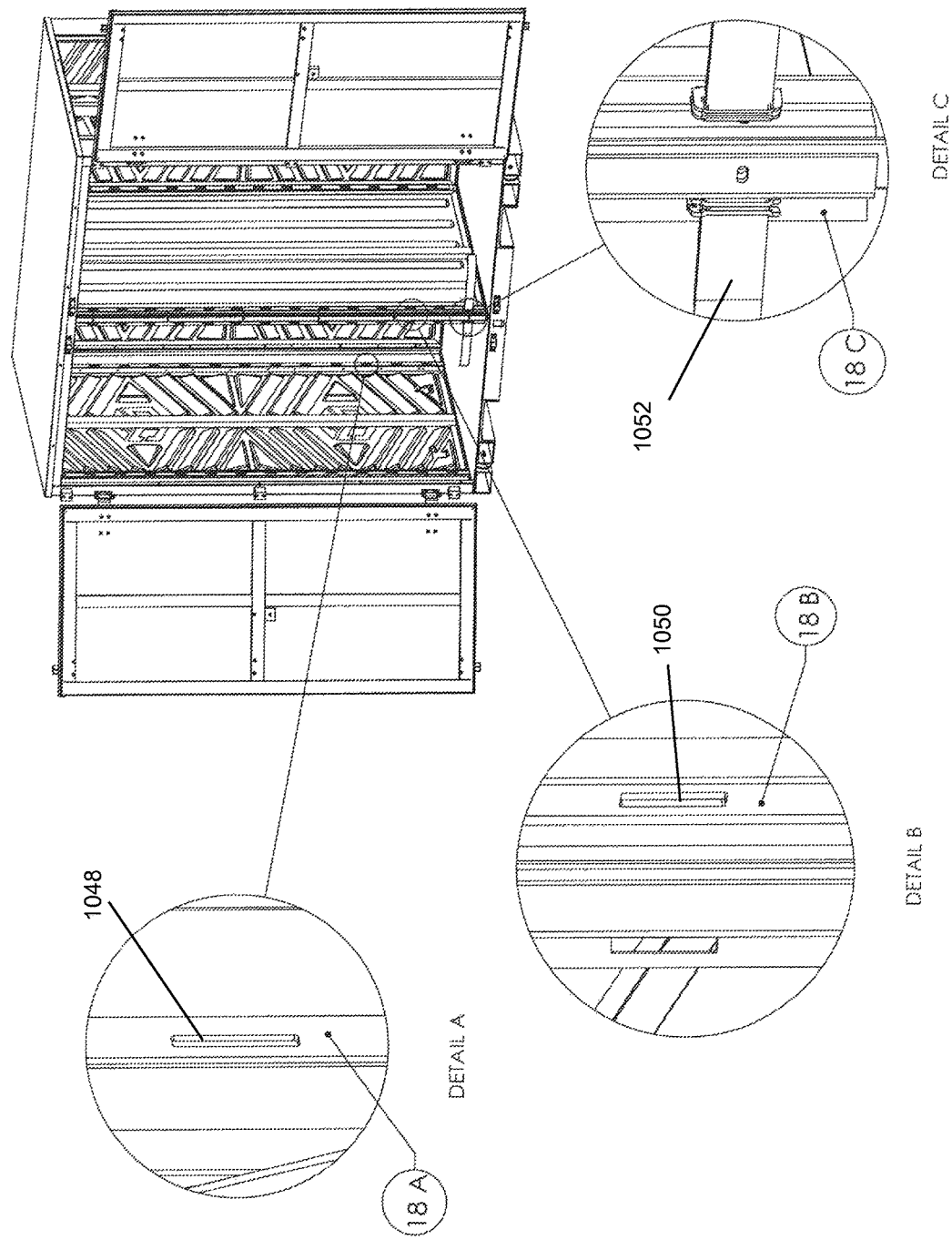
FIG. 12 represents a picture of an e-track or rails.

FIG. 12 represents, at (18A), a picture of an e-track. (18B) shows a picture of the e-track installed on a center partition wall that is installed in a cargo container box. The partition wall divides the box in half to enable transporting of smaller loads. (18C) is a closer view of the e-track with a strap hook hooked into the e-track.

Figure 13:
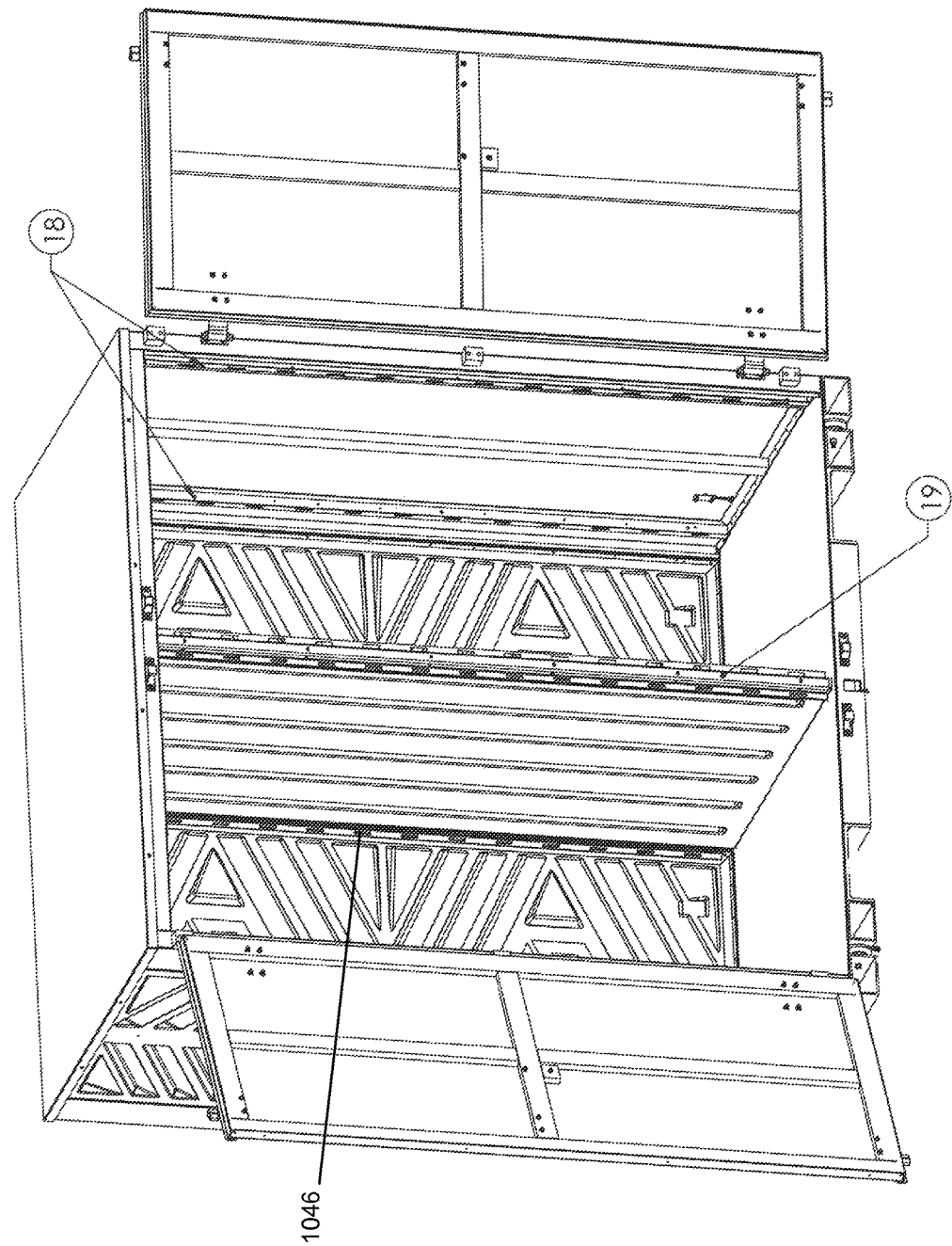
FIG. 13 is a picture of the cargo container with a base and an interior partition wall.

FIG. 13 is a picture of the cargo container with a base and a partition wall. A removable wall is present in the center of the box for smaller loads. This allows the customer to fill up his/her portion of the cargo container and lock a door, securing cargo. As shown there is e-tracking in the front and back of each side. There is also a partition wall (19) that shows e-tracking attached to it for securing loads when the cargo container has a partition wall.

Figure 14:
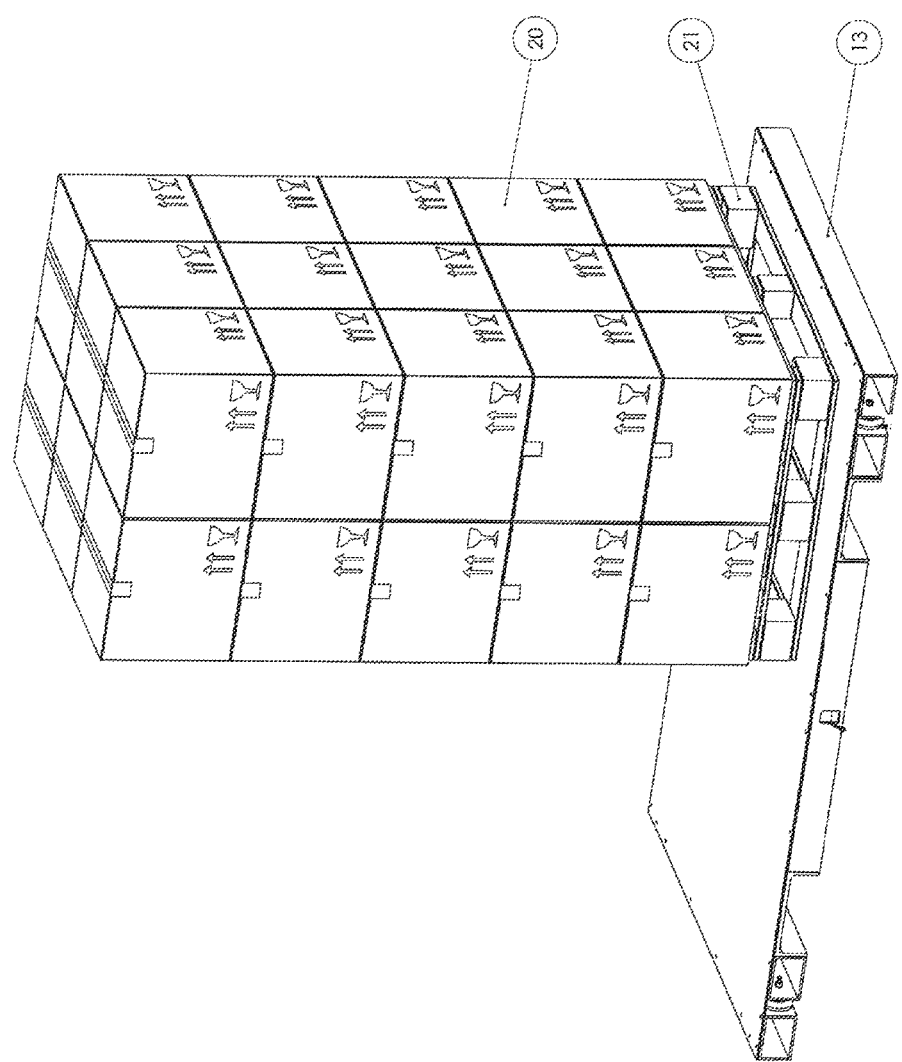
FIG. 14 shows a picture of a base with a pallet of freight.

FIG. 14 shows a picture of a base (13). On top of the base is a pallet (21) and on top of the pallet are freight boxes (20). This demonstrates that the base can be used for many different purposes.

Figure 15:
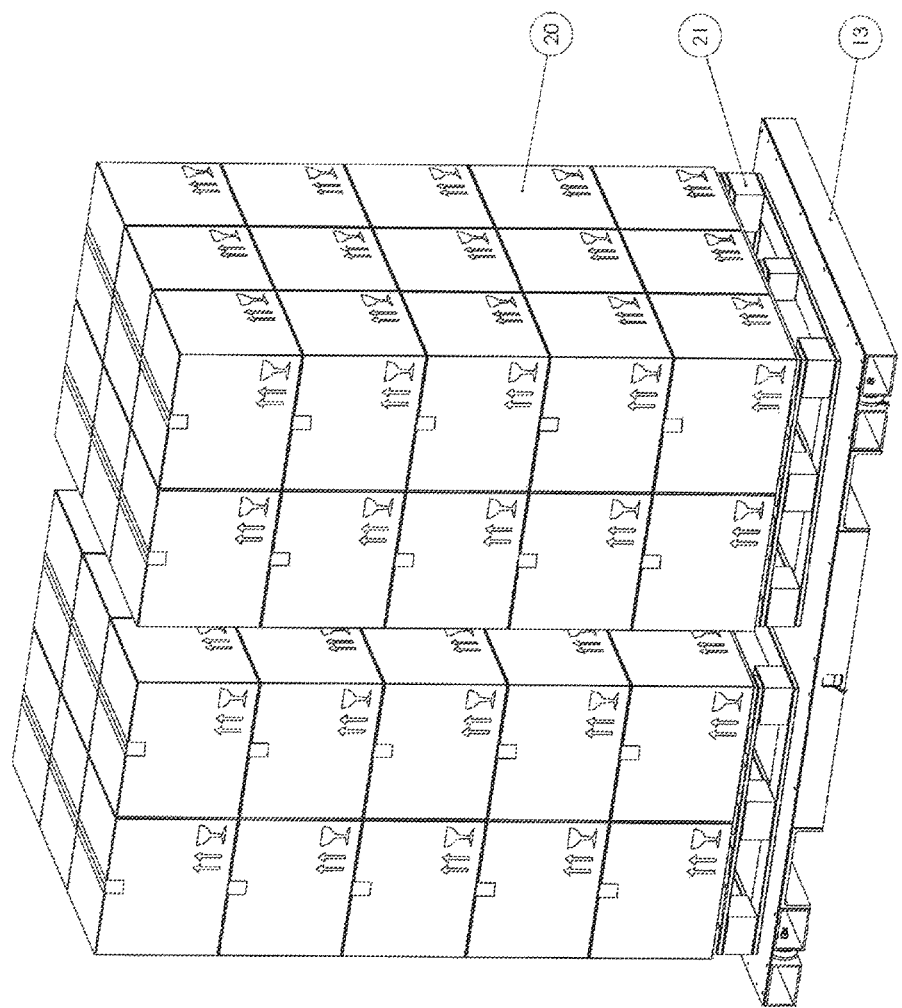
FIG. 15 is a picture of a base with two pallets of freight.

FIG. 15 is a picture of a base (13) with two pallets (21). On top of the pallets are freight boxes, with both pallets of freight being placed on the base (13).

Figure 16:
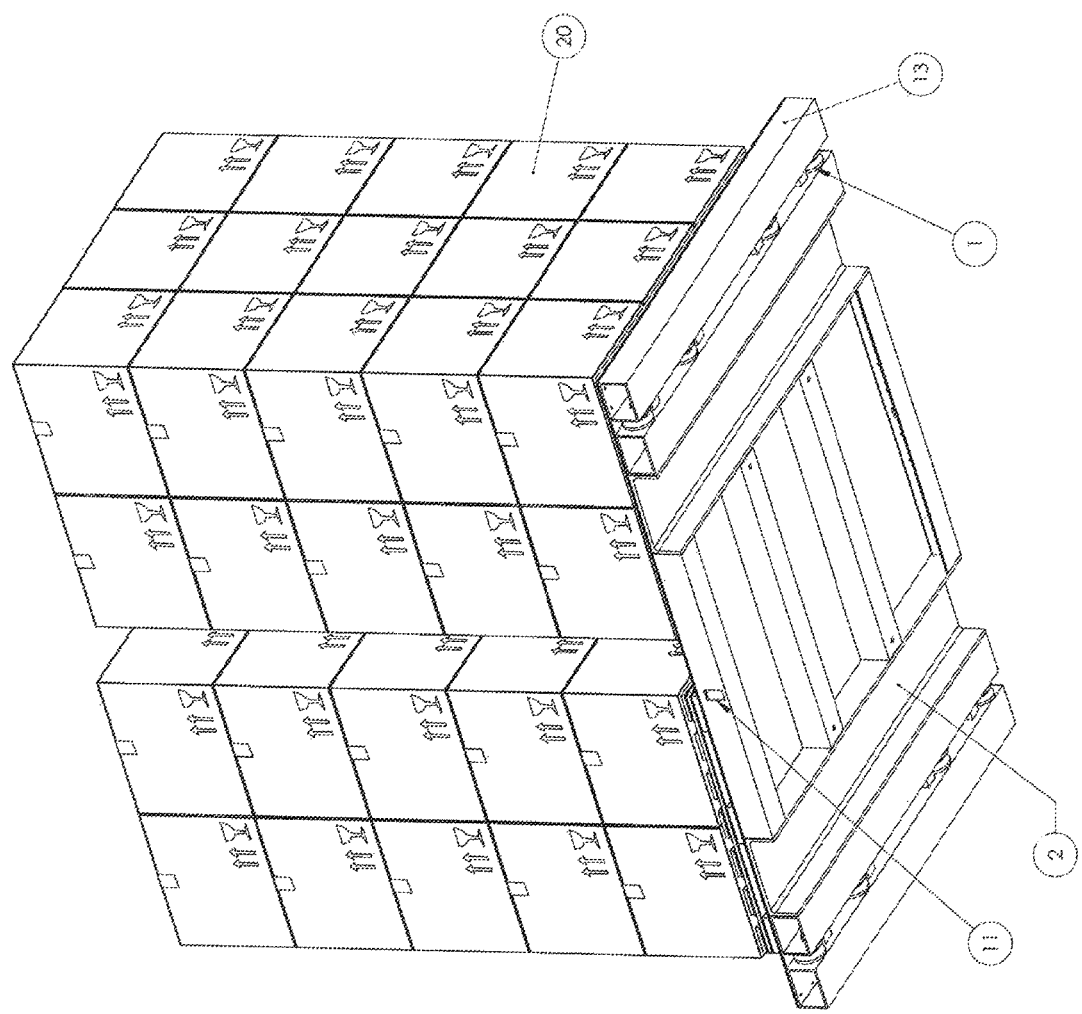
FIG. 16 is a picture from a different angle showing a base loaded with boxes of freight.

FIG. 16 is a picture from a different angle showing a base (13) loaded with (20) boxes of freight. FIG. 16 also shows wheels in the base, the channel (2) is where forks go in and hole (11) in the base is where a hook goes in from a fork lift.

Figure 17:
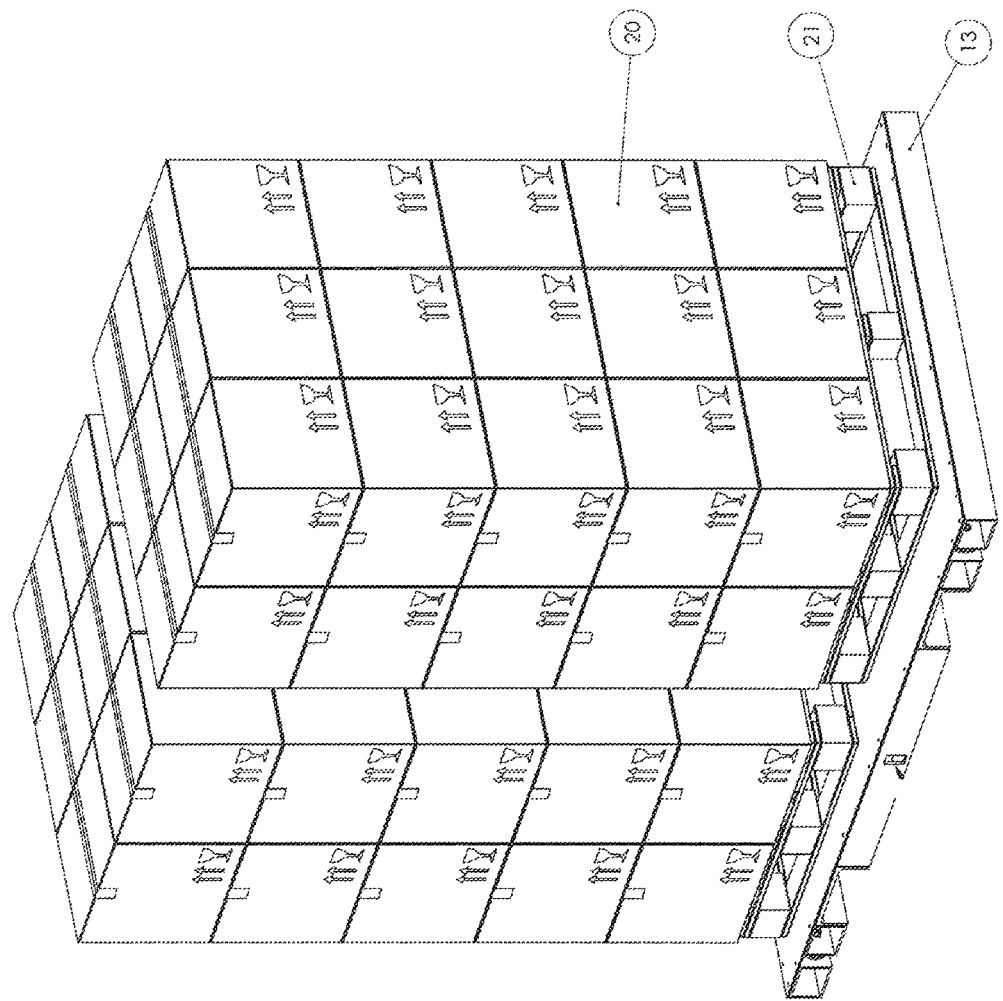
FIG. 17 represents a side look demonstrating that pallets with cargo or freight can be loaded onto a base.

FIG. 17 represents a side look demonstrating that pallets with cargo or freight can be loaded onto a base (10).

FIG. 18 is a picture of a commodities transporter (24) built on a base (13). As with all embodiments, the cargo container may be attached to or merely sit upon the base. This device can be used for rice, beans, coal, fruit, or the like—thereby demonstrating a more wide-ranging application. There may be a removable top for dumping cargo from the top. Once the cargo reaches its destination the cargo will be dumped from the bottom as displayed in FIG. 19. Door (22) is pulled to open as the bottom can release the transported items to dump from the bottom. Steel aluminum frame (23) holds the commodities transporter in place. The wheels (1) are shown and channel (2) for lifting a commodities transporter.

FIG. 19 is a picture of a base (10) from underneath a commodities transporter with an opening as a dumping section for a commodities transporter (22) door pulled forward. (25) is a hole from a commodities transporter present in order to enable release of the load. FIG. 20 is a picture of a different angle of a commodities transporter showing a base (13) and door (22) for the commodities transporter. There is an opening (25) in the bottom interior, behind door (22) where cargo is released.

FIG. 21 is a side view of a commodities transporter.

Figure 22:
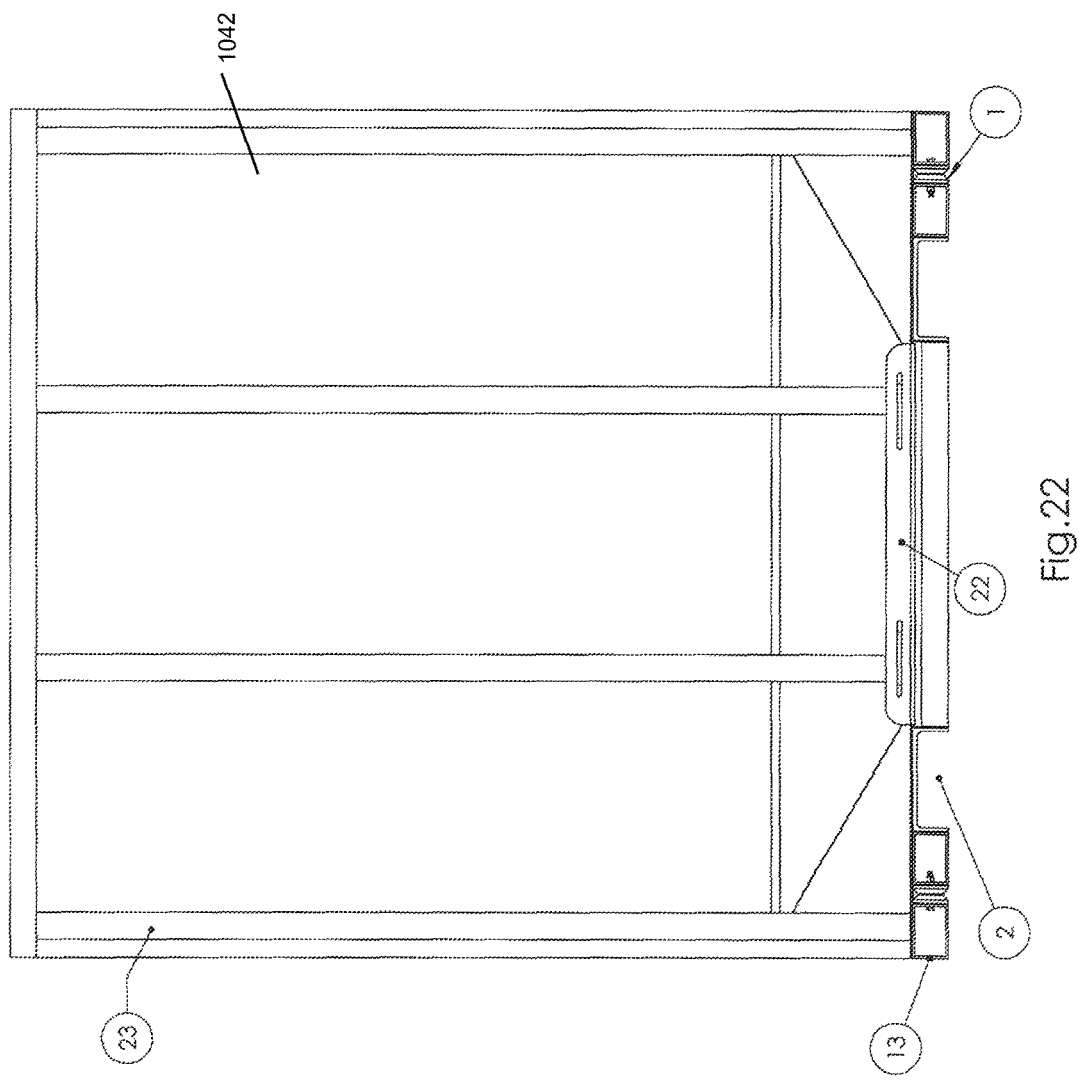
FIG. 22 is a back view of a commodities transporter.

FIG. 22 is a back view of a commodities transporter.

Figure 23:
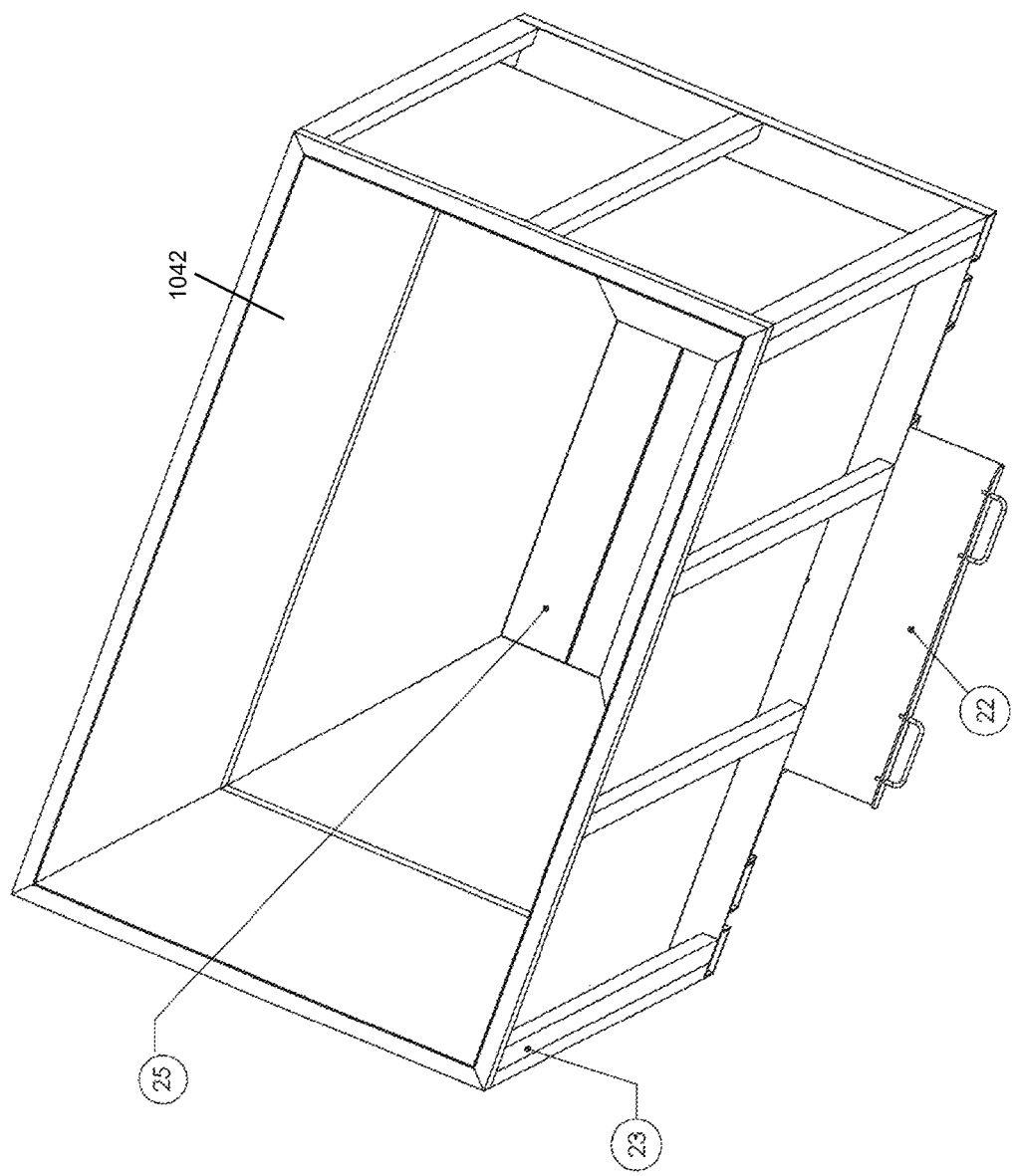
FIG. 23 is a top view of a commodities transporter.

FIG. 23 is a top view of a commodities transporter.

Figure 24:
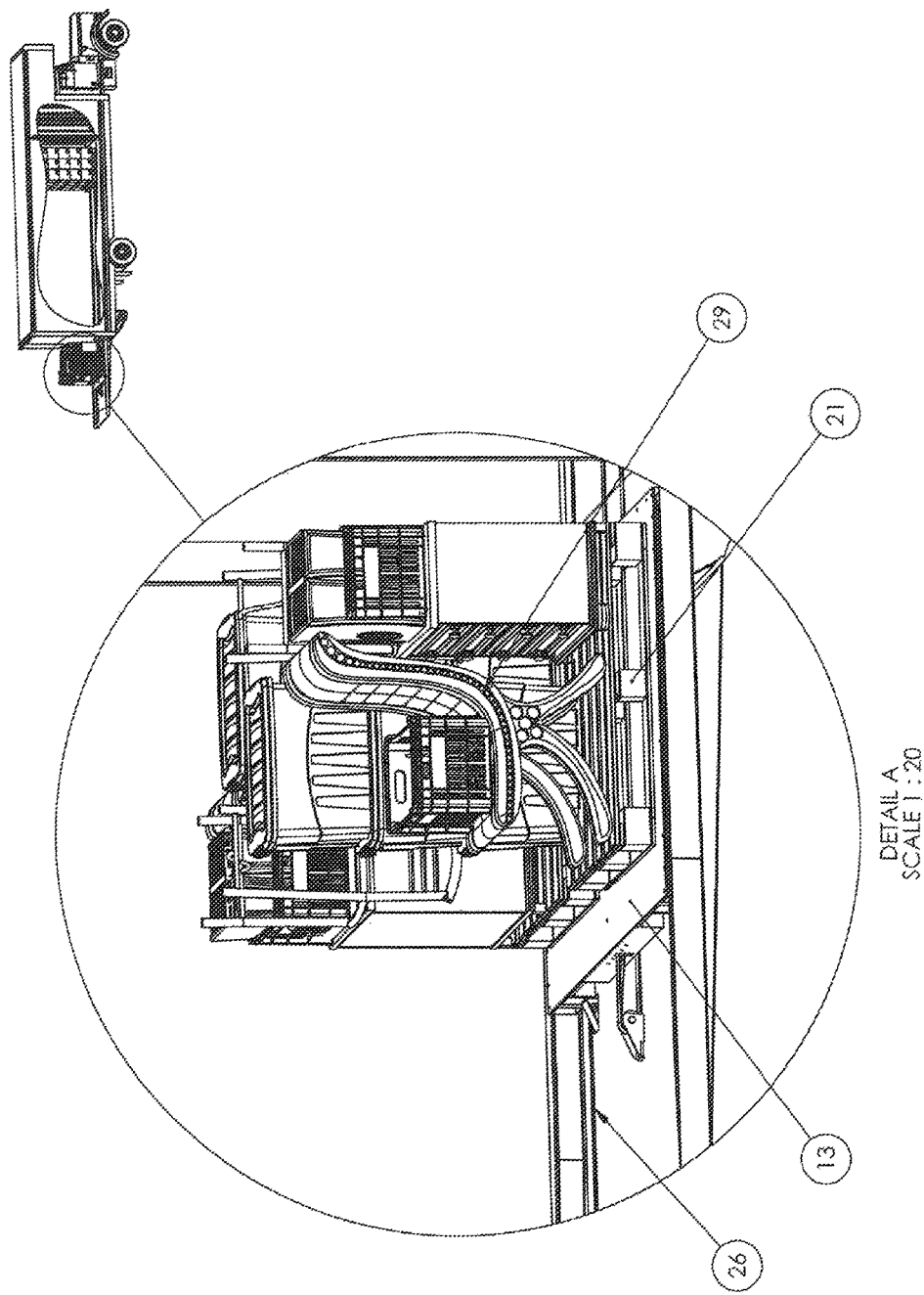
FIG. 24 shows another application for use of a base.

FIG. 24 shows another application for use of a base (13). A pallet (21) is on top of the base (13) and freight (29) is on top of the pallet (21). The base is rolling on a lift gate entering into the truck—the base is rolling off the "V" track (26), which allows it to roll straight into a truck for example.

Figure 25:
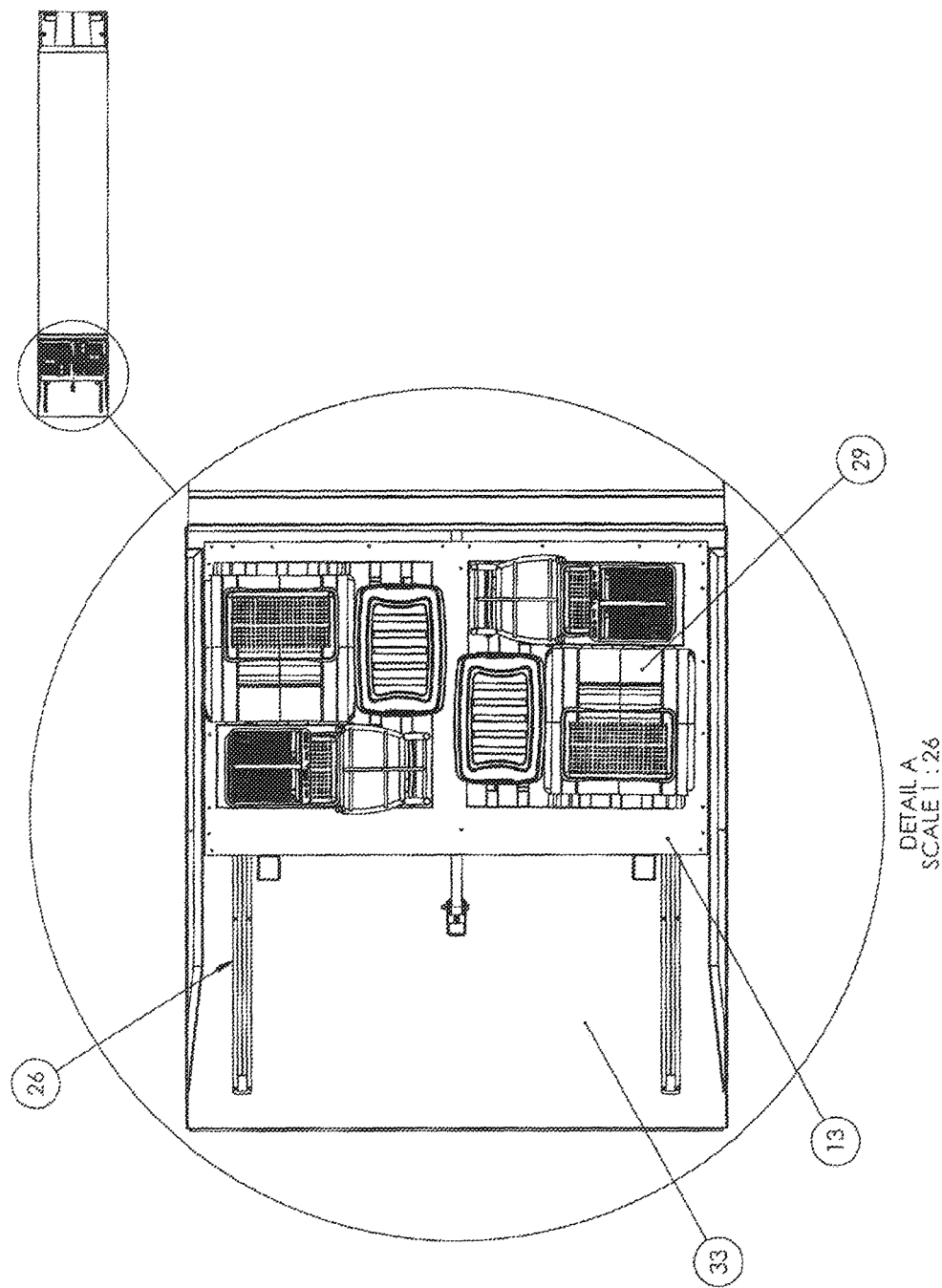
FIG. 25 shows an aerial picture of freight on top of a pallet and the pallet on top of the base.

FIG. 25 shows an aerial picture of freight (29) on top of a pallet (21) and the pallet on top of the base (13). The base is rolling on a "V" track (26) that is installed on a lift gate (33) allowing cargo to roll right inside a truck, for example.

Figure 26:
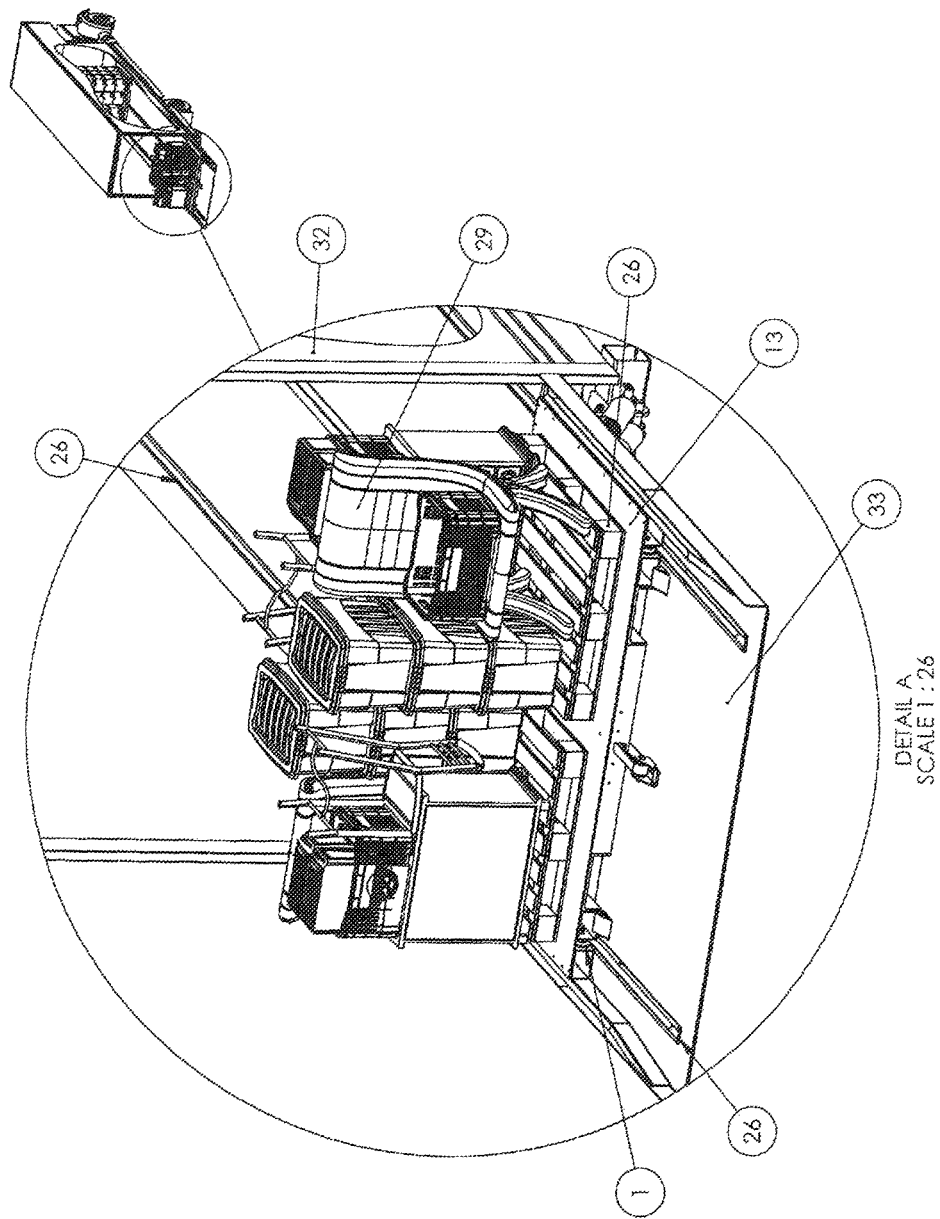
FIG. 26 shows another angle of freight going inside a truck, for example.

FIG. 26 shows another angle of freight going inside a truck, for example. Freight (29) is on top of a pallet (21). The pallet is on top of a base (13). The base is rolling with wheels (1) on a "V" track (26) with the "V" track installed on the lift gate (33). Cargo enters in a truck (32). The "V" track is installed in the truck (32).

Figure 27:
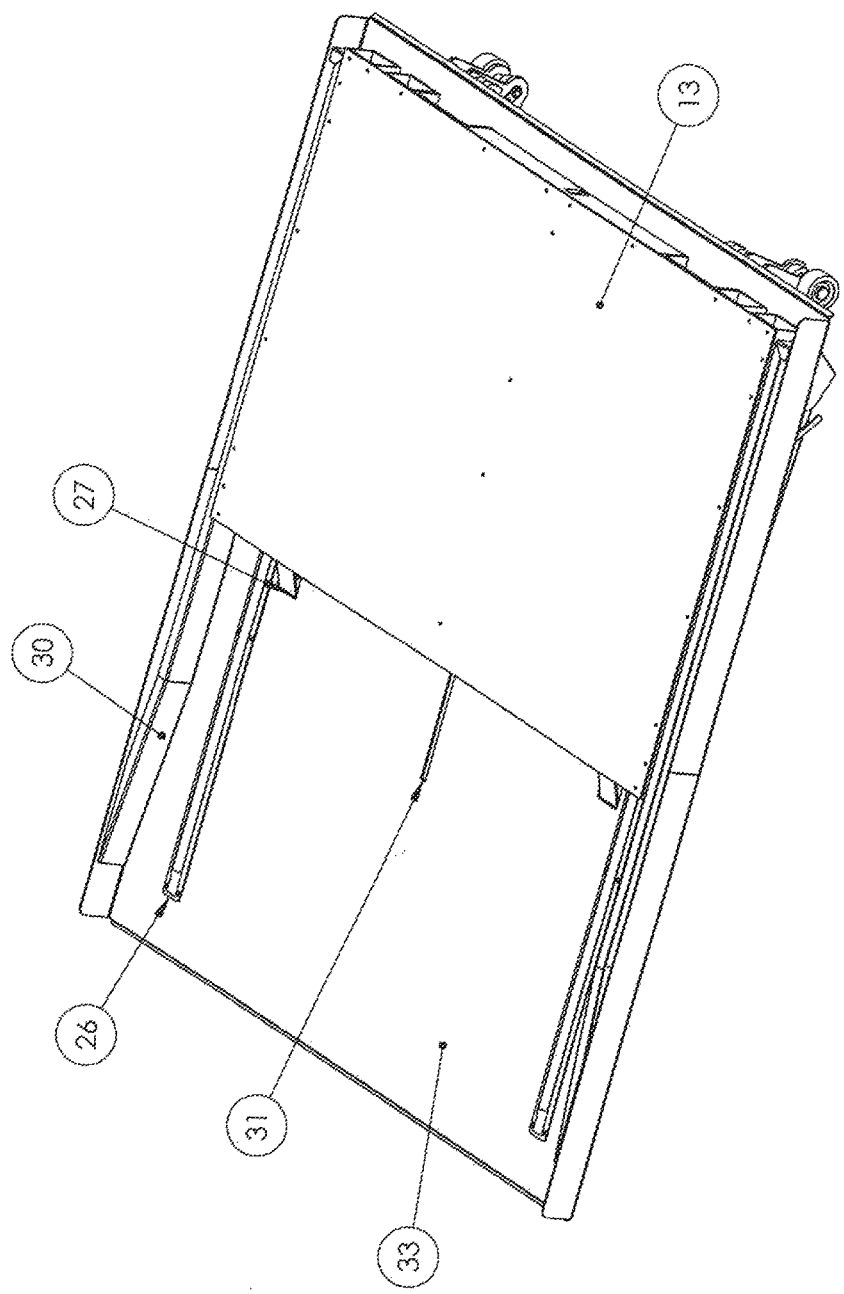
FIG. 27 is a picture of a lift gate and a base rolling on V-shaped tracks and behind the base is the foot stoppers.

FIG. 27 is a picture of a lift gate (33) and a base (13) rolling on a "V" track (26) behind the base (13). Displayed are foot stoppers (27). The foot stoppers will not allow the base to roll back once the base in placed on a "V" track. The foot stoppers are released when a user pushes down past the point of the opening, which allows a foot stopper to come up and hold the base in place. The side rail (30) allows the base to be loaded onto the lift gate "V" track guiding base wheels (1) and the base of the cargo container to line up with a "V" track on the lift gate. Once the cargo container box is loaded onto the lift gate then a user can release the foot stoppers on both sides (27). This keeps the cargo container base from rolling backward. Once the cargo container is secure then a user can move a hook arm into place. The hook arm will be placed into the opening in the base (11).

Figure 28:
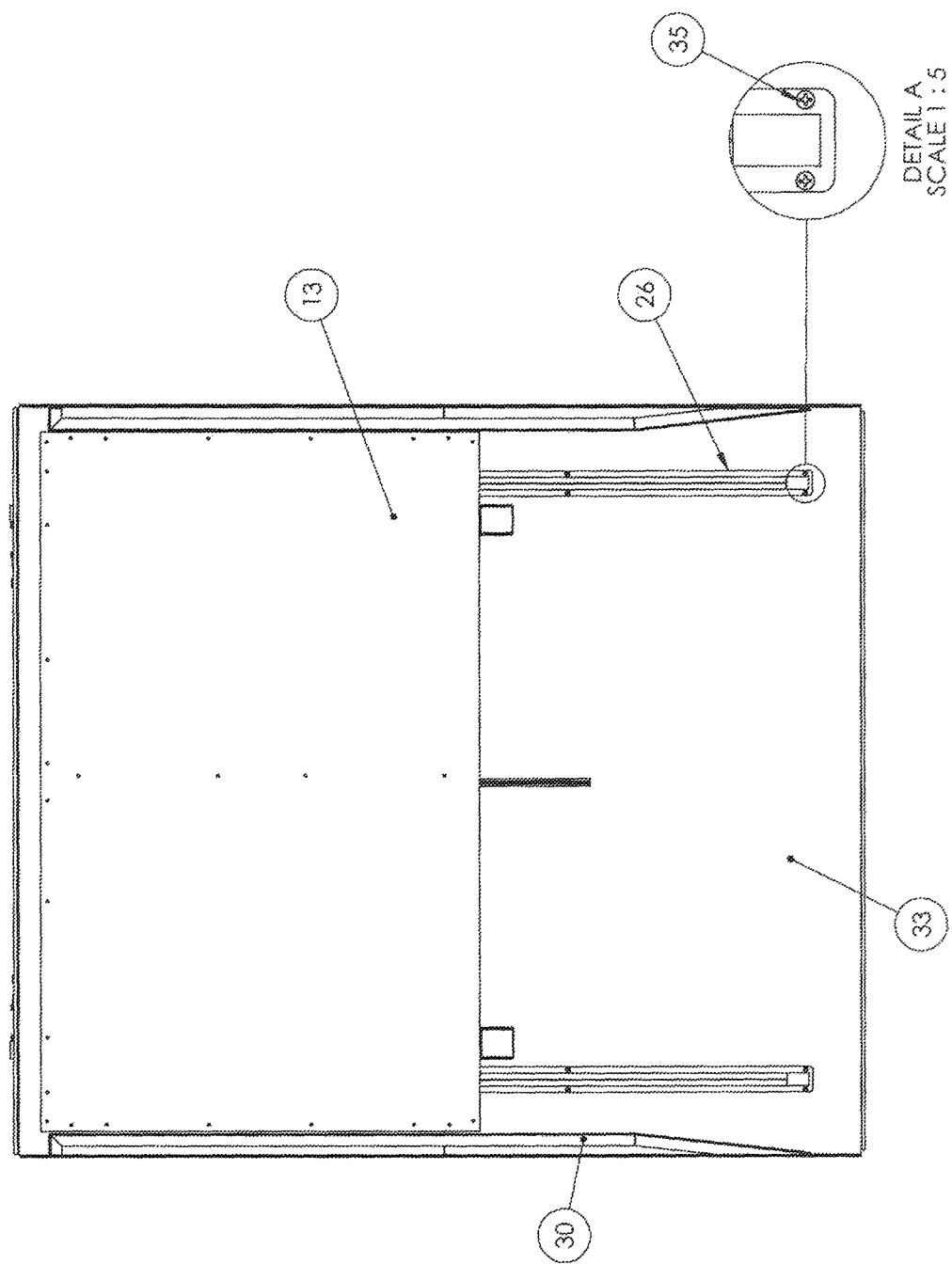
FIG. 28 is a picture of a base of the cargo container on the lift gate.

FIG. 28 is a picture of a base (13) of the cargo container on the lift gate (33). The lift gate shows a "V" track (26). On the "V" track are screws (35) that hold the V track into place. The "V" track is removable upon unscrewing of the screws (35).

Figure 29:
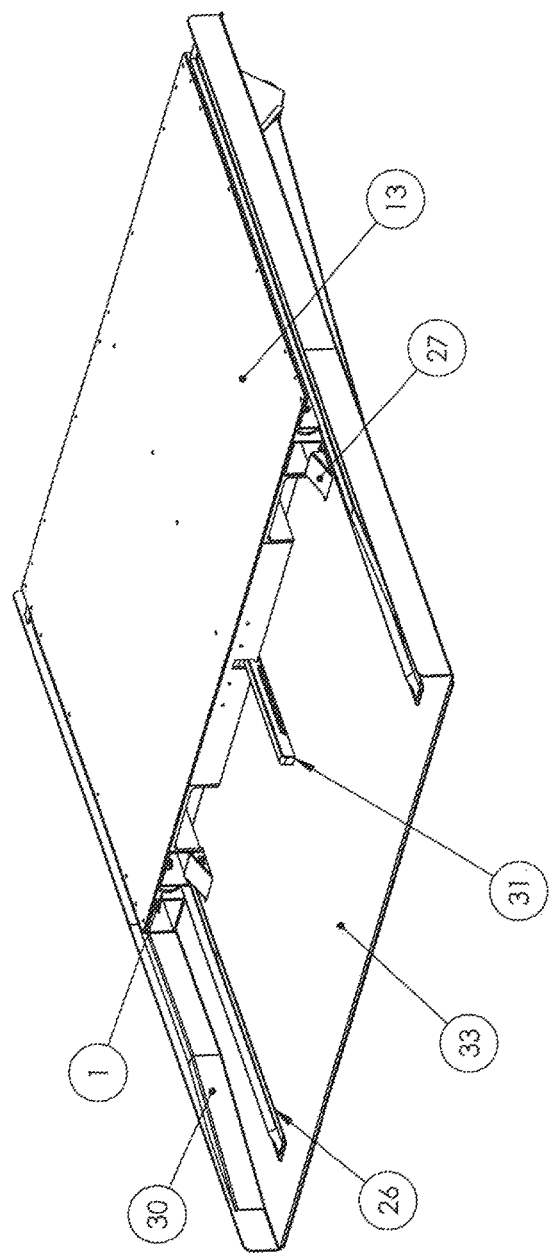
FIG. 29 is a picture of side view of a lift gate with the base, two V-shaped tracks, two foot stoppers, an arm hook, a wheel from a base, and a side rail.

FIG. 29 is a picture of side view of a lift gate (33) with the base (13), two "V" tracks (26), two foot stoppers (27), an arm hook (31), a wheel (1) from a base, and a side rail (30).

Figure 30:
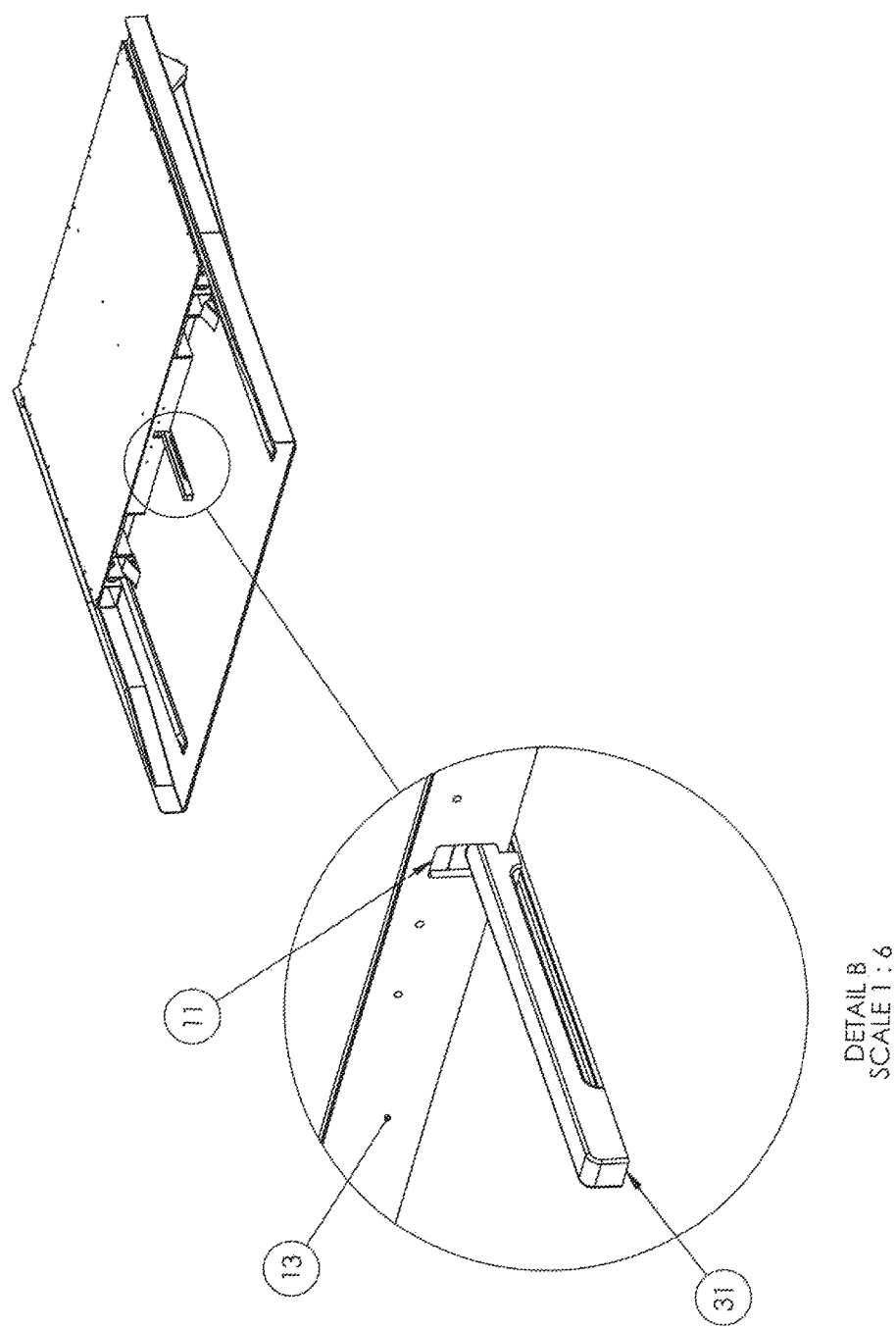
FIG. 30 is a picture of a front of a base with a center portion opening.

FIG. 30 is a picture of a front of a base with an opening (11). This opening is for a hook arm (31). The hook arm grabs a platform and pushes the base into a truck, for example.

Figure 31:
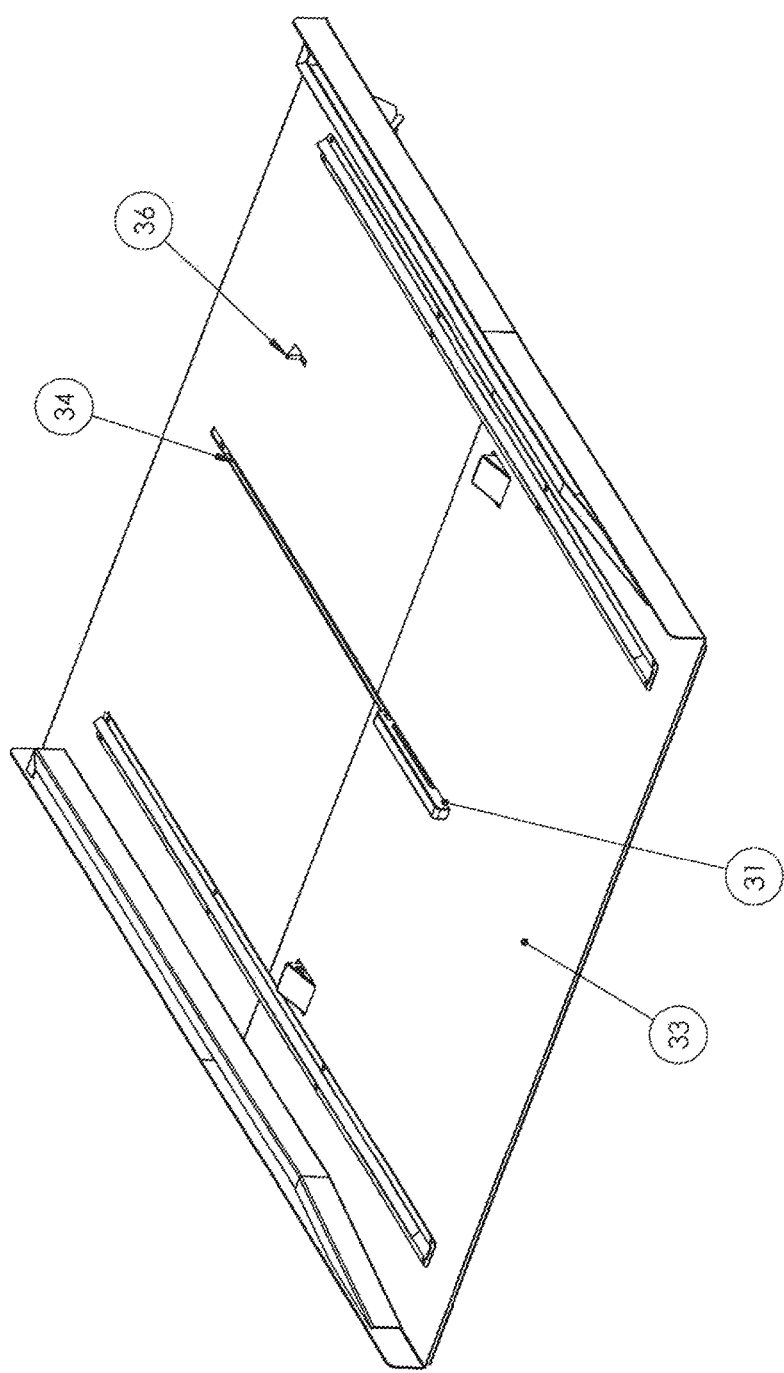
FIG. 31 is a picture of a lift gate with a screw arm that is attached to sliders that hold a hook arm in place.

FIG. 31 is a picture of a lift gate (33) with a screw arm (34) that is attached to sliders that hold a hook arm in place. The lever stopper (36) is a lever that prevents a base of a cargo container from rolling inside a truck, for example.

Figure 32:
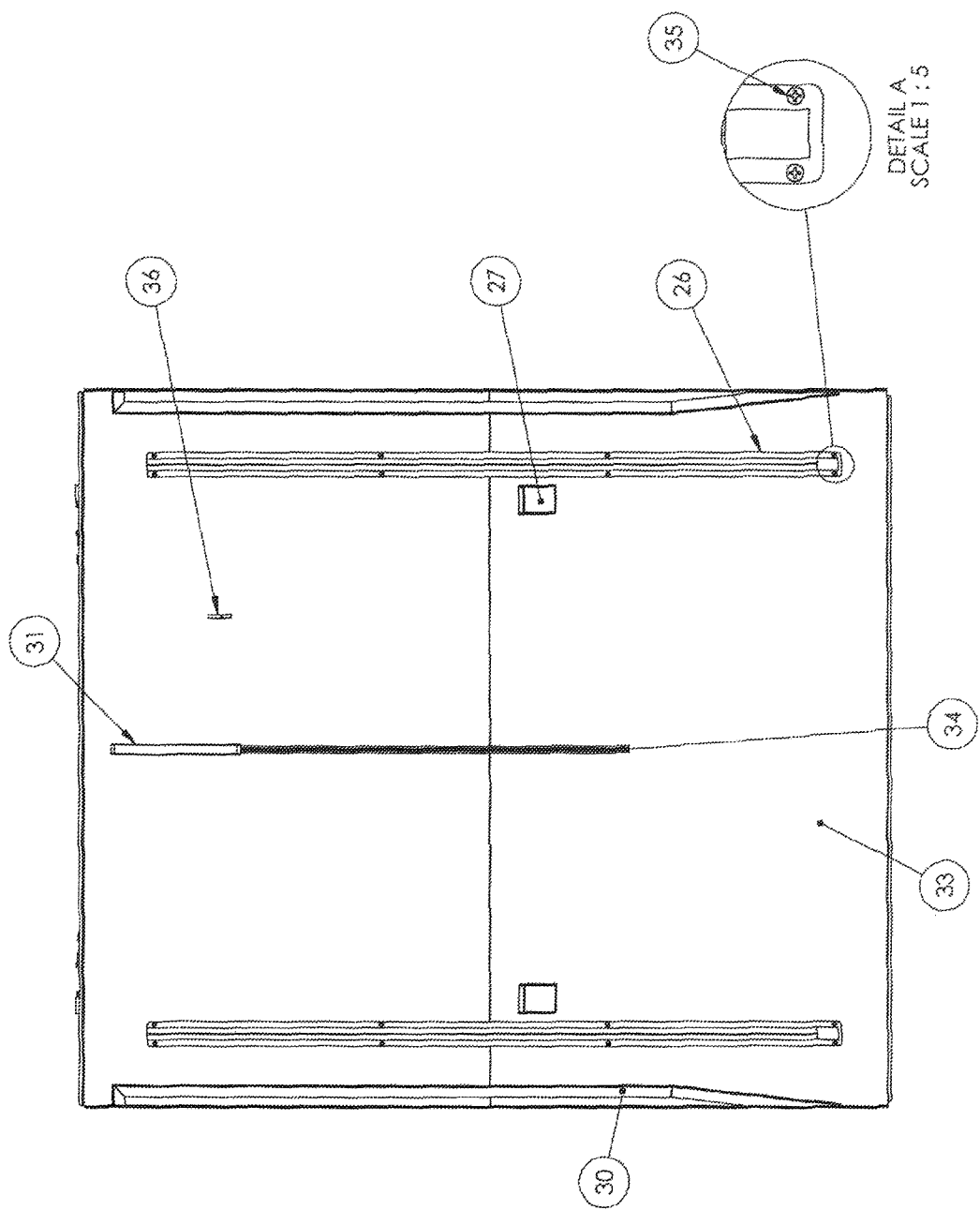
FIG. 32 is a picture of a lift gate with the side rails that are used to guide a base of the cargo container onto V-shaped tracks where wheels or rollers line up, allowing the base to slide along a V-shaped track.

FIG. 32 is a picture of a lift gate (33) with side rails (30) that are used to guide a base of the cargo container onto "V" tracks where wheels or rollers line up, allowing the base to slide along a "V" track (26). If a user wanted to use the lift gate with no "V" track on it, the user can remove screws (35) which would in turn allow the user to remove a "V" track. A user may use foot stoppers to stop the base of the cargo container from rolling back. A lever stopper is used to prevent the base of the cargo container from rolling forward. To release the lever stopper there is an arm on a side of a liftgate. When a user pushes said lever stopper down they will enable the lever stopper go into said gate, allowing the base to move forward into a truck, for example. Also shown in FIG. 32 is a hook arm (31). Attached to the hook arm are sliders, part of a screw arm (34).

Figure 33:
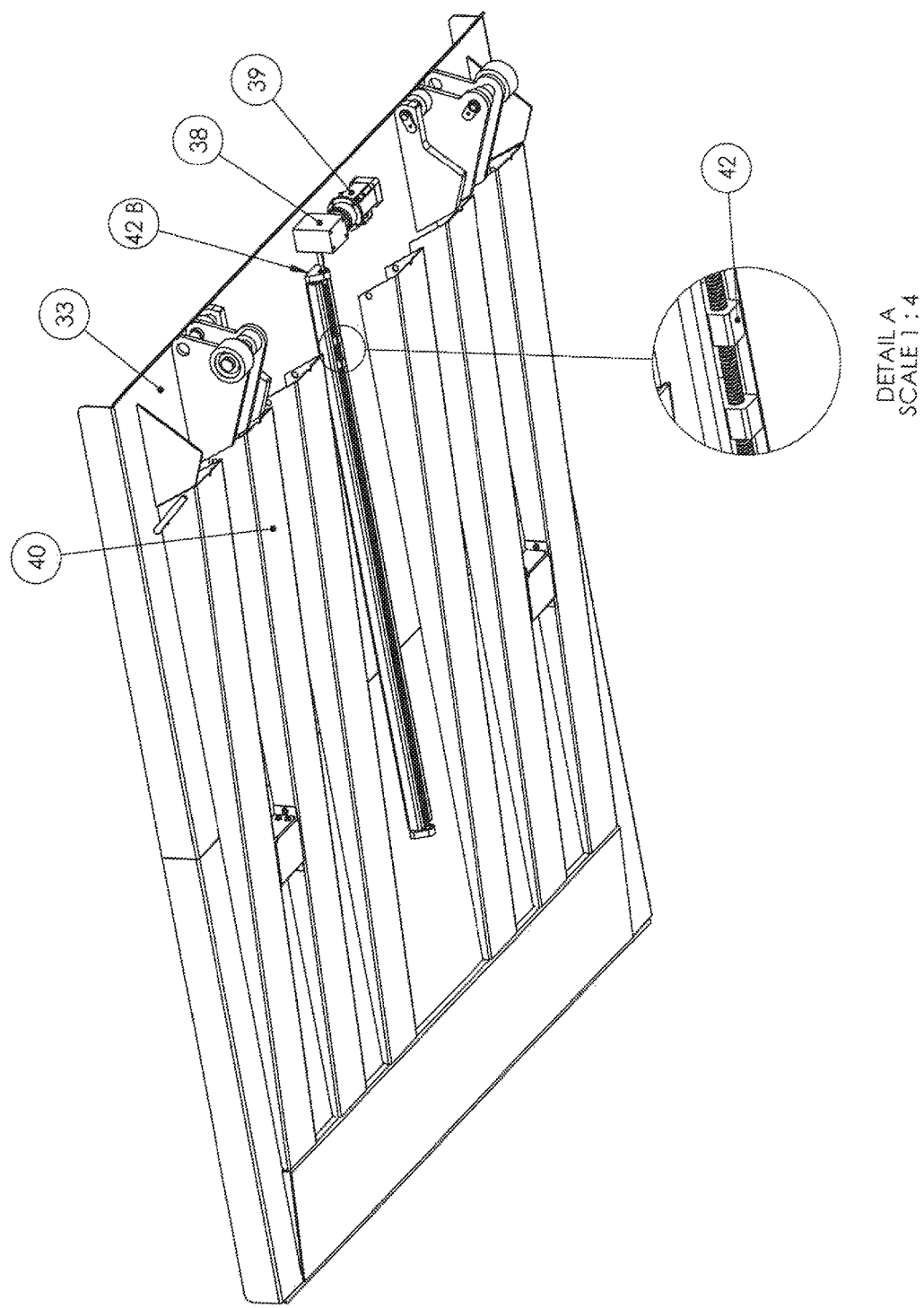
FIG. 33 is a picture of an underside of a lift gate.

FIG. 33 is a picture of an underside of a lift gate (33). The figure shows an electric motor (39) that is attached to a gear box (38) that is attached to a triangle arm (42B). The Triangle arm is attached to a screw arm (34). Another side of the screw arm is attached to (42A) allowing a slider to go back and forth. Attached to the slider (42) on top of the lift gate is an arm hook that attaches to the base of the cargo container. This whole system has a cover (40) that will keep off debris and help ensure safety.

Figure 34:
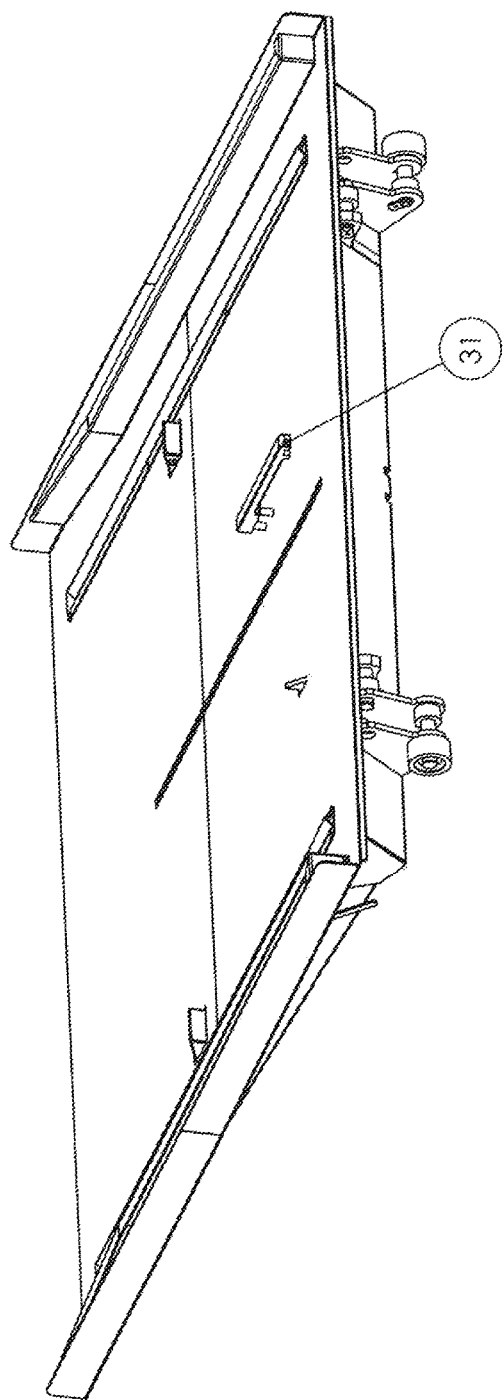
FIG. 34 is a picture of a lift gate with a removable arm.

FIG. 34 is a picture of a lift gate with a removable arm (31) that pushes a base on a "V" track back and forth.

Figure 35:
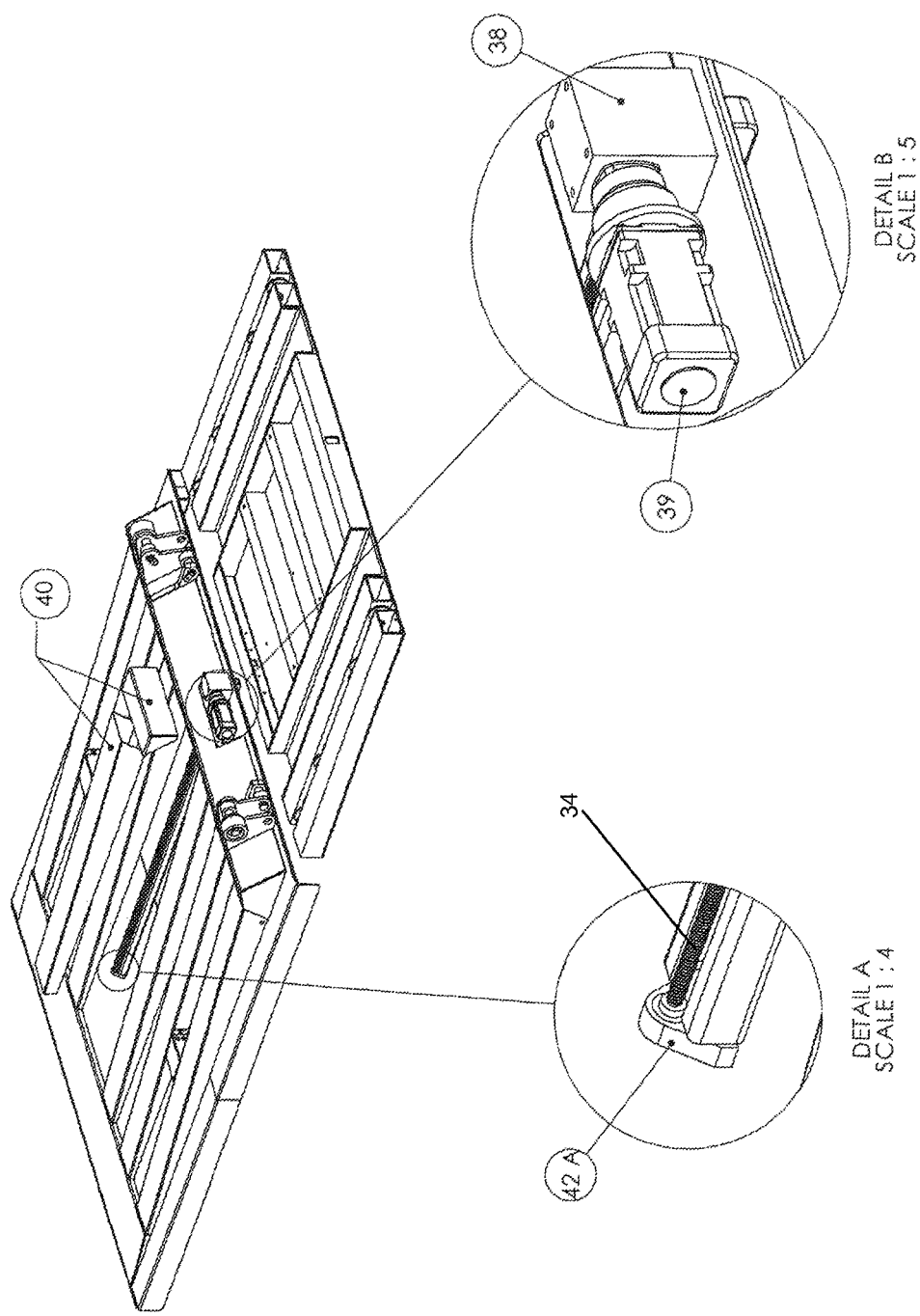
FIG. 35 is a picture of an underside of a lift gate and gives a closer picture of a motor and a gear box.

FIG. 35 is a picture of an underside of a lift gate and gives a closer picture of a motor (39) and a gear box (38). FIG. 35 shows where these items will be mounted—under the lift gate. There may be a cover (4) that keep off debris and help ensure safety. (42a) is a closer picture of a mount that holds a long screw (34) in place.

Figure 36:
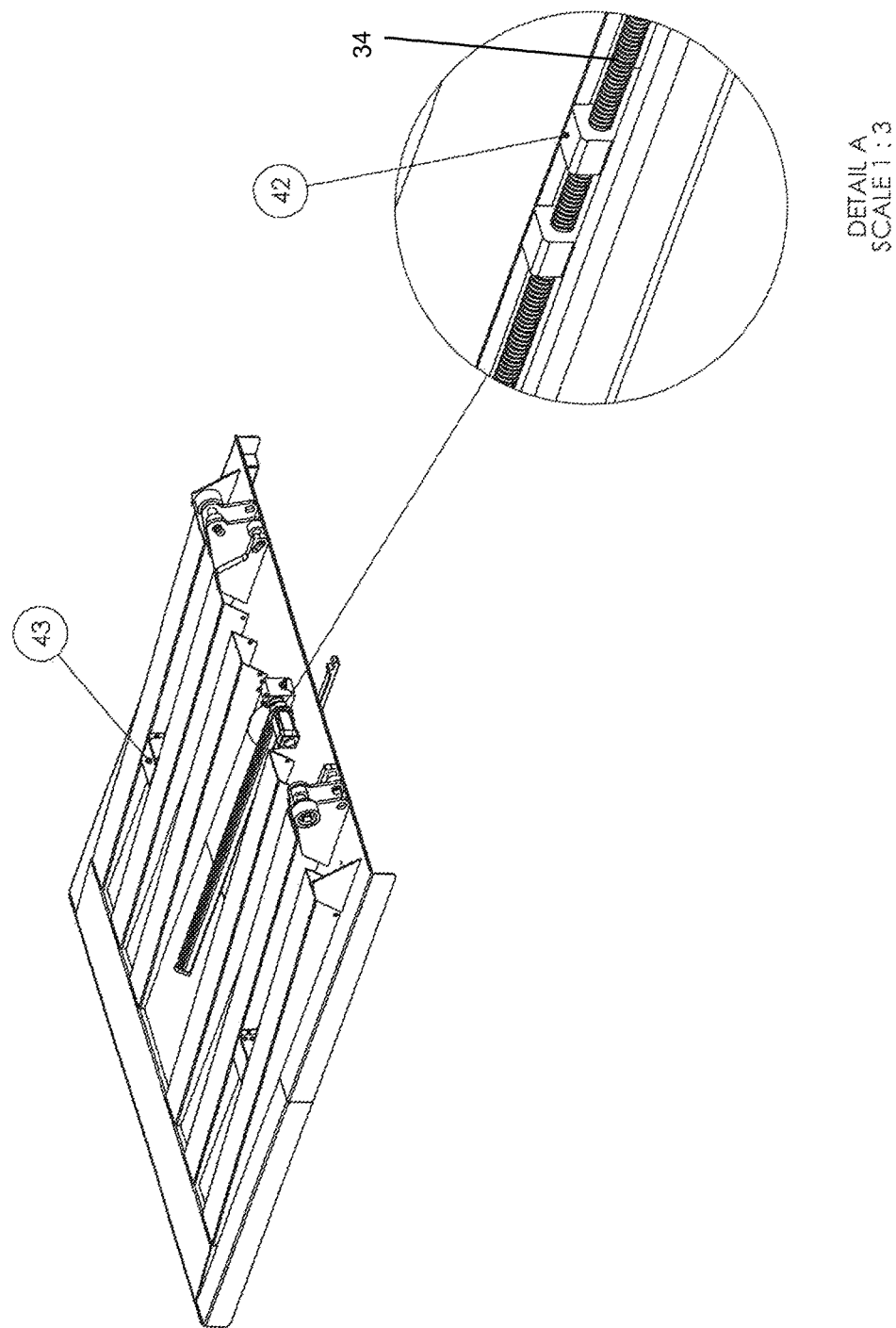
FIG. 36 is s a closer picture of a slider.

FIG. 36 is s a closer picture of a slider (42). The slider has screw treads on the inside that work when a long screw (34) that is attached to a motor goes back and forth.

Figure 37:
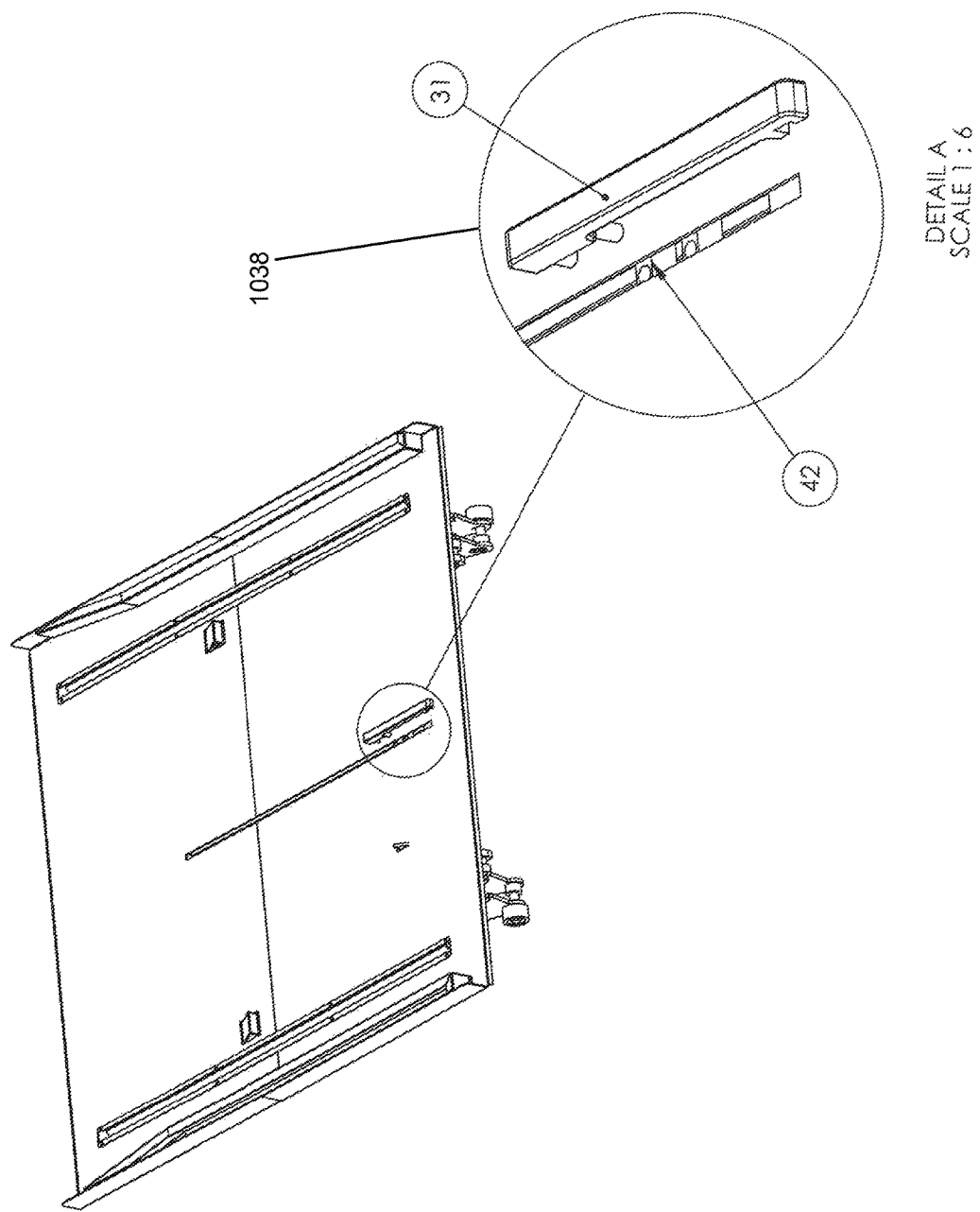
FIG. 37 is a closer picture of a removable arm of a hook arm assembly.

FIG. 37 is a closer picture of a removable arm (31) that fits into a (42) slider.

Figure 38:
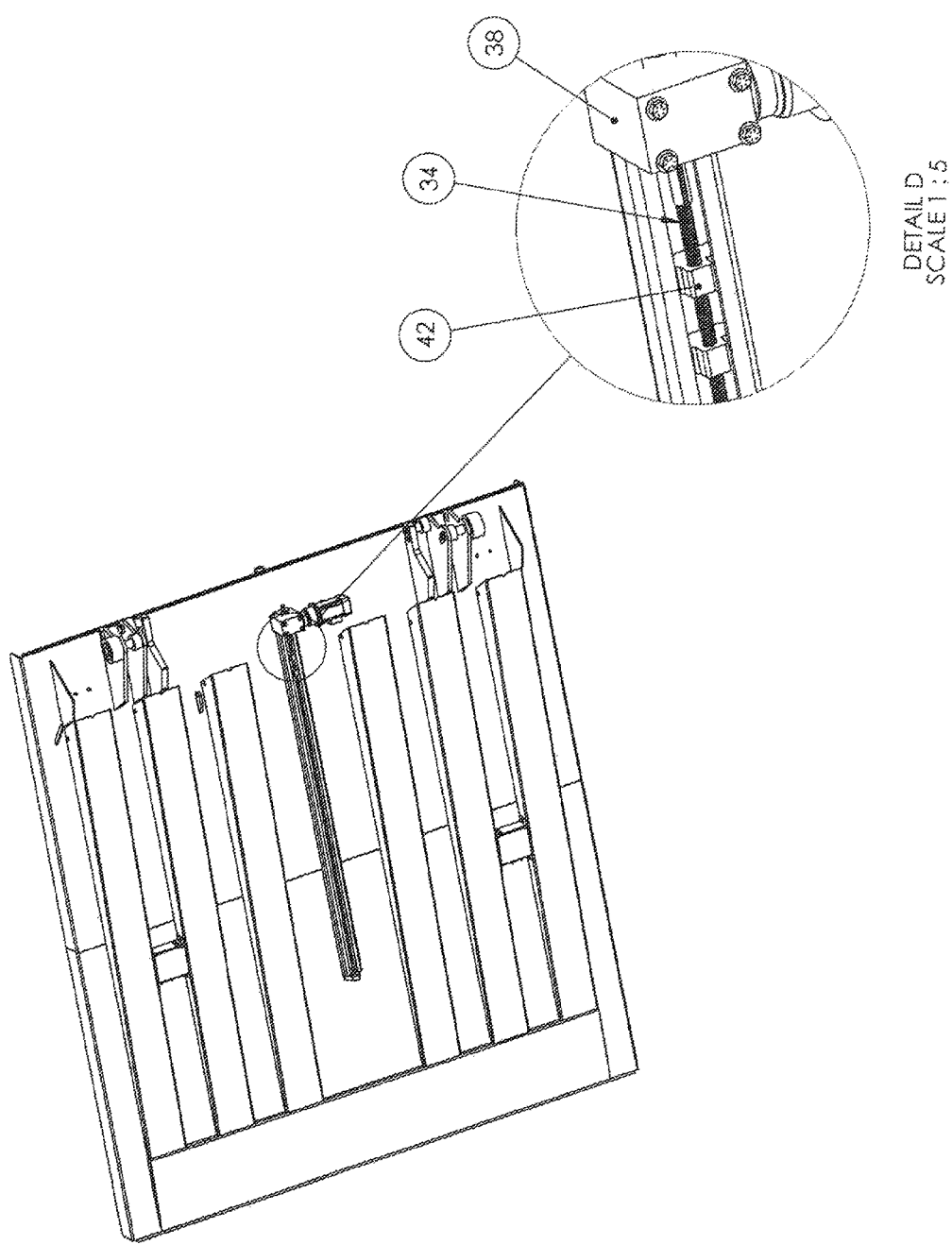
FIG. 38 is a picture of an underside of a lift gate.

FIG. 38 is a picture of an underside of a lift gate. FIG. 38 also has a closer picture of a long screw (34) attached to a gear box (38) and a Slider is attached to the long screw (34). When the screw arm starts rotating it pushes the slider back or forth. It depends on rotation. Attached to the slider is a hook arm that attaches into a hole (11) in a base (33).

Figure 39:
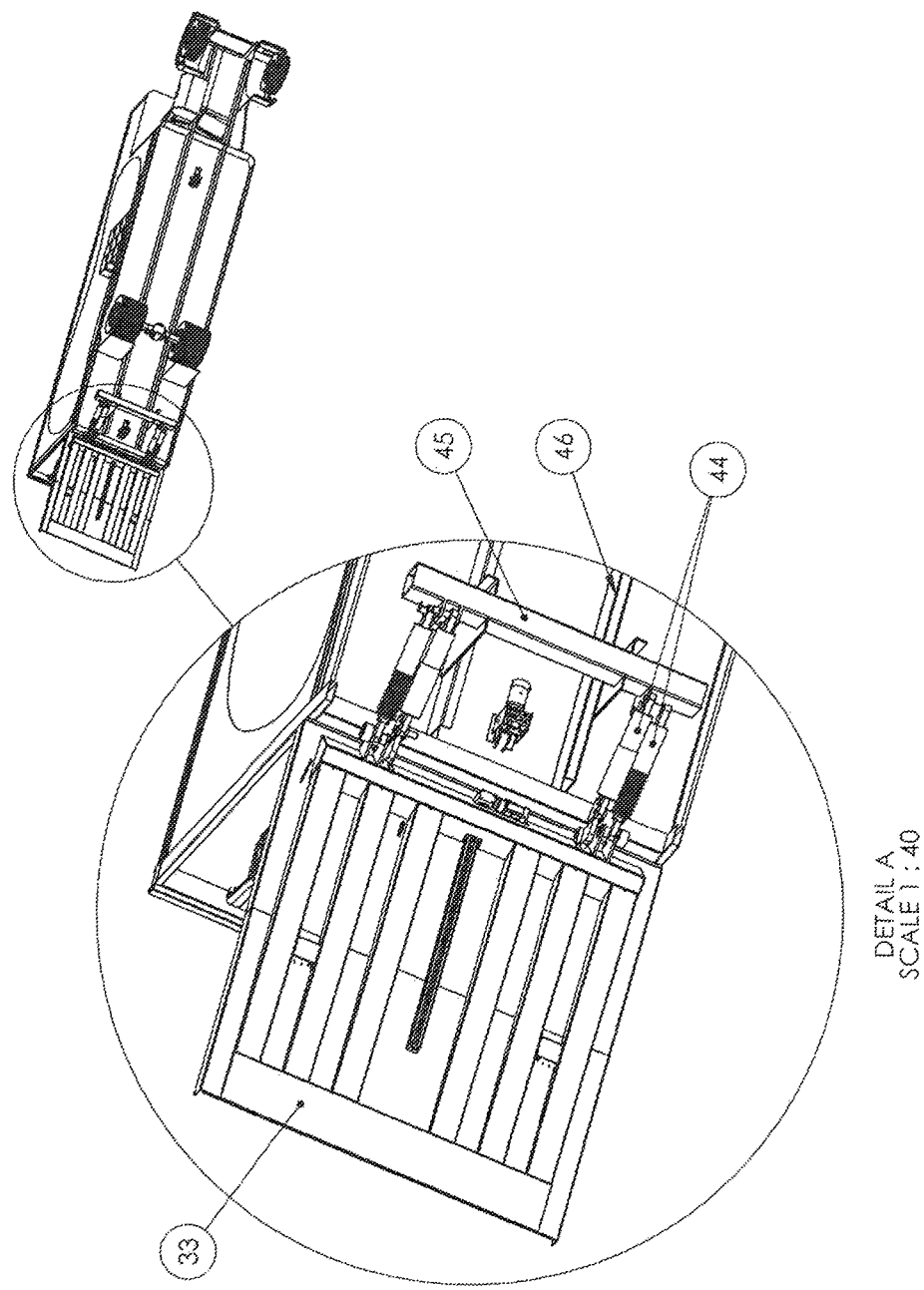
FIG. 39 is a picture of an underside of a truck with a lift gate attached.

FIG. 39 is a picture of an underside of a truck with a lift gate attached. There may be a support (45) that holds the hydraulic (44) to lift a platform up and down. There is also a truck frame (46) that is attached to the support (45).

Figure 40:
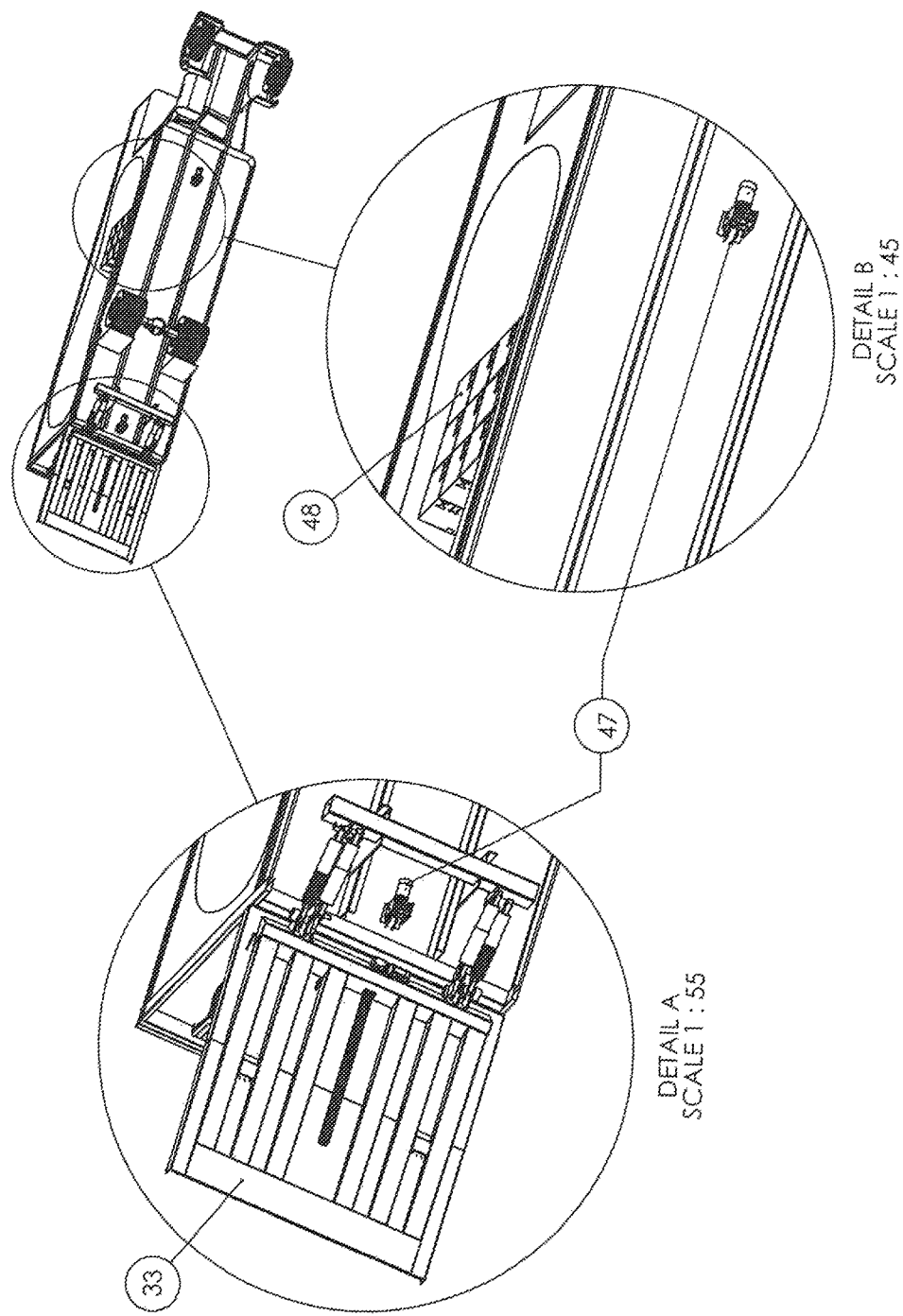
FIG. 40 shows show an underside picture of a truck, for example.

FIG. 40 shows show an underside picture of a truck, for example. There are two motors installed—one in front and one in back of the truck.

Figure 41:
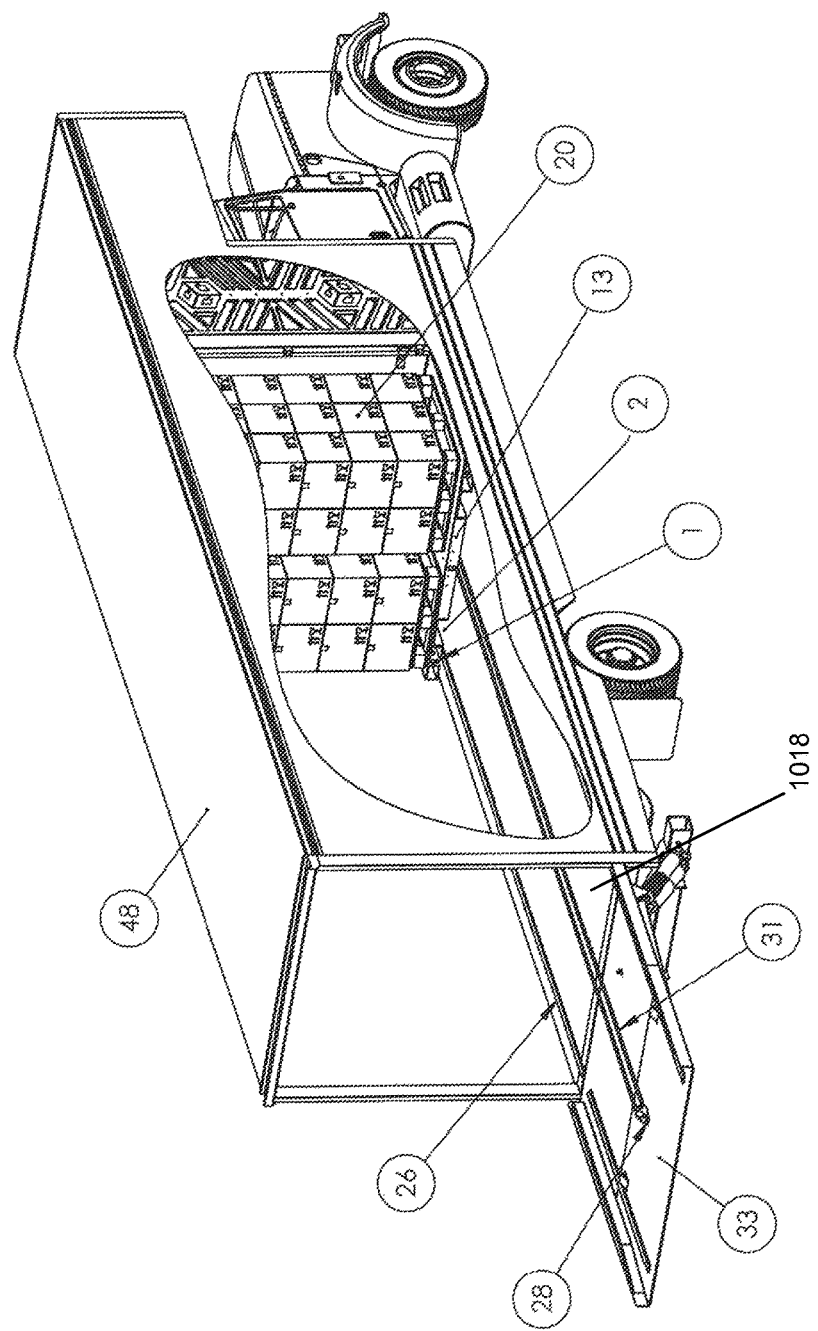
FIG. 41 is a picture of a truck with a portion of the side removed.

FIG. 41 is a picture of a truck (48). FIG. 41 demonstrates how the system works in terms of pulling a base in and out of the truck. Attached to the truck is a lift gate (33). On the lift gate and in the truck is a "V" track. A base (13) is guided on the "V" track with wheels (1). On the base are pallets of freight. A strap (31) has a hook that attaches to a hole in the base (13). If a user is pulling the base out of a truck then s/he will attach a strap to a pulley (28) and motors (47) will pull or push the strap.

Figure 42:
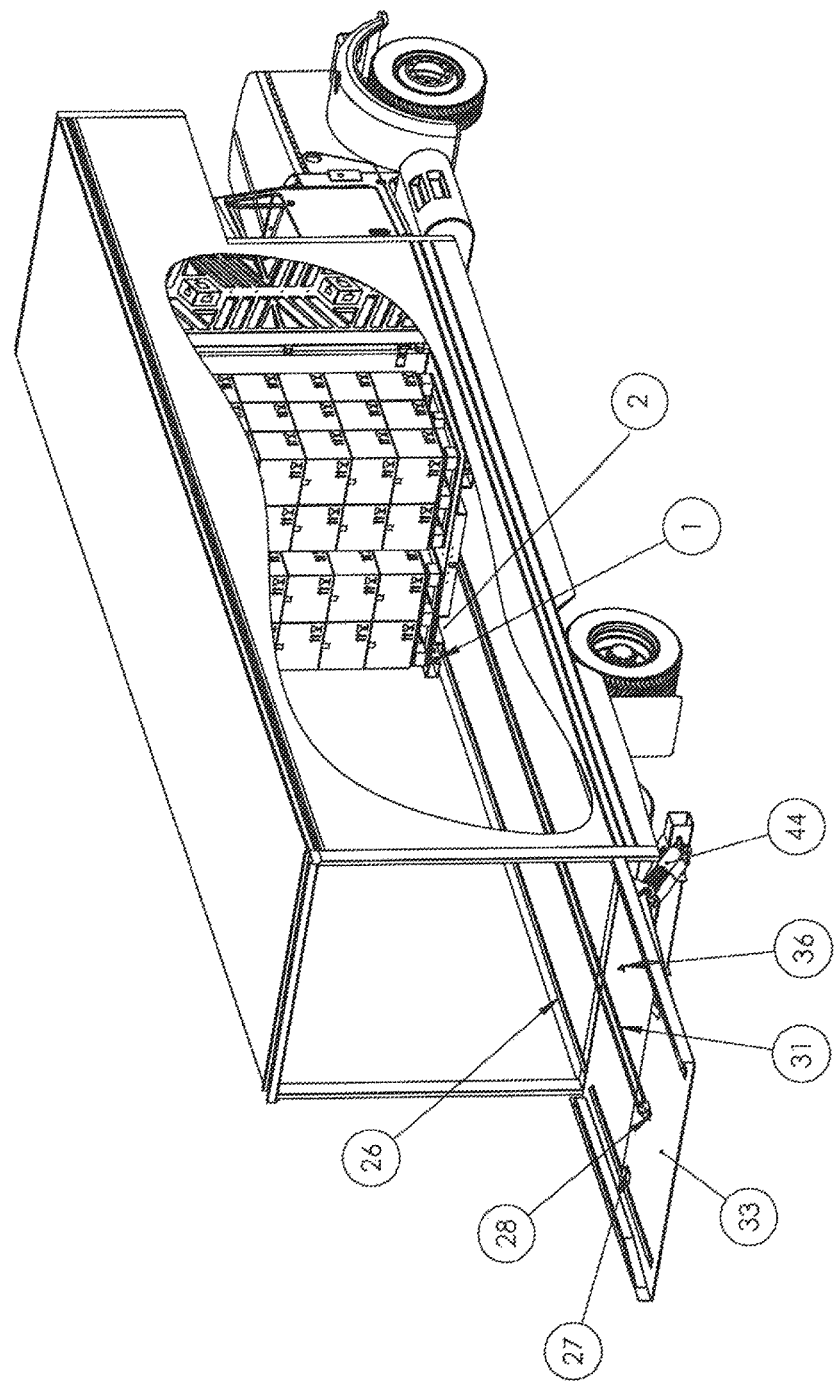
FIG. 42 is similar to FIG. 41 except it depicts additional features not present in FIG. 41.

FIG. 42 is similar to FIG. 41 except for three new features not present in FIG. 41. There are foot stoppers (27) that will prevent a cargo container base from rolling back and a lever stopper (36) that will prevent the cargo container from rolling forward. There is also shown a picture of a hydraulic (44) that will lift a lift gate up and down.

Figure 43:
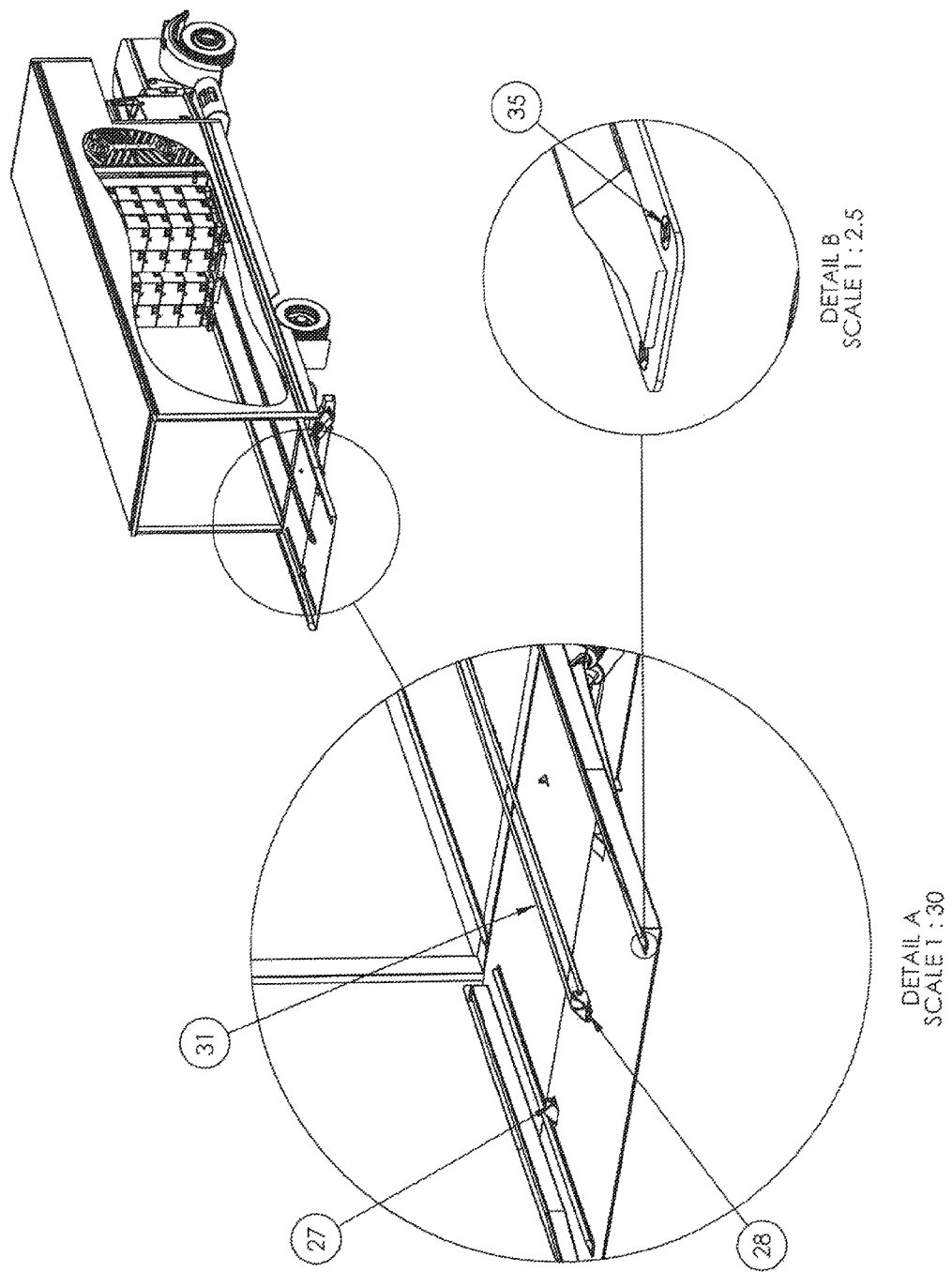
FIG. 43 is a picture of a lift gate that shows a closer picture of a pulley and a strap.

FIG. 43 is a picture of a lift gate that shows a closer picture of a pulley (28) and a strap (31). Also, a "V" track is held by screws (35) as is present in a close-up picture ("Detail B").

Figure 44:
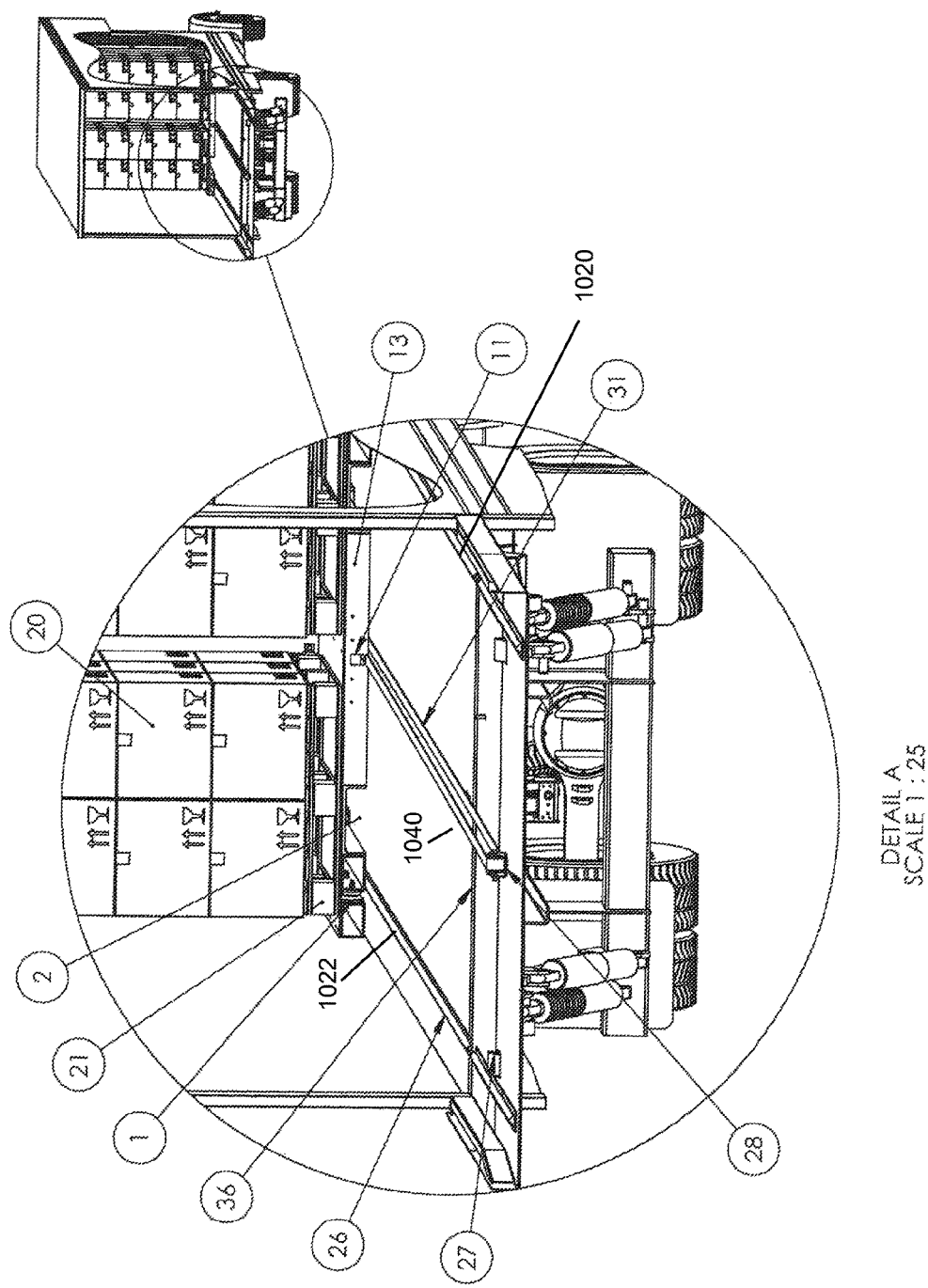
FIG. 44 is a closer picture of how a base gets pulled out of a truck using a pulley system.

FIG. 44 is a closer picture of how a base gets pulled out of a truck using a pulley system. There is a "V" track (26) that is installed into the truck and a lift gate. On the "V" track is a base (13). Wheels (1) are on top of the "V" track. A strap (31) has a hook (49) that is attached to a hole in a base (11). Using a pulley (28) to attach a strap will enable the base (13) and wheels (1) to roll on the "V" track. A user may pull the base up until it reaches stoppers (27).

Figure 45:
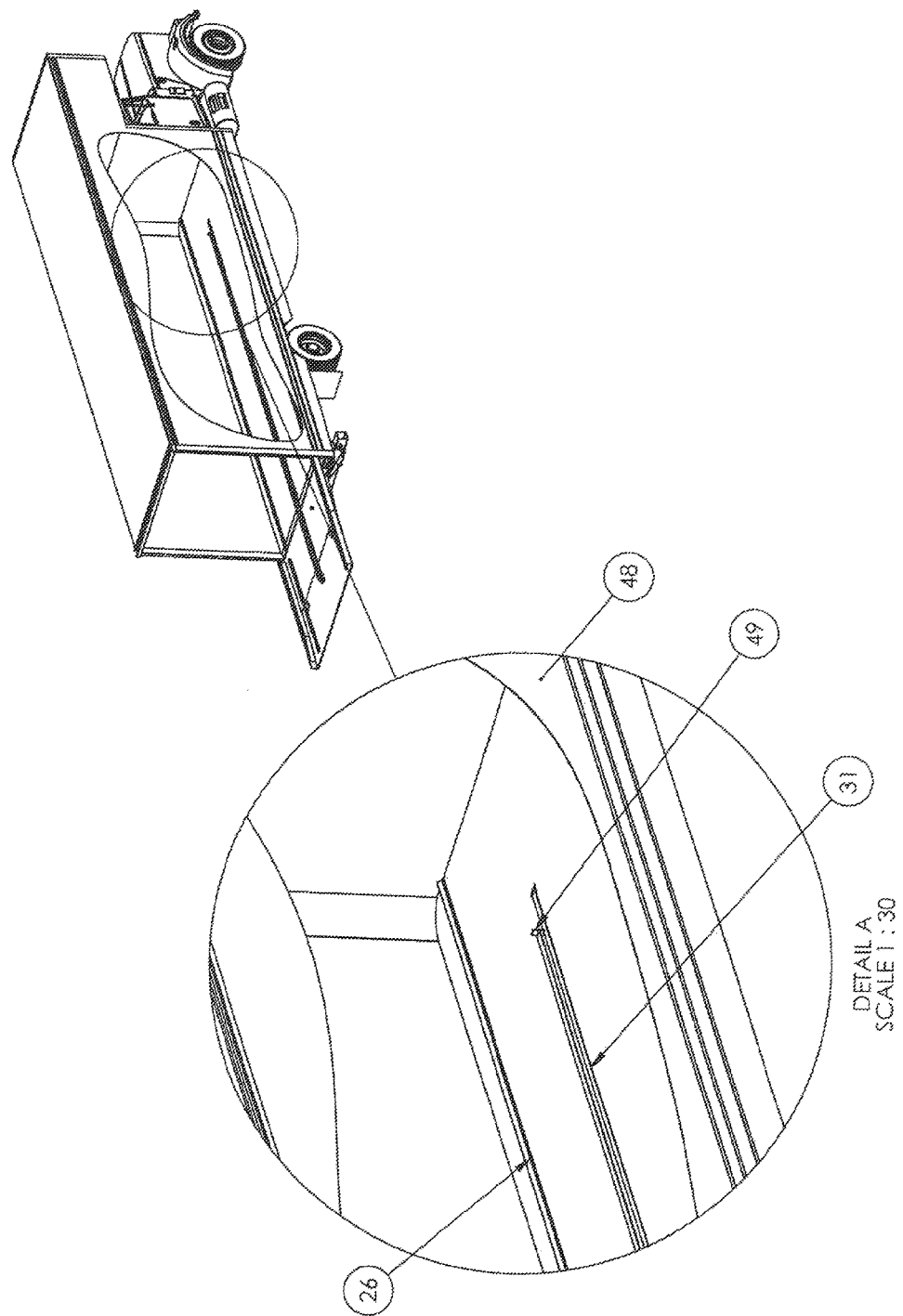
FIG. 45 is a picture of a closer shot of a strap with a hook attached to it.

FIG. 45 is a picture of a closer shot of a strap with a hook (49) attached to it.

Figure 46:
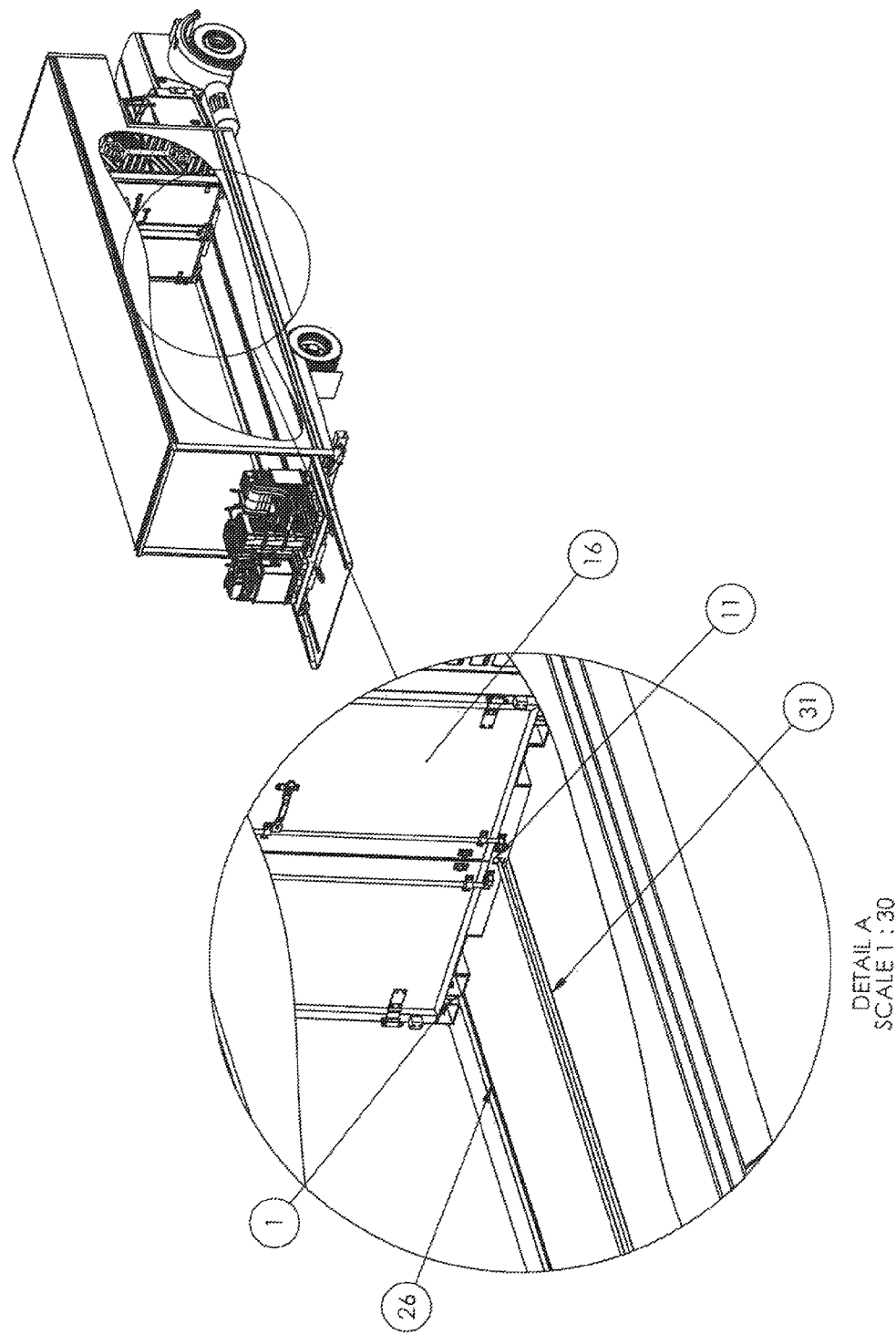
FIG. 46 is a closer view of how a hook attaches to a base hole.

FIG. 46 is a closer view of how a hook (49) attaches to a base hole (11).

Figure 47:
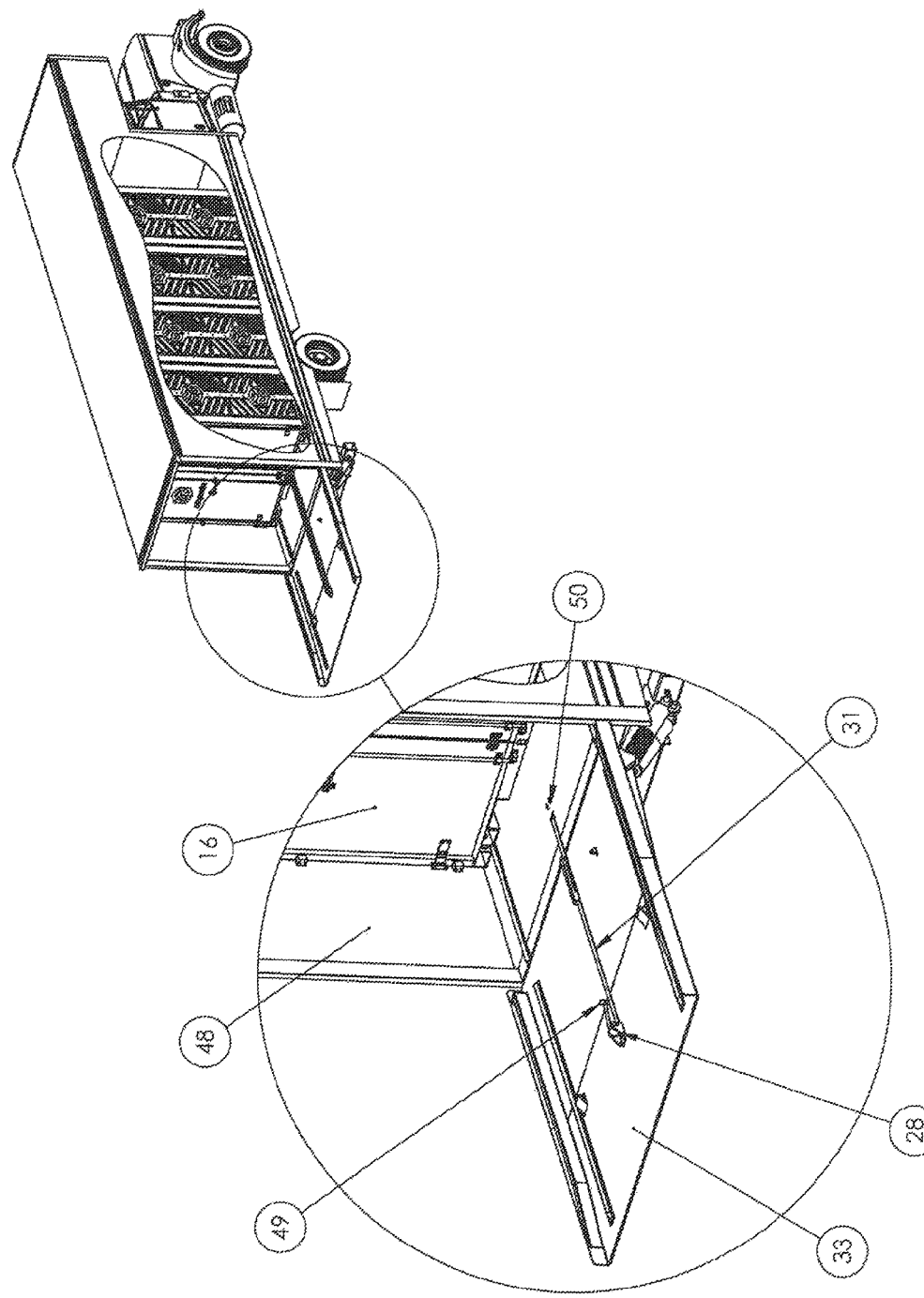
FIG. 47 is a closer view of a pulley with a strap and a hook.

FIG. 47 is a closer view of a pulley (28) with a strap (31) and a hook (49). There are two ways to pull a box back out of the truck—one way is to use a pulley system (28). The other way is to avoid attaching a strap to a pulley (28) and having a strap come straight from the motor using the rollers (50) installed on a floor of a truck, for example.

Figure 48:
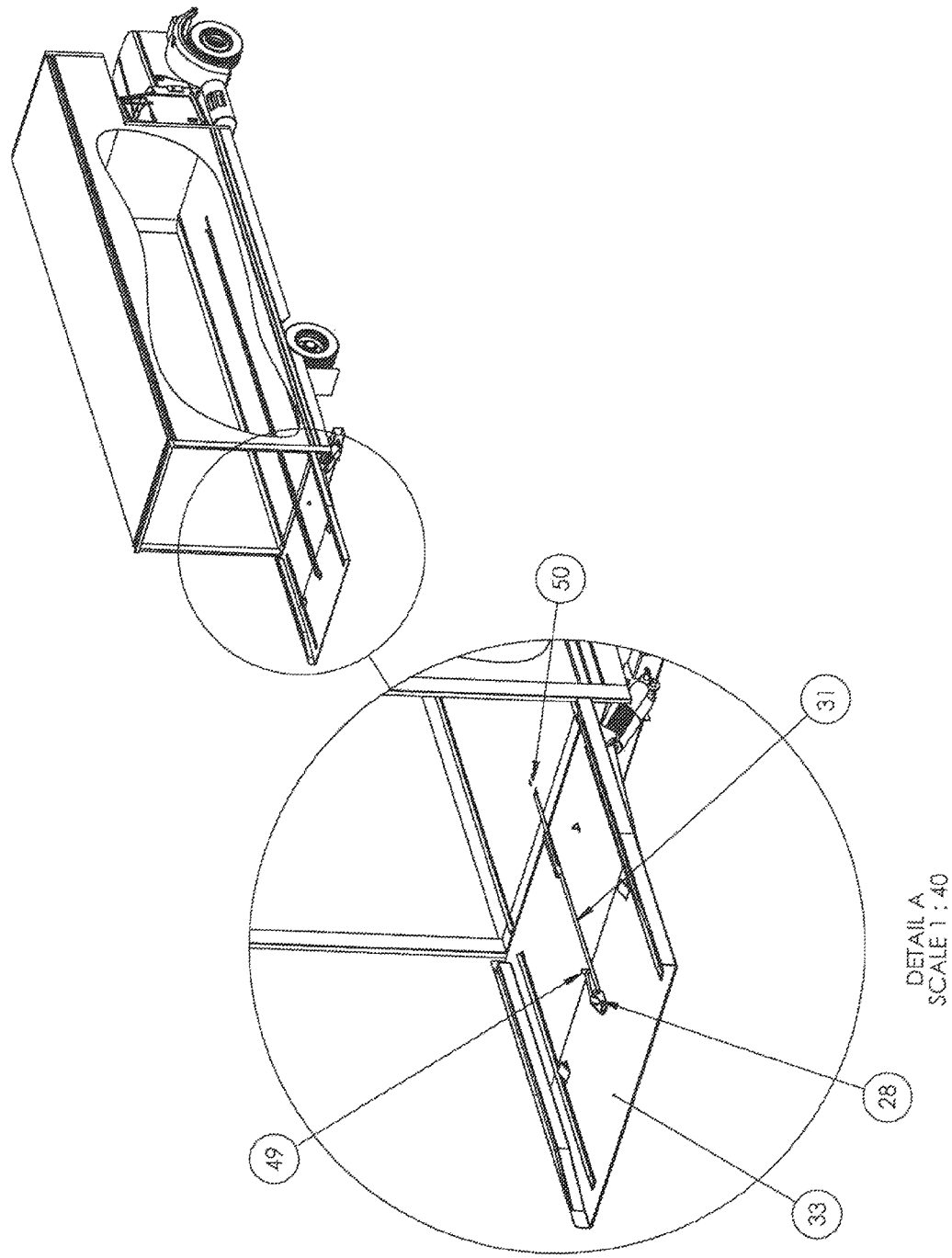
FIG. 48 also demonstrates the features of FIG. 47.

FIG. 48 also demonstrates the features of FIG. 47.

Figure 49:
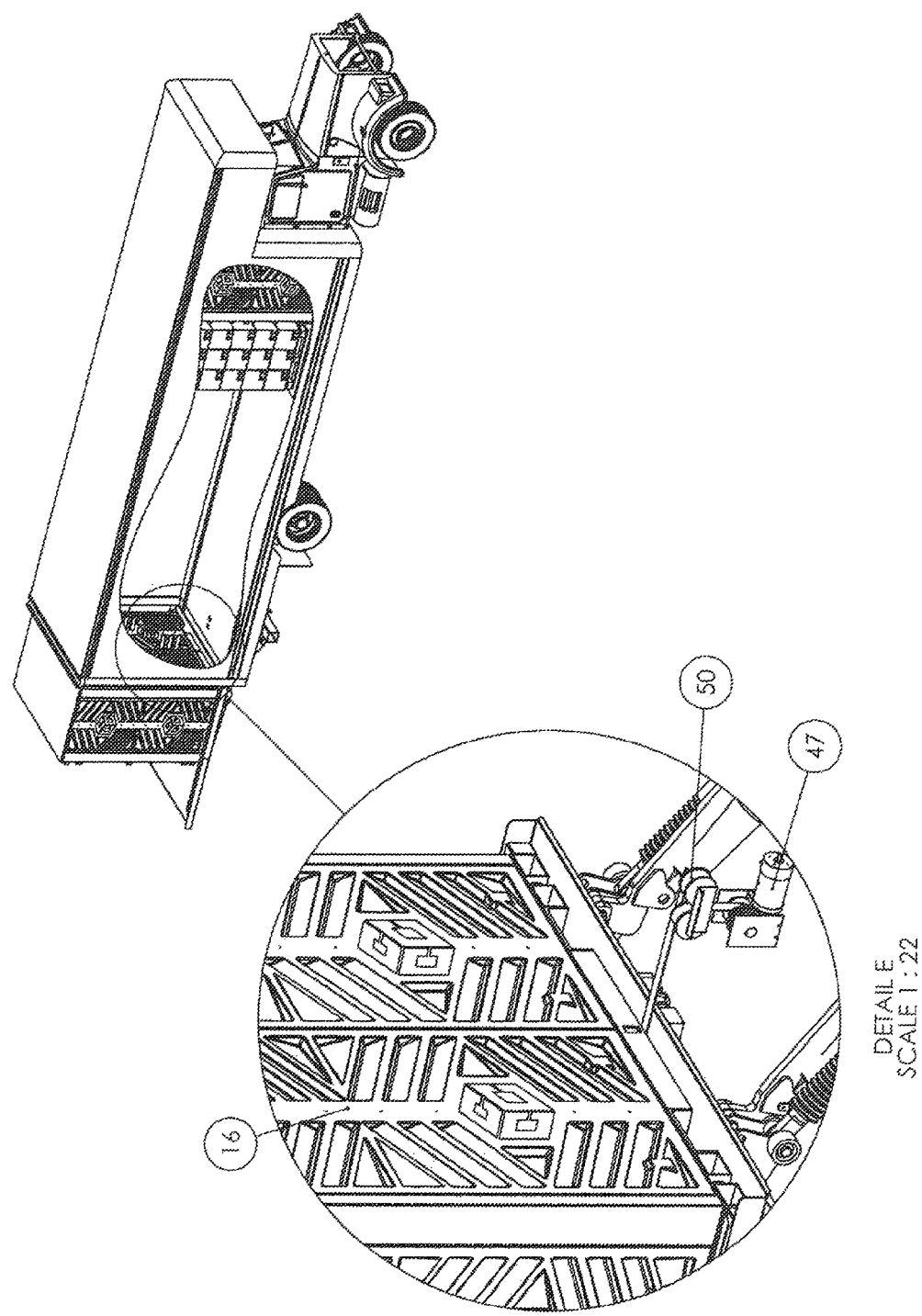
FIG. 49 is a closer picture of rollers.

FIG. 49 is a closer picture of rollers (50).

Figure 50:
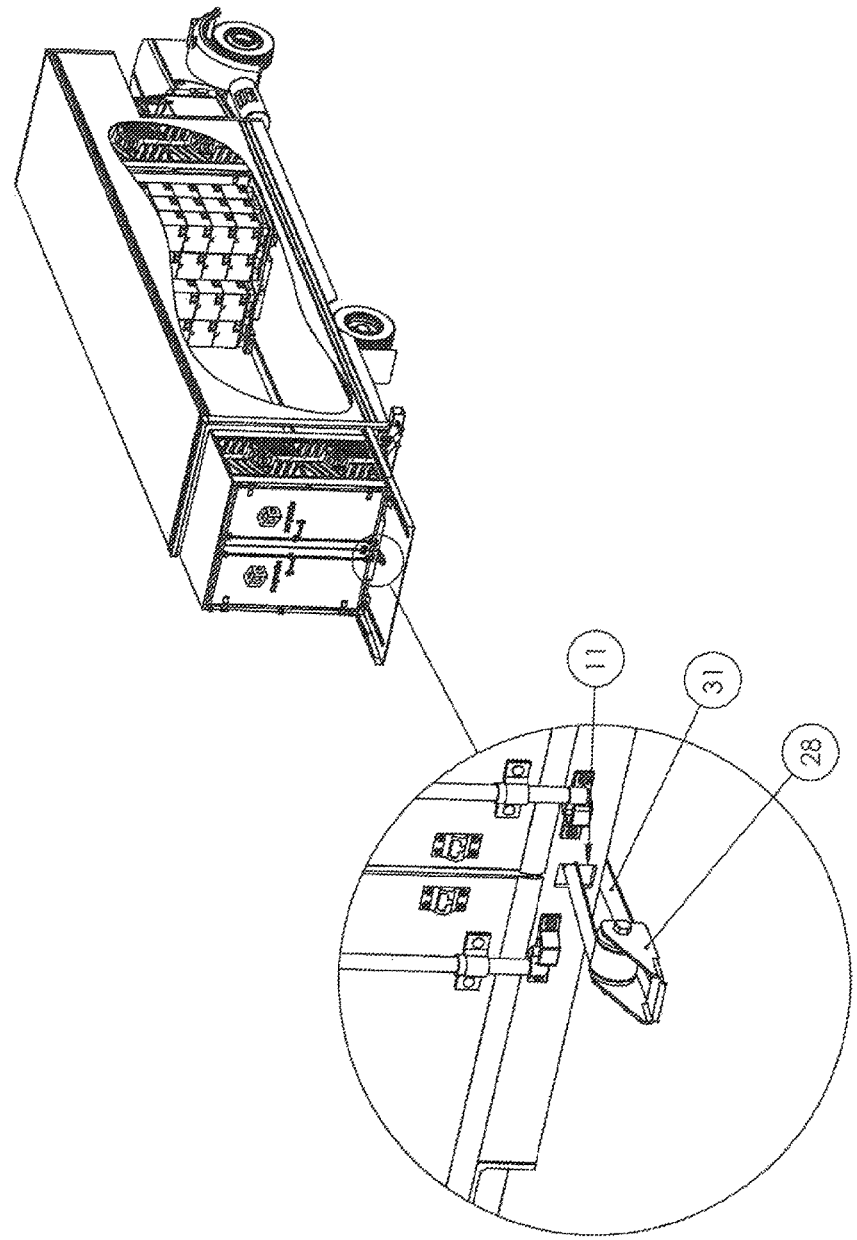
FIG. 50 is a closer view of a pulley, a strap, and a hole in a base.

FIG. 50 is a closer view of a pulley (28), a strap (31), and a hole (11) in a base.

FIG. 51 is a closer view on a "V" track (26) and wheels (1) of a base. In one embodiment, the wheels are 12 to 15 inches apart. This distance enables a wheel to roll on the "V" track until another wheel meets the "V" track. In one embodiment there are about 8 inches of "V" track missing from a lift gate. A missing "V" track allows the lift gate to close and fit snugly in back of a truck, for example.

Figure 52:
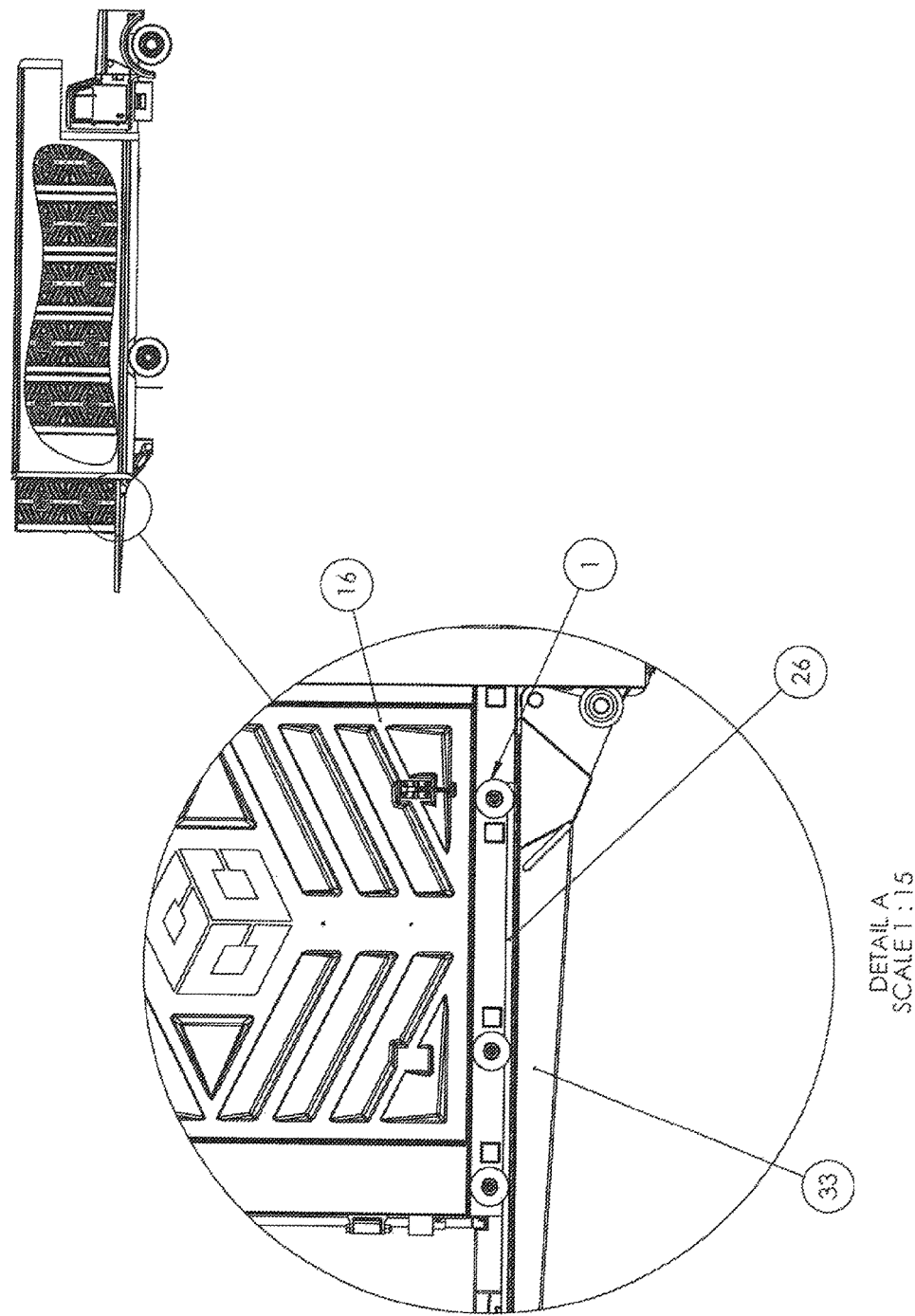
FIG. 52 is a closer view of a "V" track mounted on a lift gate and wheels rolling on a "V" track.

FIG. 52 is a closer view of a "V" track (26) mounted on a lift gate (33) and wheels (1) rolling on a "V" track entering a truck, for example.

FIG. 53 is a picture of a "V" track.

FIG. 54 is a closer picture of a "V" track on a lift gate and a truck.

FIG. 55 represents an embodiment whereby a "V" track is unscrewed. A release screw enables a user to take the "V" track off.

FIG. 56 is a picture of a forklift. There may be a standing platform (67, a throttle (52) and a weight indicator (53). Weight is calculated by measuring hydraulic pressure from a hydraulic when lifting. There may be a screen (54) that provides a view from cameras (55) installed in front of a fork. When a cargo container is loaded a user will be able to view content on another side. There may be a hook (61) that goes into a base hole (11) in order to pull or push a cargo container.

Figure 57:
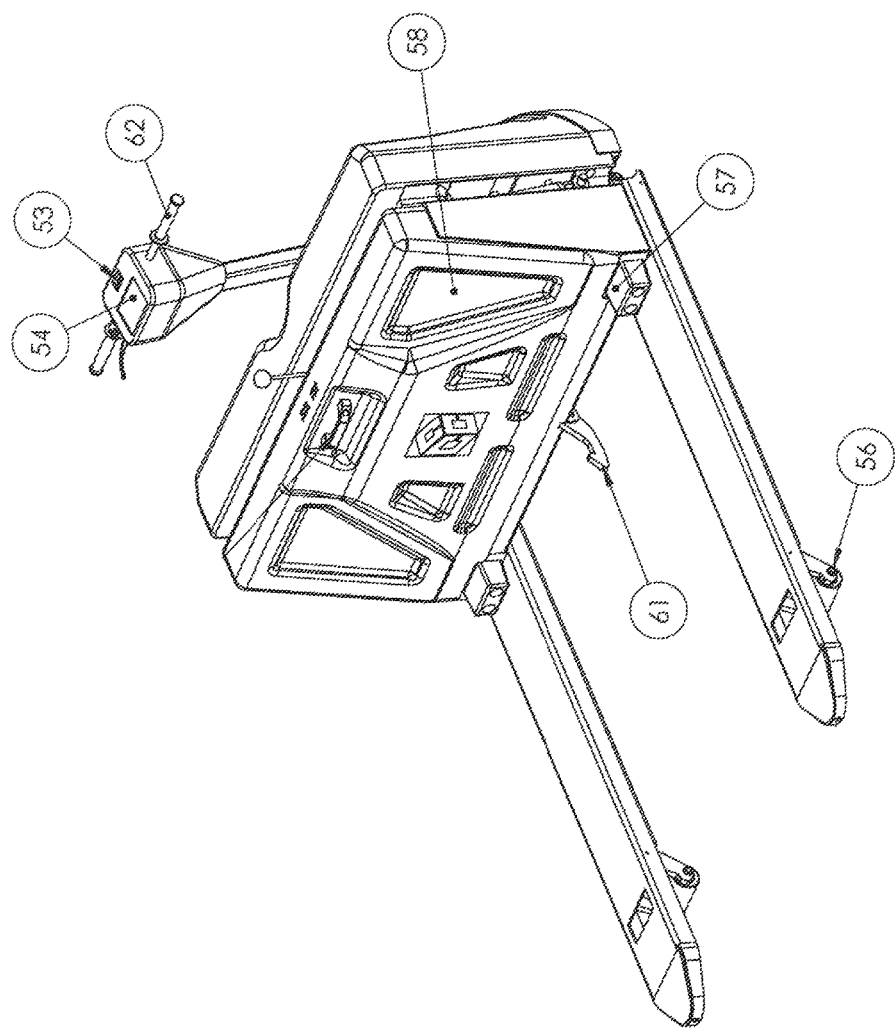
FIG. 57 is a side view of a forklift.

FIG. 57 is a side view of a forklift. As shown, there may be a screen (54) for cameras, a weight indicator (53), a steering arm (62), a battery compartment (58) and bumpers (57) for a cargo container. Shown is a side view of a hook (61) that enters in a hole (11) that pushes and pulls the cargo container on a "V" track. There are also shown front wheels (56) of the forklift.

Figure 58:
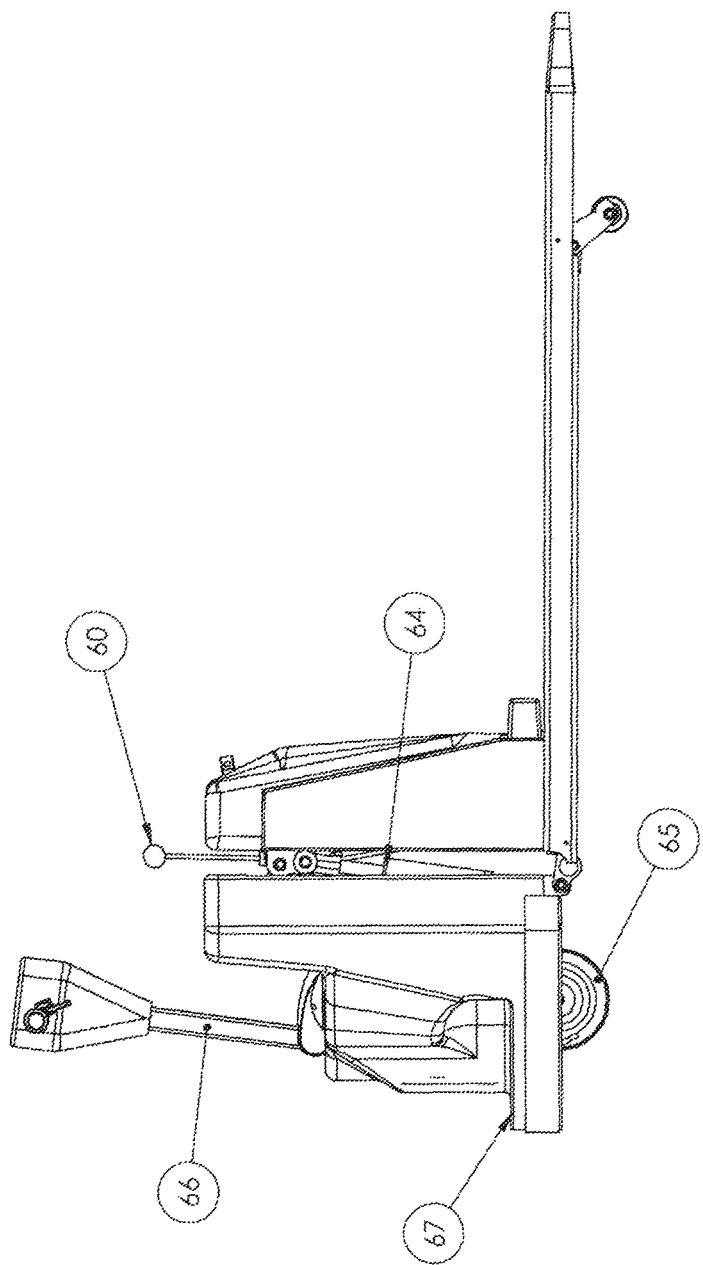
FIG. 58 is a side view of a forklift.

FIG. 58 is a side view of a forklift (64). A hydraulic that lifts the forklift up and down has a handle to engage a hook (61) to lock or unlock from a base hole (11). There is an arm (66) that enables a user to steer the forklift. The arm also tills when a user is walking behind. There is a standing platform (67) when carrying a load. There is shown a back wheel (65) of the forklift.

Figure 59:
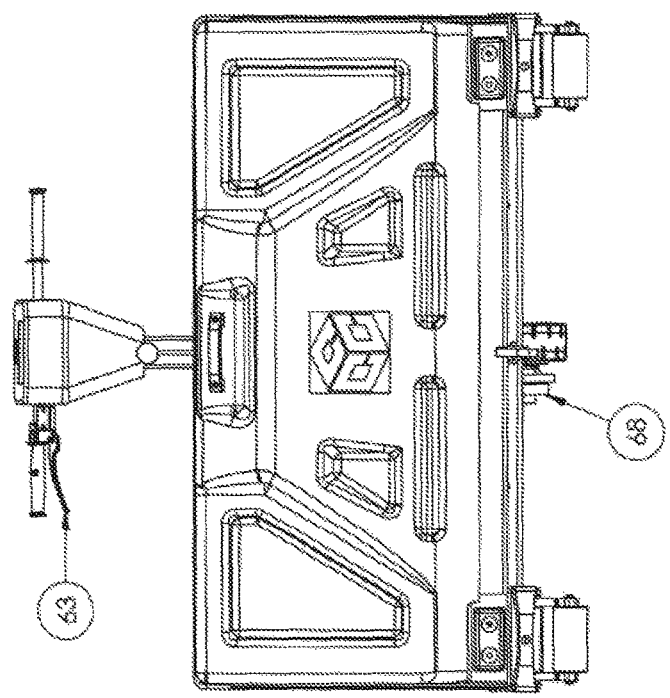
FIG. 59 is a front view of a forklift.

FIG. 59 is a front view of a forklift. Shown is a brake handle (63) and a gear box (68) for the forklift.

FIG. 60 is a closer view of a screen for a camera and a weight indicator for weight.

FIG. 61 is a closer view of a camera hole (55).

FIG. 62 is a closer view of a hook (61) that is used to pull and push a cargo container. The hook enters in the base hole (11).

Figure 63:
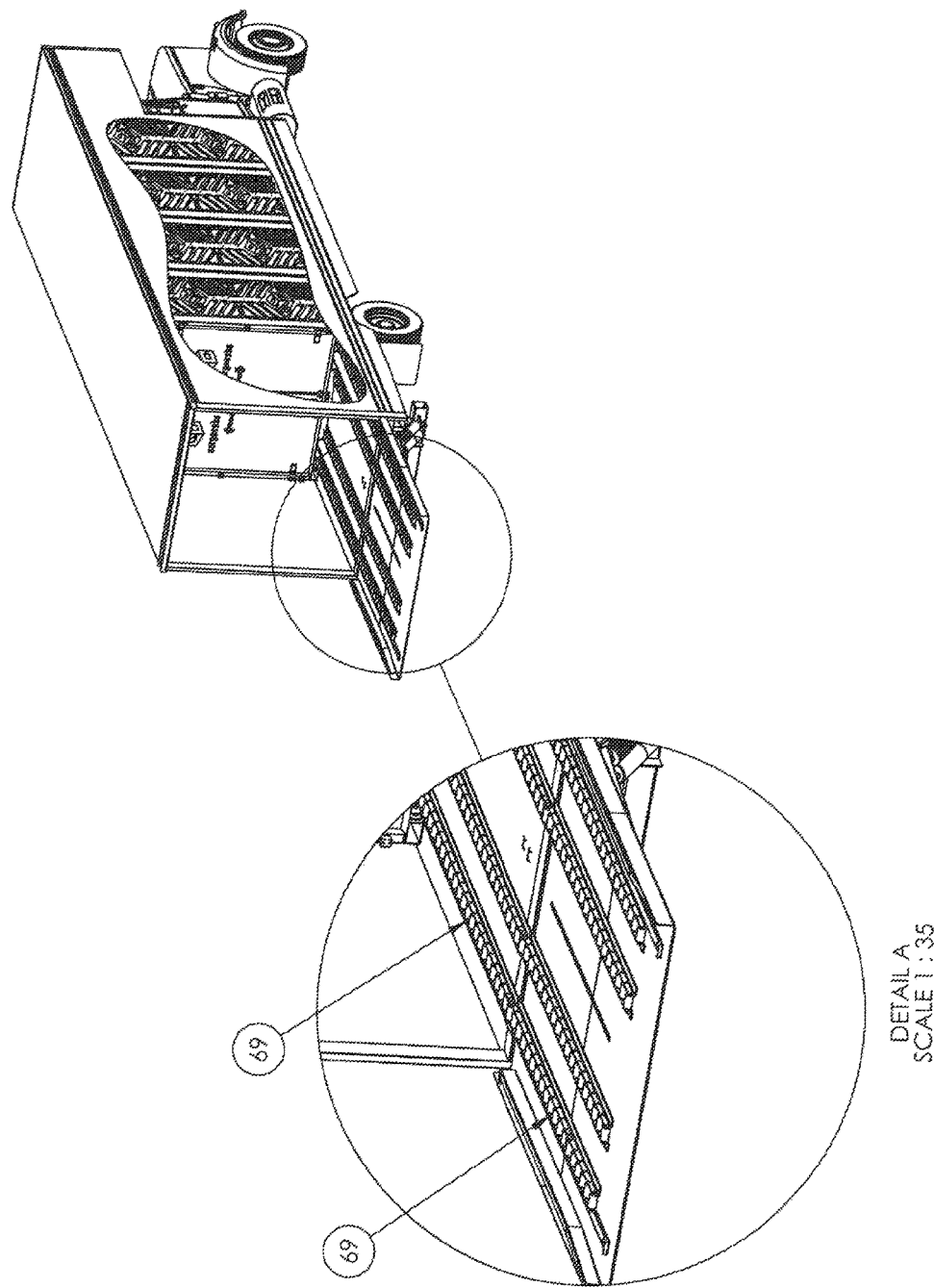
FIG. 63 is an alternate way of sliding a cargo container base into a truck or trailer.

FIG. 63 is an alternate way of sliding a cargo container base into a truck or trailer. (69) is a track of rollers installed in a bed of a truck and a lift gate for the cargo container box to roll back and forth.

Figure 64:
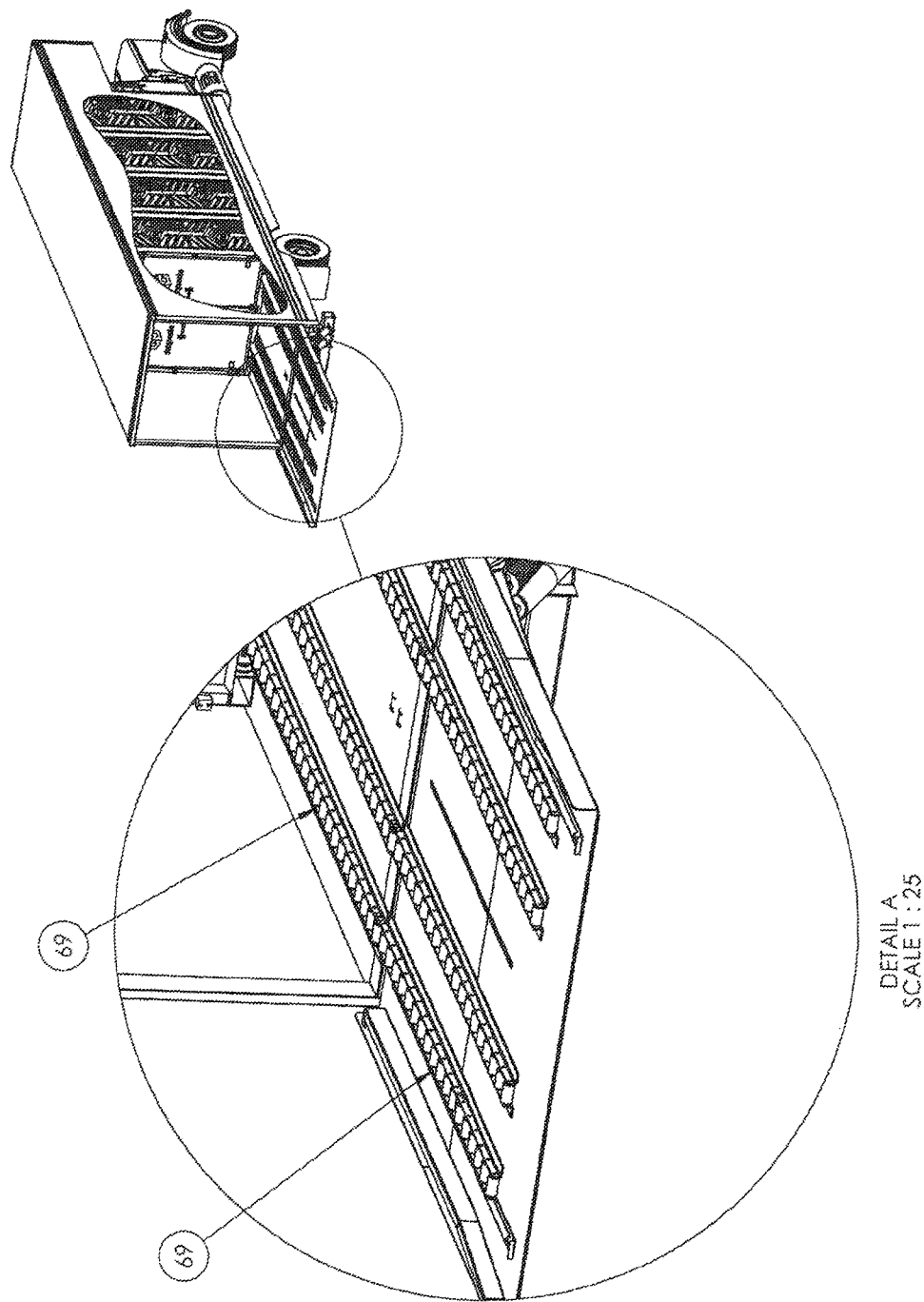
FIG. 64 is a closer view of a track with rollers.

FIG. 64 is a closer view of tracks with rollers (69).

Figure 65:
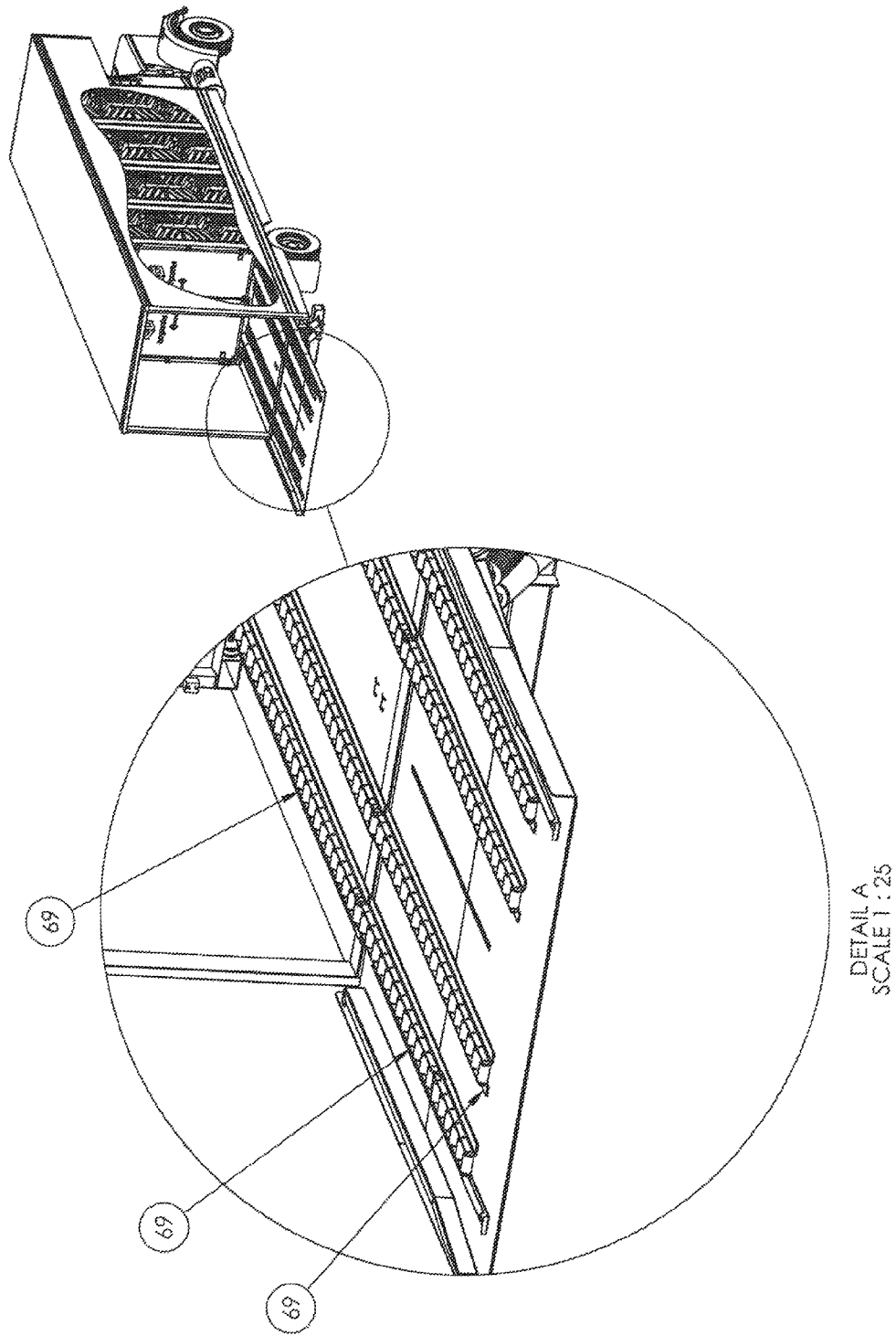
FIG. 65 is another picture of tracks.

FIG. 65 is another picture of tracks with rollers (69).

Figure 66:
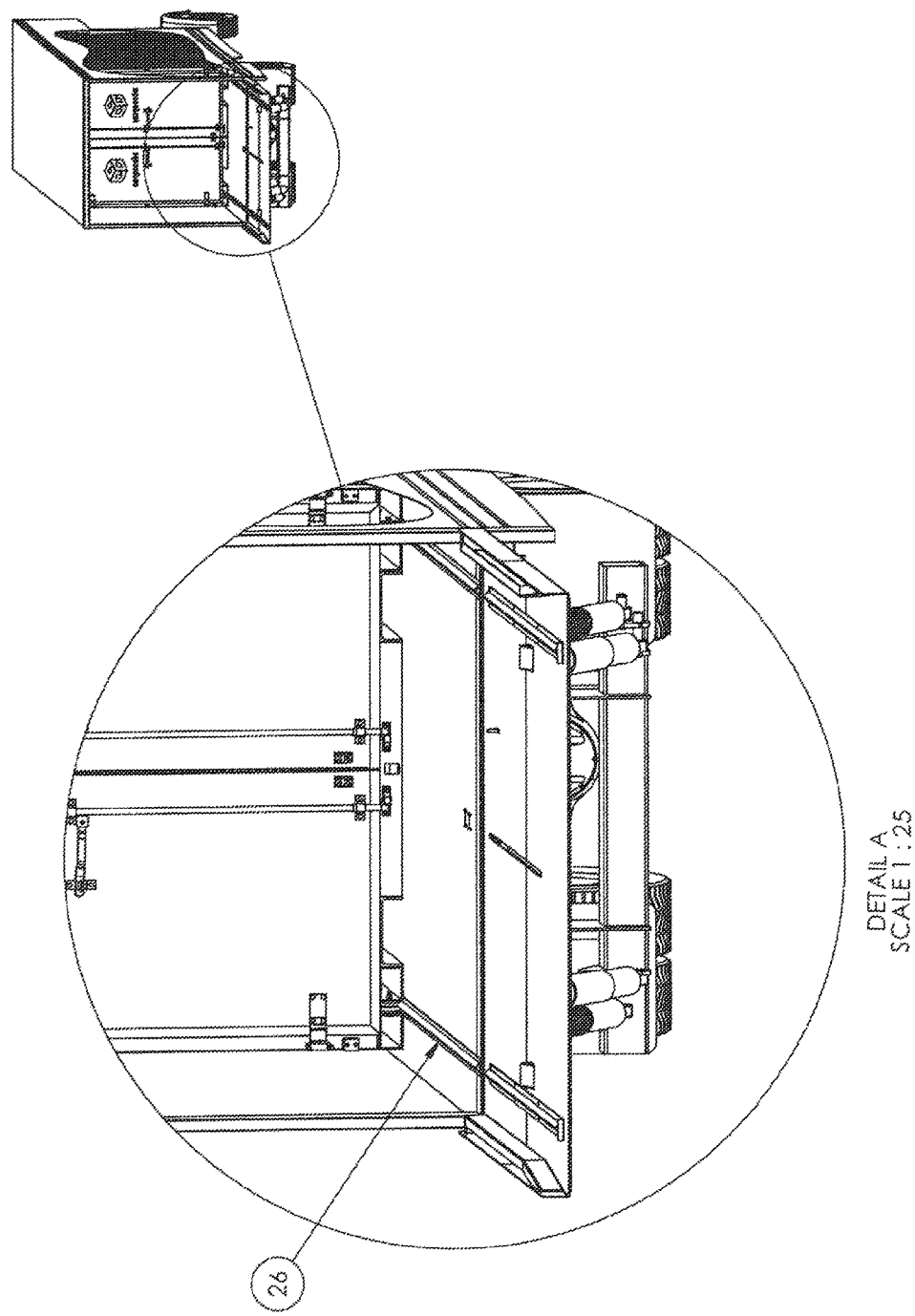
FIG. 66 is a view of a "V" track installed in a truck and lift gate.

FIG. 66 is a view of a "V" track (26) installed in a truck and lift gate.

Figure 67:
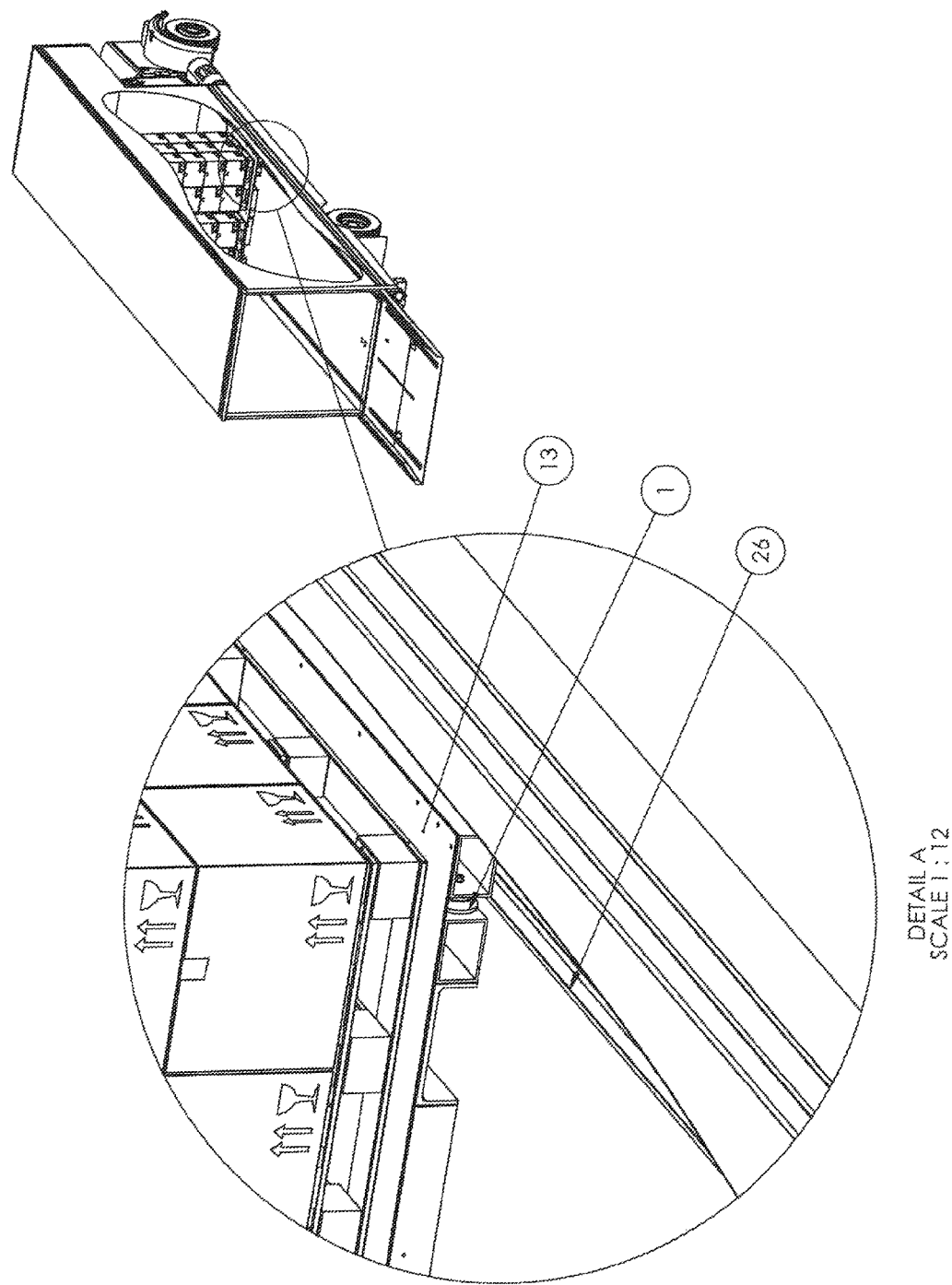
FIG. 67 is another close-up view of a "V" track and a base on wheels rolling into a truck.

FIG. 67 is another close-up view of a "V" track and a base on wheels rolling into a truck.

Figure 68:
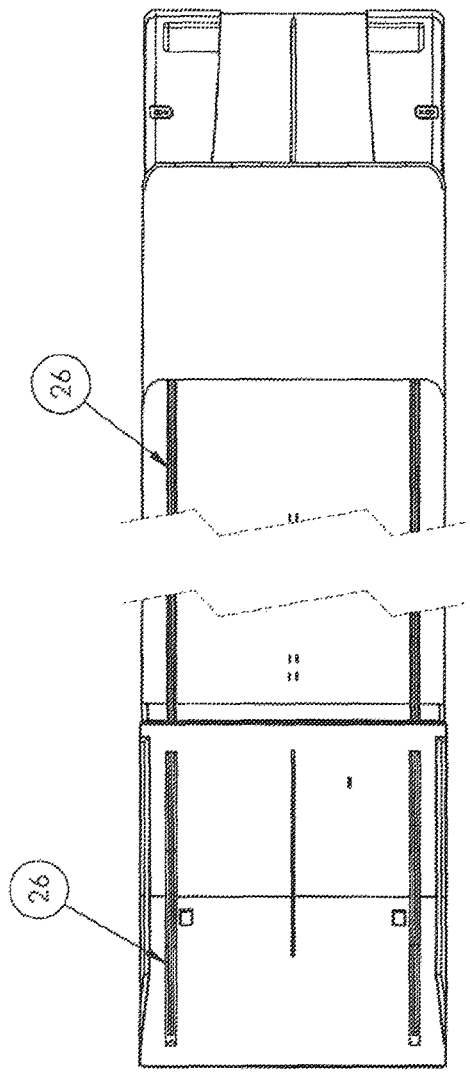
FIG. 68 is an aerial view of a "V" track installed in a truck and a lift gate.

FIG. 68 is an aerial view of a "V" track installed in a truck and a lift gate. FIG. 68 is a picture of a pallet jack, fork lift, and cargo container lift. This device enables a user to deliver at least one transportation modular component or cargo container to a home or business.

Figure 69:
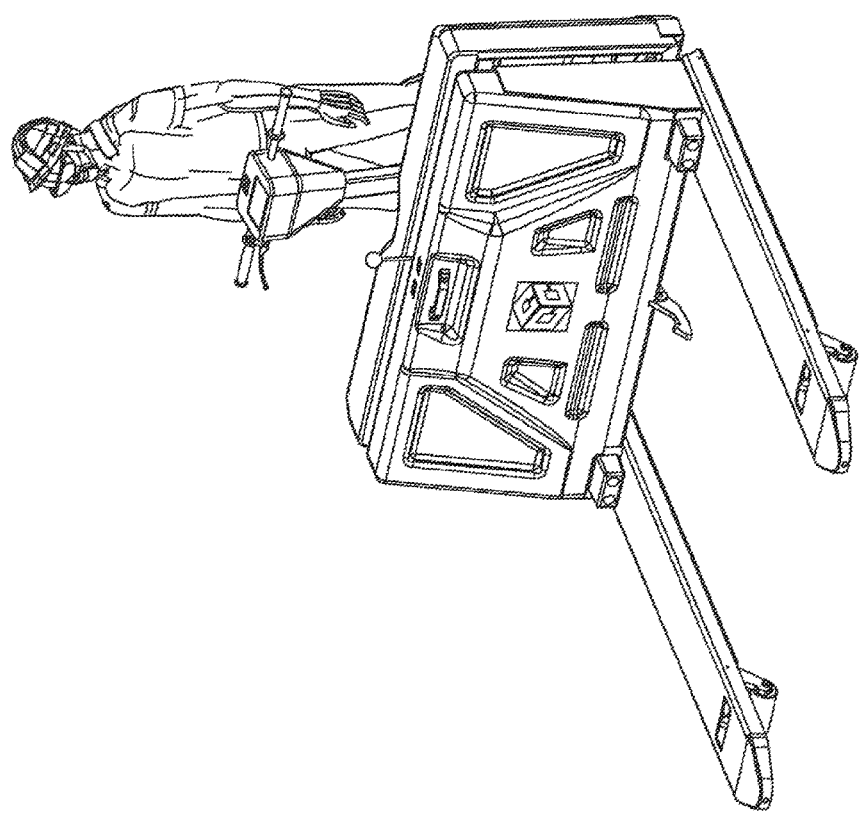
FIGS. 69, 70, and 71 demonstrate a cargo container loaded onto a pallet jack, forklift, and cargo container lift.
Figure 70:
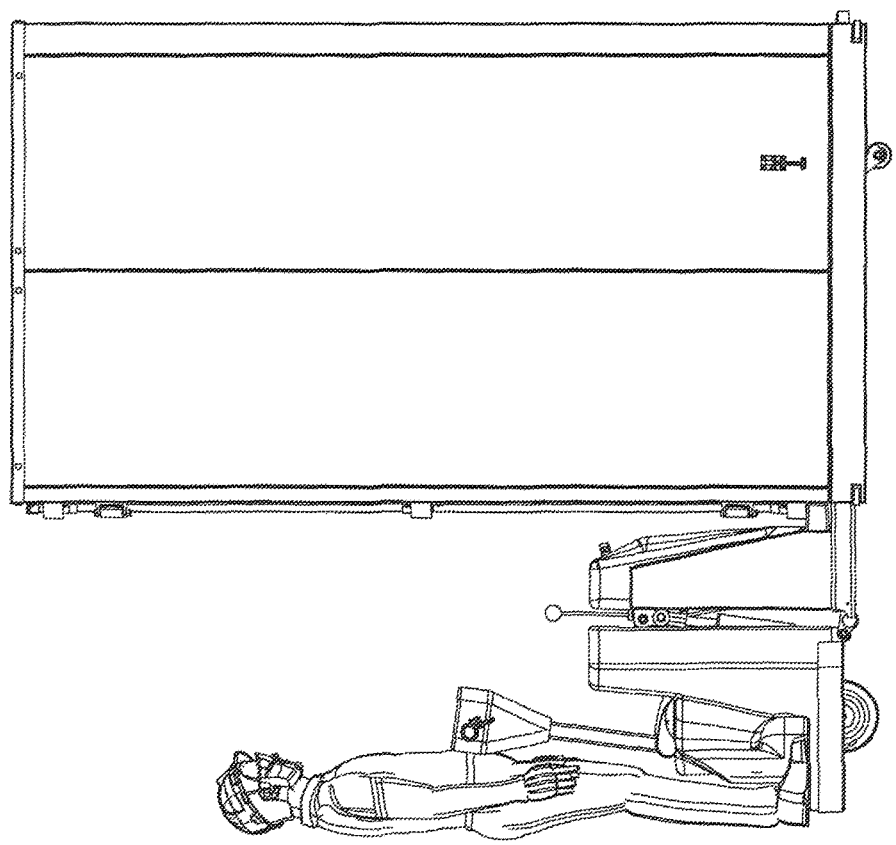

FIGS. 69, 70, and 71 demonstrate a cargo container loaded onto a pallet jack, forklift, and cargo container lift. A user can ride a lift or walk behind it.

FIGS. 72, 73, 74, 75, 76, and 77 demonstrate a cargo container loaded onto a pallet jack, a cargo container being loaded on a lift gate, a lift gate going up, a cargo container placed inside a truck, and a pallet jack placed inside a truck. The lift gate becomes a back door securing a load in place FIGS. 78, 79, and 80 demonstrate a cargo container box, a base holding pallets of freight, and a commodities transporter, inside a truck, for example.

Figure 81:
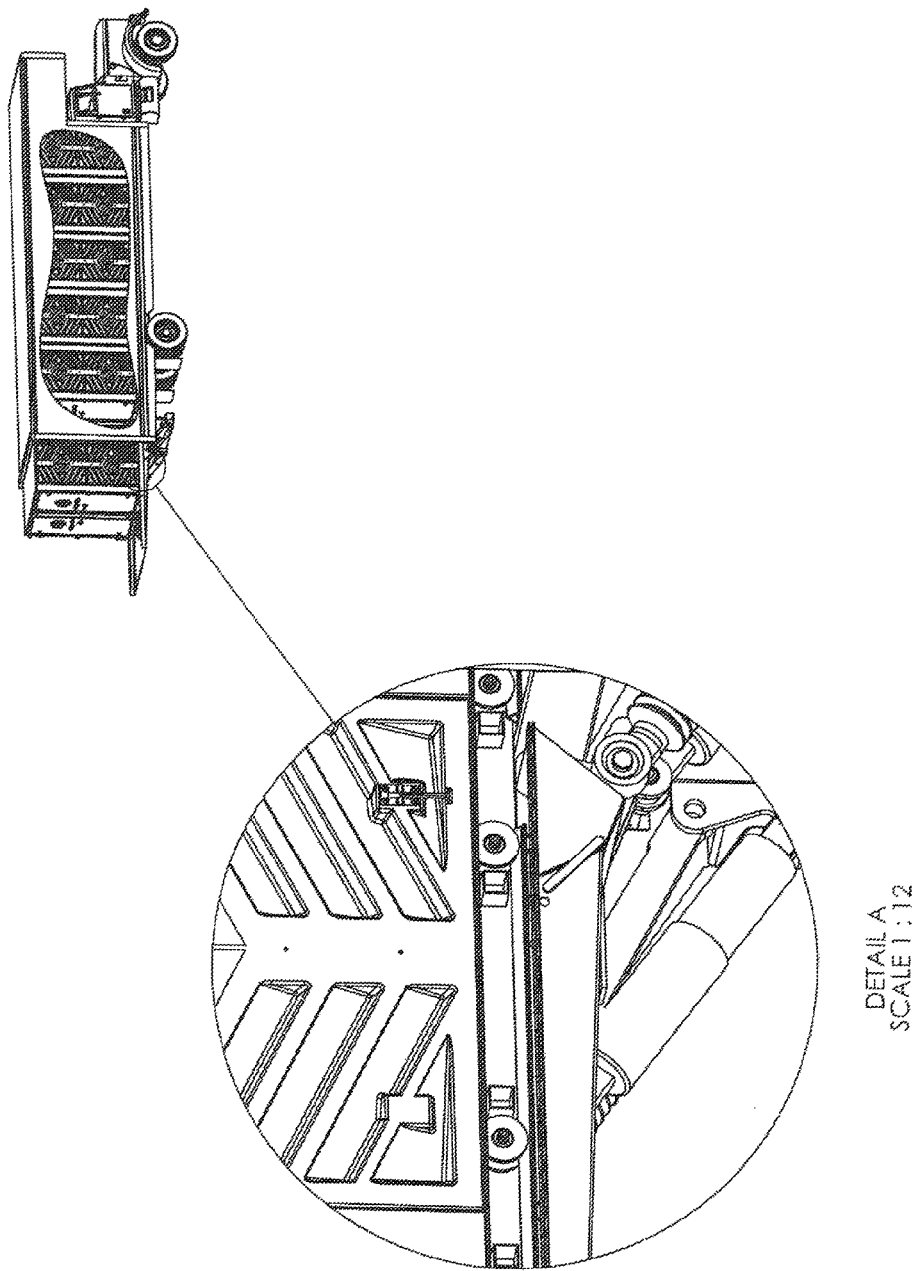
FIGS. 81 and 82 demonstrate wheels from a base going from a lift gate to a truck on a "V" track.
Figure 82:
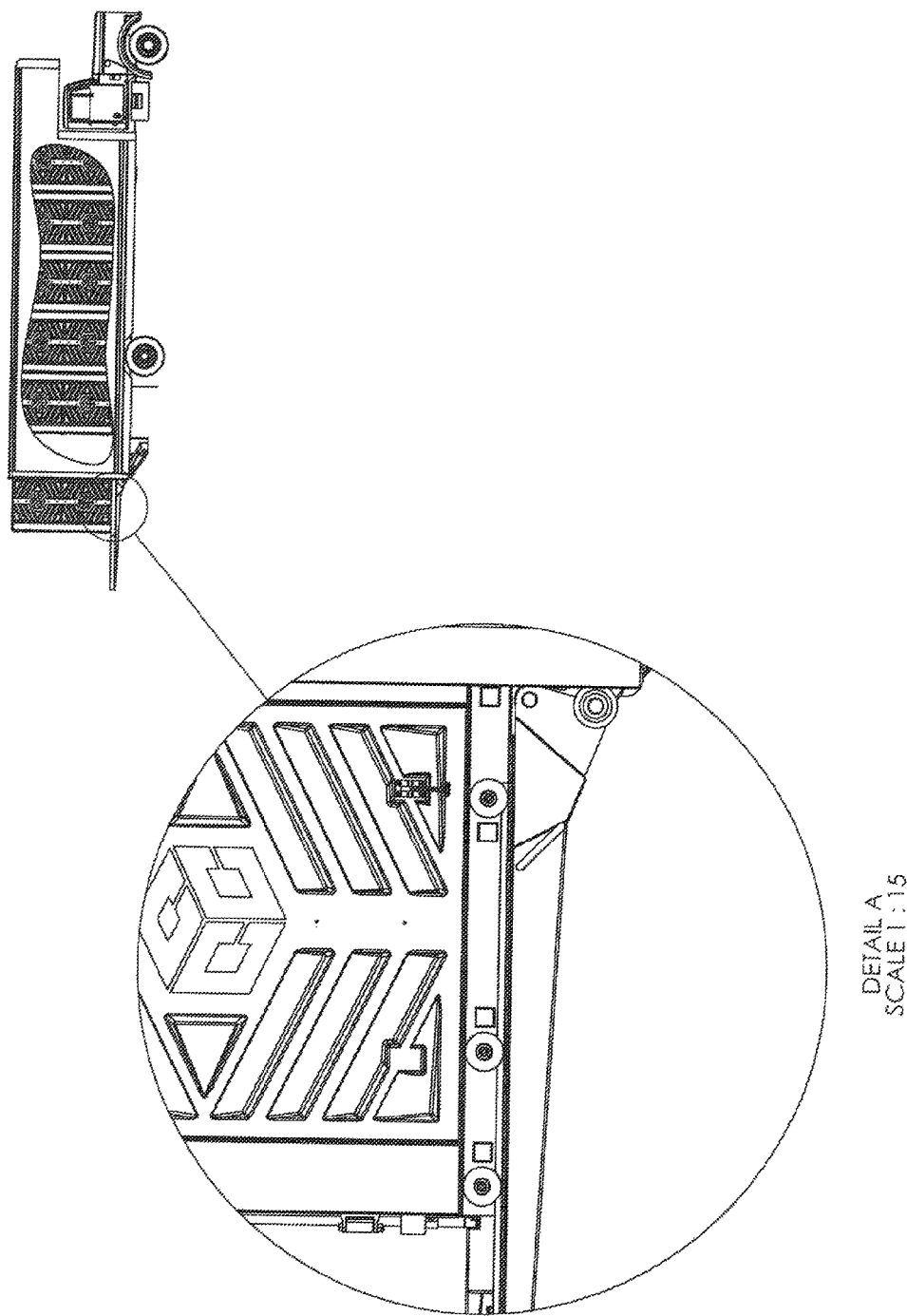

FIGS. 81 and 82 demonstrate wheels from a base going from a lift gate to a truck on a "V" track.

Figure 83:
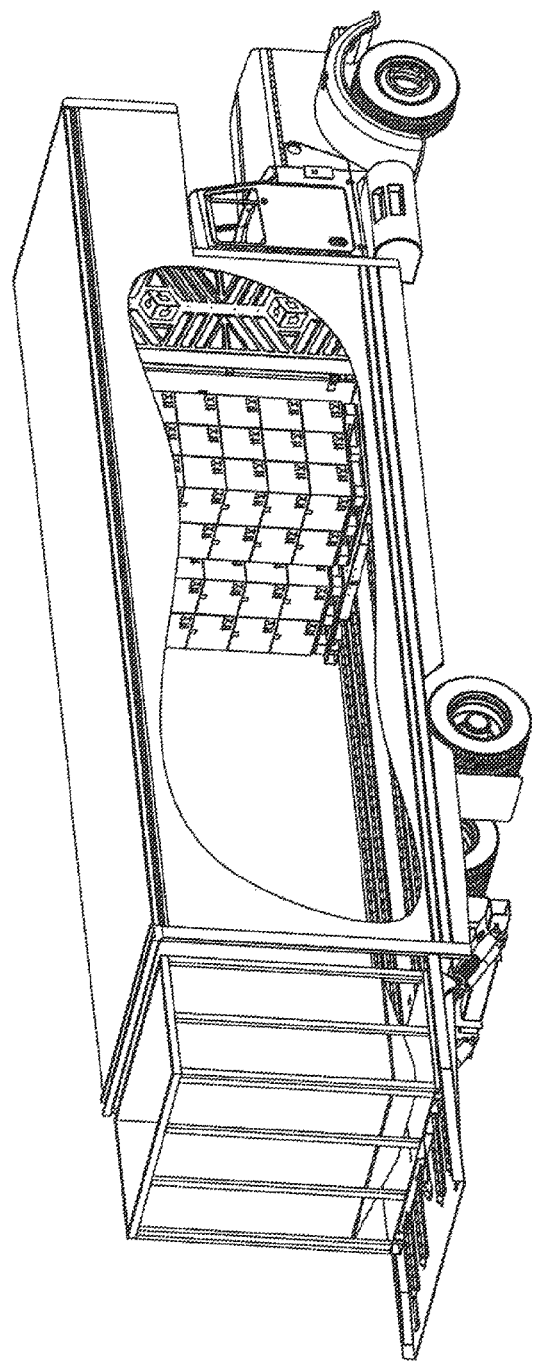
FIGS. 83 and 84 demonstrate an alternative way of pushing at least one modular transportation component into a truck, for example.
Figure 84:
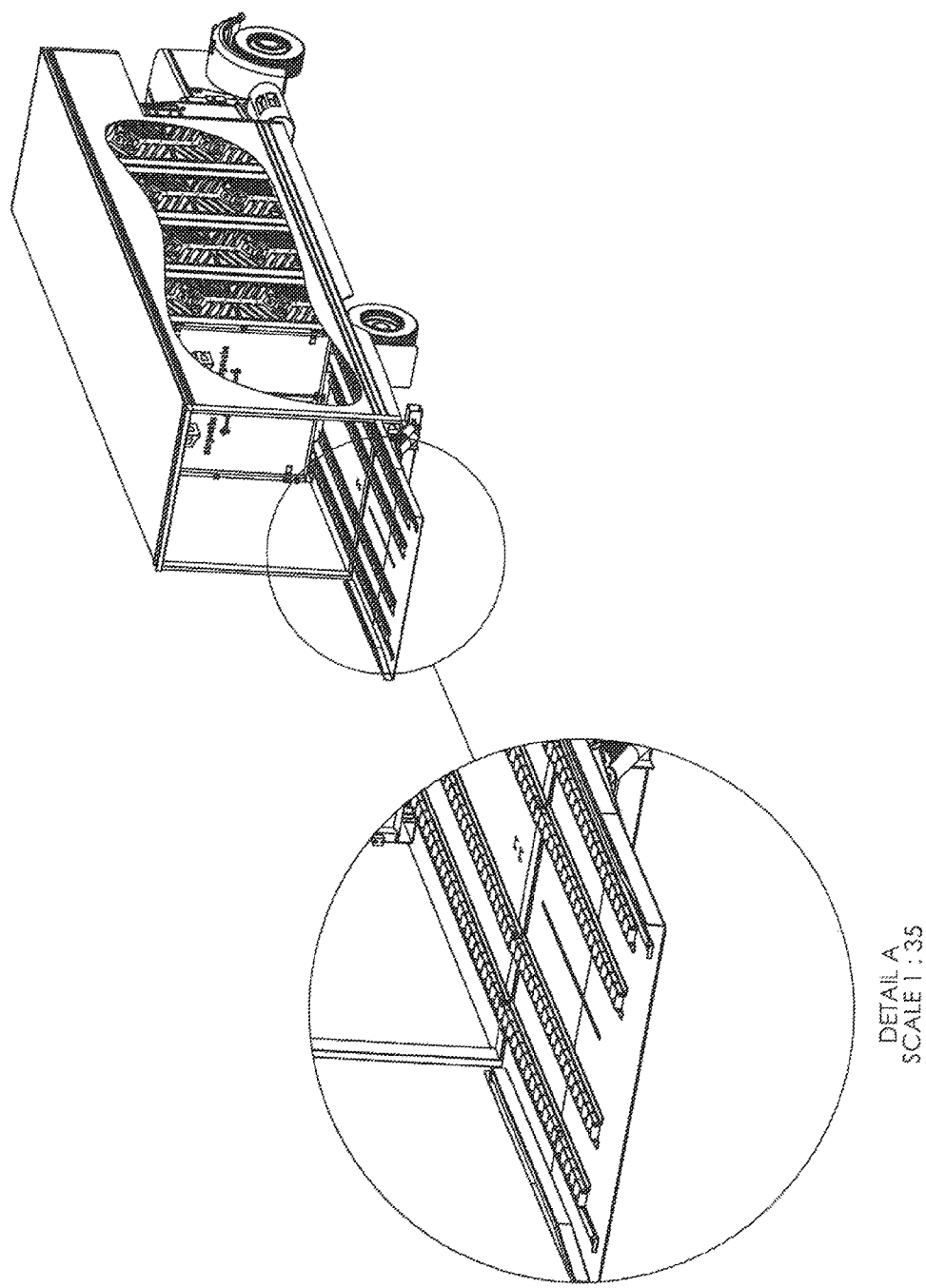

FIGS. 83 and 84 demonstrate an alternative way of pushing at least one modular transportation component into a truck, for example. An alternative way is a track with rollers that are built into a lift gate and a truck flush with floor rollers. In one embodiment, the rollers would elevate 1-2 inches in order for at least one modular transportation component to roll into the truck.

FIGS. 85 and 86 demonstrate distribution facility regular trucks bringing cargo containers into one side and cargo containers being placed into trailers, overseas containers, or rail containers for transit from shipping to destination.

Figure 87:
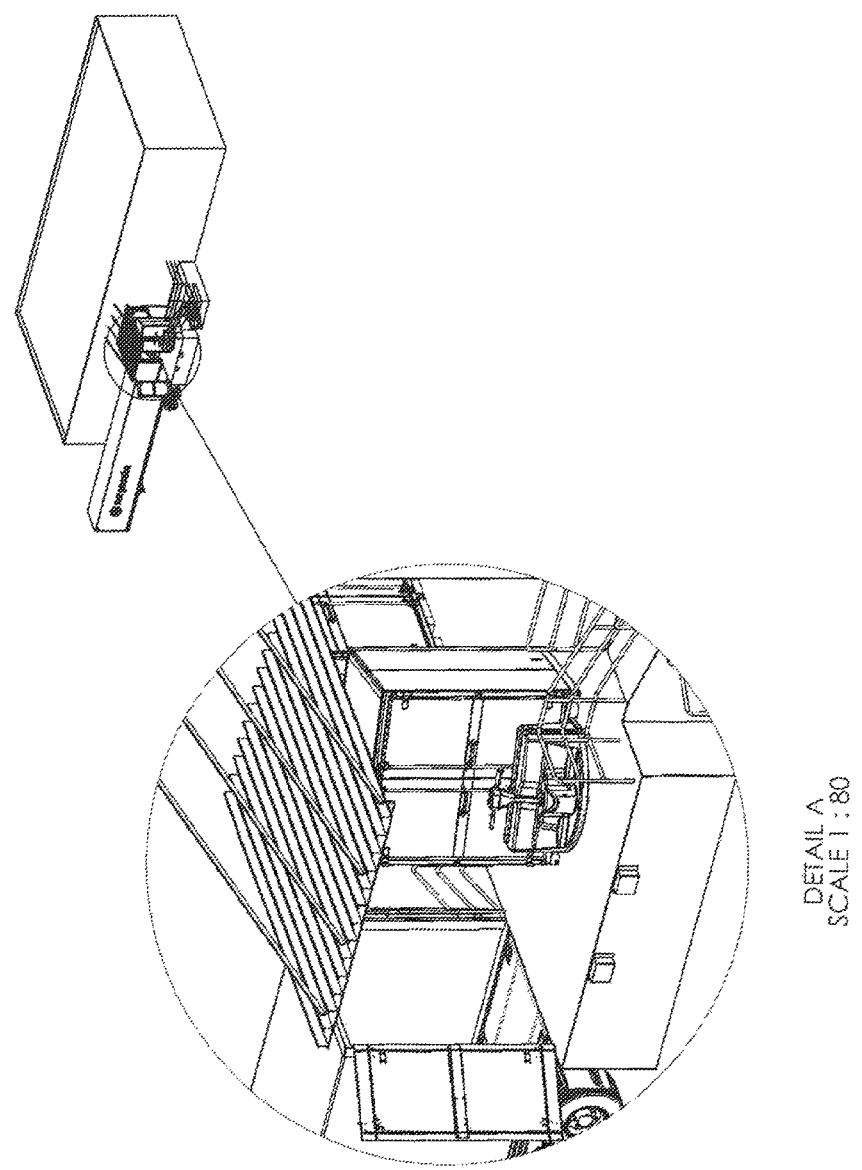
FIG. 87 shows a pallet jack loading trailers.

FIG. 87 shows a pallet jack loading trailers.

Figure 88:
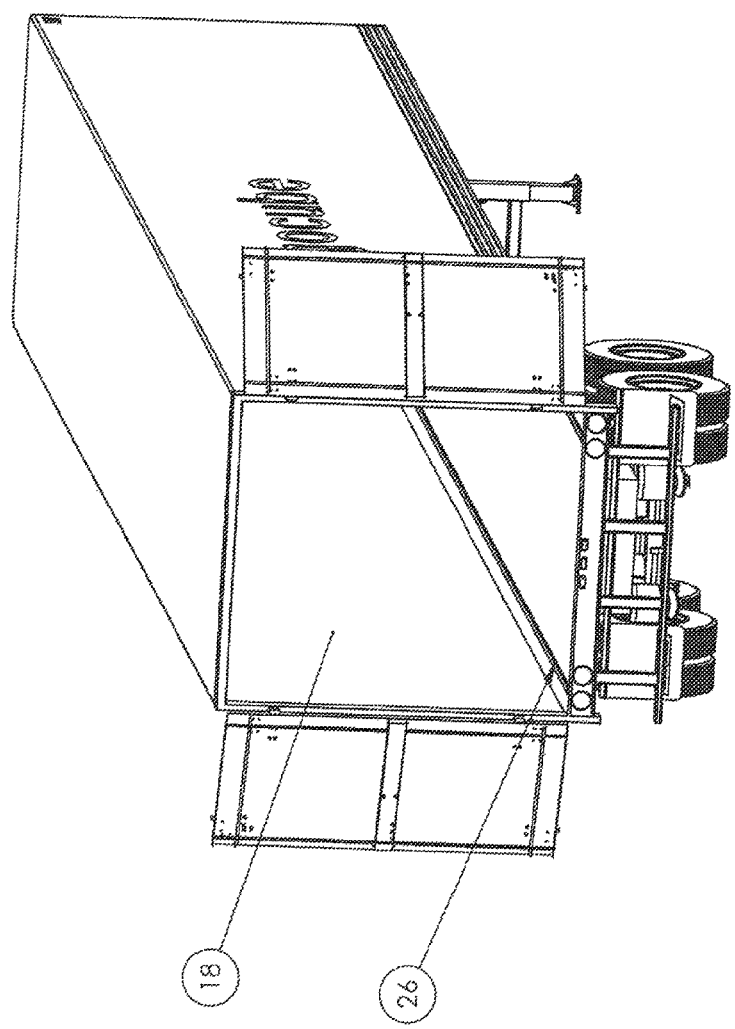
FIG. 88 shows a trailer with "V" tracking installed.

FIG. 88 shows a trailer with "V" tracking installed.

Figure 89:
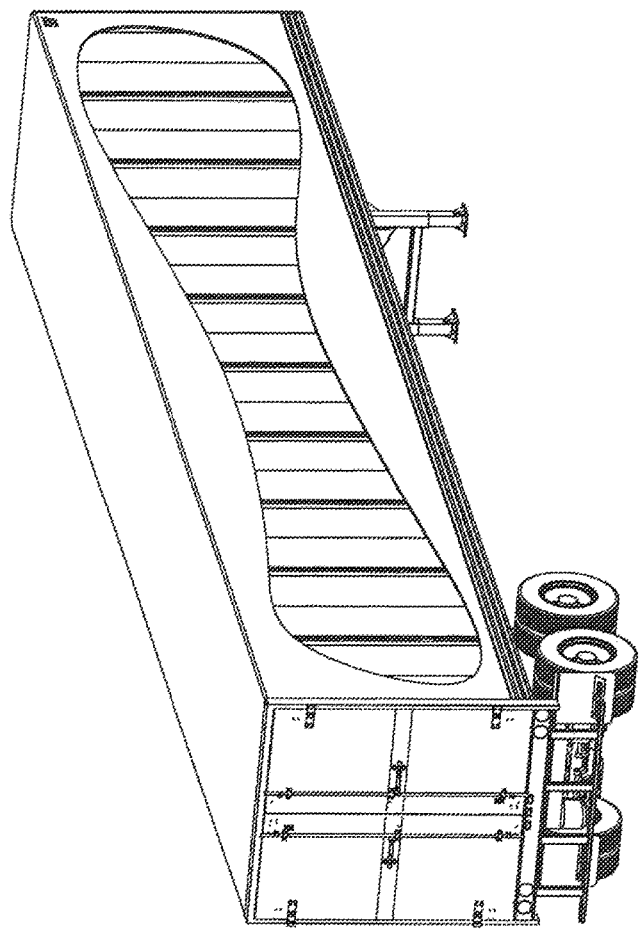
FIGS. 89 and 90 demonstrate a trailer, overseas container, and rail container loaded with 10 transportation cargo containers.
Figure 90:
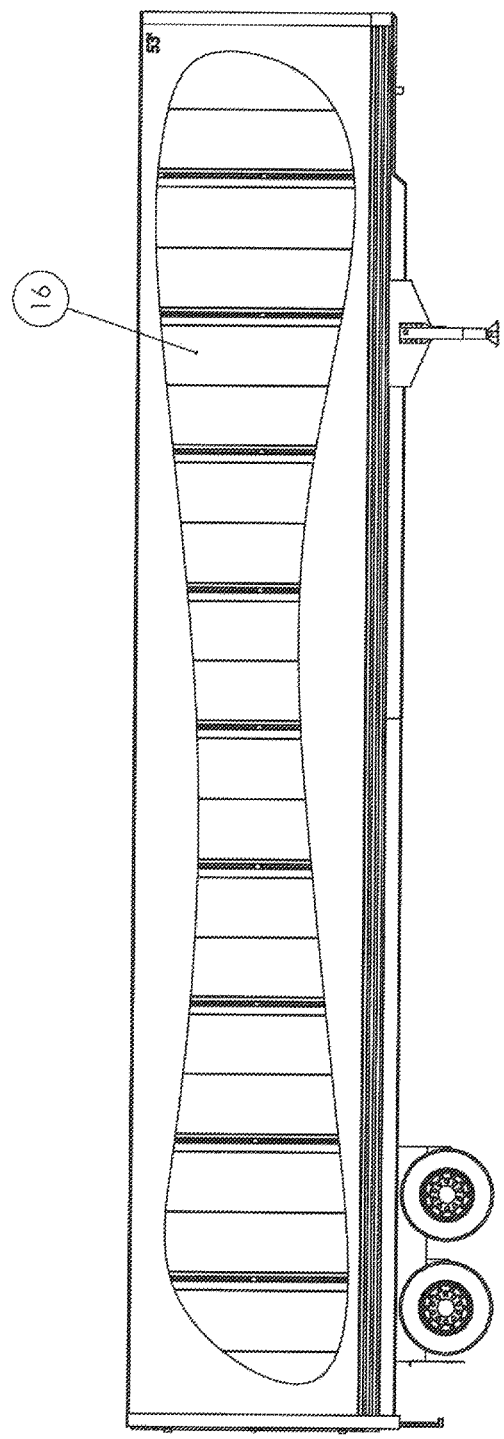

FIGS. 89 and 90 demonstrate a trailer, overseas container, and rail container loaded with 10 transportation cargo containers.

Figure 91:
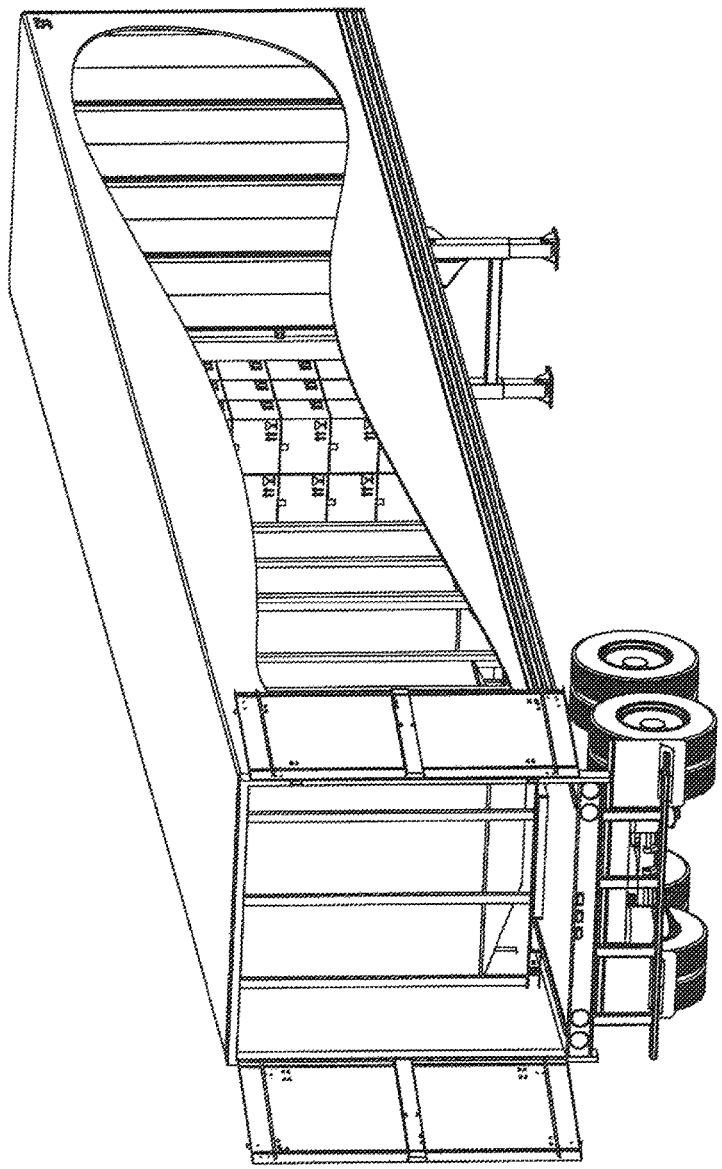
FIG. 91 shows a trailer with all three designs of at least one transportation modular component, cargo containers, pallets of freight, and commodities transporter.

FIG. 91 shows a trailer with all three designs of at least one transportation modular component, cargo containers, pallets of freight, and commodities transporter.

Figure 92:
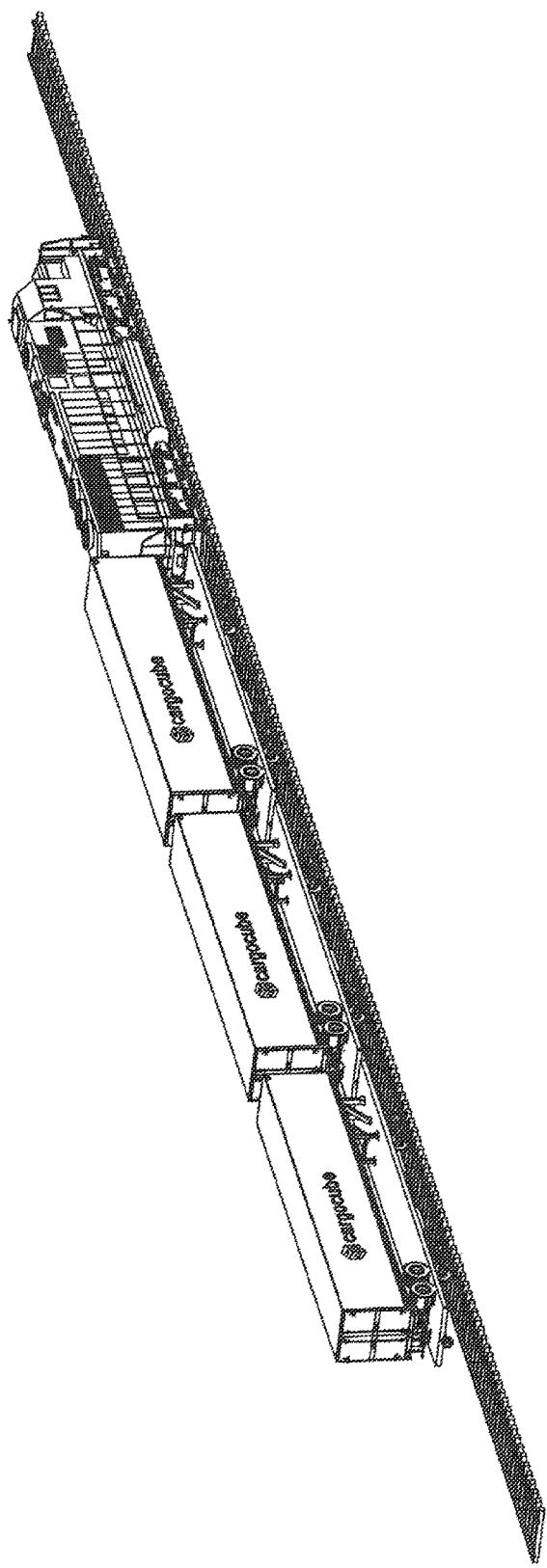
FIG. 92 shows places of a trailer on a rail car for transportation to its destination.

FIG. 92 shows places of a trailer on a rail car for transportation to its destination.

FIG. 93 shows an overseas container and a plurality of rail containers stacked up onto each other on a rail car.

I claim:

1. A modular shipping apparatus for a transportation container, comprising:
    at least one base for a cargo container;
        wherein each said at least one base has at least two spaces, wherein each of the at least two spaces is formed by a left rectangular opening and a right rectangular opening, and at least one wheel assembly is attached in one of the at least two spaces,
        wherein each said at least one base has a center portion that forms a first channel between the center portion and one of the left rectangular openings and the right rectangular openings and forms a second channel between the center portion and another one of the left rectangular openings and the right rectangular openings,
    a shipping container with a bottom interior and having at least two tracks attached to the bottom interior, wherein at least a portion of each of the at least one wheel assemblies attached in one of the at least two spaces slides along one of the at least two tracks, wherein each of the wheel assembly are V-groove wheel assemblies comprised of a V-groove wheel with a bearing and a bolt that is attached through a portion of the left rectangular opening, the bearing and a portion of the right rectangular opening with the V-grove wheel rotatably attached to the bolt in one of the at least two spaces.

2. A modular shipping apparatus as in claim 1, wherein the at least one wheel assembly is a V-groove wheel assembly.

3. A modular shipping apparatus as in claim 1, wherein each of the at least two tracks are V-shaped tracks.

4. A modular shipping apparatus as in claim 1, wherein the center portion includes at least one rectangular bar that is perpendicular to the first channel and the second channel.

5. A modular shipping apparatus as in claim 1, wherein the shipping container has at least two foot stoppers attached to the bottom interior of the shipping container.

6. A modular shipping apparatus as in claim 1, wherein the center portion is further comprising a center portion opening along a middle front portion of the center portion.

7. A modular shipping apparatus as in claim 6, further comprising a hook arm assembly attached to the bottom interior of the shipping container and aligned with the center portion opening along a middle front portion of the center portion, to allow a portion of the hook arm assembly to thread the center portion opening.

8. A modular shipping apparatus as in claim 6, further comprising a pulley system assembly attached to the bottom interior of the shipping container and aligned with the center portion opening along a middle front portion of the center portion, wherein a portion of the pulley system assembly threads the center portion opening.

9. A modular shipping apparatus as in claim 1, wherein the first channel and the second channel are sized to receive a portion of a lifting device.

10. A modular shipping apparatus as in claim 1, further comprising a cargo container in communication with one of said at least one bases, wherein the cargo container is a commodities transporter for transporting a commodity.

11. A modular shipping apparatus as in claim 1, wherein the commodities transporter cargo container has a bottom interior with a funneled portion and a bottom exterior with a door, wherein that funneled portion directs good towards the center of the bottom interior and when the door is opened the commodity is funneled out of the commodities transporter.

12. A modular shipping apparatus as in claim 1, further comprising a cargo container in communication with one of said at least one base, wherein the interior of the cargo container has a plurality of rails with elongated rail openings that receive a strap.

13. A modular shipping apparatus as in claim 1, further comprising a cargo container in communication with one of said at least one bases, wherein the cargo container has at least one interior partition.

14. A modular shipping apparatus as in claim 13, wherein each of the interior partitions contains at least one locked cargo container.

15. A modular shipping apparatus as in claim 1, wherein the shipping container has at least one lever stoppers attached to the bottom interior of the shipping container.

16. A modular shipping apparatus for a transportation container, comprising:
    at least one base for a cargo container;
        wherein each said at least one base has a first rectangular opening and a second rectangular opening with a first space between the first rectangular opening and a second rectangular opening, wherein at least one V-groove wheel assembly is attached in the first space, wherein each said at least one base has a third rectangular opening and a fourth rectangular opening with a second space between the third rectangular opening and the fourth rectangular opening, wherein at least one V-groove wheel assembly is attached in the second space, wherein each said at least one base has a center portion that forms a first channel between the center portion and the second rectangular opening and forms a second channel between the center portion and the third rectangular opening, a shipping container with a bottom interior and having at least two V-shaped tracks attached to the bottom interior, wherein each of the at least one V-groove wheel assemblies attached in the first space slide along a first V-shaped track of the at least two V-shaped tracks and wherein each of the at least one V-groove wheel assemblies attached in the second space slide along a second V-shaped track of the at least two V-shaped tracks, wherein each of the V-groove wheel assemblies in the first space are comprised of a V-groove wheel with a bearing and a bolt that is attached through a left side of a second rectangular opening, through the bearing of the V-groove wheel in the first space and through the right side of a first rectangular opening, and wherein each of the V-groove wheel assemblies in the second space are comprised of a V-groove wheel with a bearing and a bolt that is attached through a left side of a fourth rectangular opening, through the bearing of the V-groove wheel in the second space and through the right side of a third rectangular opening.

17. A modular shipping apparatus as in claim 16, wherein the center portion includes at least one rectangular bar that is perpendicular to the first channel and the second channel.

18. A modular shipping apparatus as in claim 16, wherein the shipping container has at least two foot stoppers attached to the bottom interior of the shipping container.

19. A modular shipping apparatus as in claim 16, wherein the center portion is further comprising a center portion opening along a middle front portion of the center portion.

20. A modular shipping apparatus as in claim 19, further comprising a hook arm assembly attached to the bottom interior of the shipping container and aligned with the center portion opening along a middle front portion of the center portion, to allow a portion of the hook arm assembly to thread the center portion opening.

21. A modular shipping apparatus as in claim 19, further comprising a pulley system assembly attached to the bottom interior of the shipping container and aligned with the center portion opening along a middle front portion of the center portion, wherein a portion of the pulley system assembly threads the center portion opening.

22. A modular shipping apparatus as in claim 16, wherein the first channel and the second channel are sized to receive a portion of a lifting device.

23. A modular shipping apparatus as in claim 16, further comprising a cargo container in communication with one of said at least one bases, wherein the cargo container is a commodities transporter for transporting a commodity.

24. A modular shipping apparatus as in claim 16, wherein the commodities transporter cargo container has a bottom interior with a funneled portion and a bottom exterior with a door, wherein that funneled portion directs good towards the center of the bottom interior and when the door is opened the commodity is funneled out of the commodities transporter.

25. A modular shipping apparatus as in claim 16, further comprising a cargo container in communication with one of said at least one base, wherein the interior of the cargo container has a plurality of rails with elongated rail openings that receive a strap.

26. A modular shipping apparatus as in claim 16, further comprising a cargo container in communication with one of said at least one bases, wherein the cargo container has at least one interior partition.

27. A modular shipping apparatus as in claim 26, wherein each of the interior partitions contains at least one locked cargo container.

28. A modular shipping apparatus as in claim 16, wherein the shipping container has at least one lever stoppers attached to the bottom interior of the shipping container.

29. A modular shipping apparatus for a transportation container, comprising:
at least one base for a cargo container;
wherein each said at least one base has at least two spaces, wherein each of the at least two spaces is formed by a left rectangular opening and a right rectangular opening, and at least one wheel assembly is attached in one of the at least two spaces,
wherein each said at least one base has a center portion that forms a first channel between the center portion and one of the left rectangular openings and the right rectangular openings and forms a second channel between the center portion and another one of the left rectangular openings and the right rectangular openings,
a shipping container with a bottom interior and having at least two tracks attached to the bottom interior, wherein at least a portion of each of the at least one wheel assemblies attached in one of the at least two spaces slides along one of the at least two tracks,
wherein the center portion is further comprising a center portion opening along a middle front portion of the center portion,
further comprising a hook arm assembly attached to the bottom interior of the shipping container and aligned with the center portion opening along a middle front portion of the center portion, to allow a portion of the hook arm assembly to thread the center portion opening.

30. A modular shipping apparatus for a transportation container, comprising:
at least one base for a cargo container;
wherein each said at least one base has at least two spaces, wherein each of the at least two spaces is formed by a left rectangular opening and a right rectangular opening, and at least one wheel assembly is attached in one of the at least two spaces,
wherein each said at least one base has a center portion that forms a first channel between the center portion and one of the left rectangular openings and the right rectangular openings and forms a second channel between the center portion and another one of the left rectangular openings and the right rectangular openings,
a shipping container with a bottom interior and having at least two tracks attached to the bottom interior, wherein at least a portion of each of the at least one wheel assemblies attached in one of the at least two spaces slides along one of the at least two tracks, wherein the center portion is further comprising a center portion opening along a middle front portion of the center portion, and a pulley system assembly attached to the bottom interior of the shipping container and aligned with the center portion opening along a middle front portion of the center portion, wherein a portion of the pulley system assembly threads the center portion opening.

31. A modular shipping apparatus for a transportation container, comprising:

at least one base for a cargo container;

wherein each said at least one base has a first rectangular opening and a second rectangular opening with a first space between the first rectangular opening and a second rectangular opening, wherein at least one V-groove wheel assembly is attached in the first space, wherein each said at least one base has a third rectangular opening and a fourth rectangular opening with a second space between the third rectangular opening and the fourth rectangular opening, wherein at least one V-groove wheel assembly is attached in the second space, wherein each said at least one base has a center portion that forms a first channel between the center portion and the second rectangular opening and forms a second channel between the center portion and the third rectangular opening, a shipping container with a bottom interior and having at least two V-shaped tracks attached to the bottom interior, wherein each of the at least one V-groove wheel assemblies attached in the first space slide along a first V-shaped track of the at least two V-shaped tracks and wherein each of the at least one V-groove wheel assemblies attached in the second space slide along a second V-shaped track of the at least two V-shaped tracks, wherein the center portion is further comprising a center portion opening along a middle front portion of the center portion, a hook arm assembly attached to the bottom interior of the shipping container and aligned with the center portion opening along a middle front portion of the center portion, to allow a portion of the hook arm assembly to thread the center portion opening.

32. A modular shipping apparatus for a transportation container, comprising:

at least one base for a cargo container;

wherein each said at least one base has a first rectangular opening and a second rectangular opening with a first space between the first rectangular opening and a second rectangular opening, wherein at least one V-groove wheel assembly is attached in the first space, wherein each said at least one base has a third rectangular opening and a fourth rectangular opening with a second space between the third rectangular opening and the fourth rectangular opening, wherein at least one V-groove wheel assembly is attached in the second space, wherein each said at least one base has a center portion that forms a first channel between the center portion and the second rectangular opening and forms a second channel between the center portion and the third rectangular opening, a shipping container with a bottom interior and having at least two V-shaped tracks attached to the bottom interior, wherein each of the at least one V-groove wheel assemblies attached in the first space slide along a first V-shaped track of the at least two V-shaped tracks and wherein each of the at least one V-groove wheel assemblies attached in the second space slide along a second V-shaped track of the at least two V-shaped tracks, wherein the center portion is further comprising a center portion opening along a middle front portion of the center portion, a pulley system assembly attached to the bottom interior of the shipping container and aligned with the center portion opening along a middle front portion of the center portion, wherein a portion of the pulley system assembly threads the center portion opening.

\* \* \* \* \*